United States Patent
Hashizume et al.

(10) Patent No.: US 8,128,768 B2
(45) Date of Patent: Mar. 6, 2012

(54) APPARATUS FOR MANUFACTURING BONDED SUBSTRATE

(75) Inventors: Koji Hashizume, Kasugai (JP); Yoshimasa Miyajima, Kasugai (JP); Norihiko Hatano, Kasugai (JP); Tetsuji Kadowaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/883,798

(22) Filed: Sep. 16, 2010

(65) Prior Publication Data

US 2011/0011514 A1    Jan. 20, 2011

Related U.S. Application Data

(60) Continuation of application No. 11/429,521, filed on May 5, 2006, now Pat. No. 7,819,165, which is a continuation of application No. 11/248,741, filed on Oct. 12, 2005, now Pat. No. 7,300,532, which is a division of application No. 09/998,054, filed on Nov. 30, 2001, now Pat. No. 7,096,911.

(30) Foreign Application Priority Data

Nov. 30, 2000 (JP) ................. 2000-364582
Nov. 15, 2001 (JP) ................. 2001-350166

(51) Int. Cl.
*B32B 41/00* (2006.01)

(52) U.S. Cl. .......... 156/64; 156/286; 156/295; 156/297; 156/299

(58) Field of Classification Search ............ 156/64, 156/286, 295, 297, 298, 299, 358, 360, 362, 156/366, 367, 378, 379, 583.1
See application file for complete search history.

(56) References Cited

U.S. PATENT DOCUMENTS

| 5,263,888 A | 11/1993 | Ishihara et al. |
| 5,568,297 A | 10/1996 | Tsubota et al. ............. 156/145 |
| 5,629,787 A | 5/1997 | Tsubota et al. |
| 5,711,989 A | 1/1998 | Ciardella et al. |
| 5,771,085 A | 6/1998 | Ochi et al. |
| 5,957,651 A | 9/1999 | Takebayashi et al. |
| 6,115,107 A | 9/2000 | Nishi |
| 6,129,804 A | 10/2000 | Gaynes et al. ............. 156/297 |
| 6,169,652 B1 | 1/2001 | Klebanoff |

(Continued)

FOREIGN PATENT DOCUMENTS

JP     57-099357     6/1982

(Continued)

OTHER PUBLICATIONS

Japanese Office Action issued in related JP Application No. 2008-112176 on Dec. 21, 2010.

(Continued)

*Primary Examiner* — George Koch
(74) *Attorney, Agent, or Firm* — Greer, Burns & Crain, Ltd.

(57) ABSTRACT

The present invention provide an apparatus for manufacturing a bonded substrate that suppresses a defect in the bonded substrate. When the pressure in a vacuum chamber is at the atmospheric level, upper and lower chuck units respectively attract substrates through vacuum. When the vacuum chamber is depressurized, each chuck unit electrostatically attracts the associated substrate. During the depressurization of the vacuum chamber, the pressure for attracting each substrate to the associated chuck unit is controlled to be equal to the pressure in the vacuum chamber. This prevents each substrate from falling from or moving relative to the associated chuck unit. The first and second substrates are thus bonded together as accurately aligned.

5 Claims, 31 Drawing Sheets

U.S. PATENT DOCUMENTS

| | | |
|---|---|---|
| 6,222,603 B1 | 4/2001 | Sakai et al. |
| 6,254,716 B1 | 7/2001 | Russell et al. |
| 6,299,691 B1 | 10/2001 | Oda et al. |
| 6,304,311 B1 | 10/2001 | Egami et al. |
| 6,329,108 B1 | 12/2001 | Fujiike et al. |
| 6,383,890 B2 | 5/2002 | Takisawa et al. |
| 6,451,670 B1 | 9/2002 | Takisawa et al. |
| 6,503,423 B1 | 1/2003 | Kitano et al. |
| 6,541,063 B1 | 4/2003 | Prentice et al. |
| 6,657,701 B2 | 12/2003 | Choo et al. |
| 6,660,091 B2 | 12/2003 | Ito et al. |
| 2004/0026005 A1 | 2/2004 | Kawai et al. |

FOREIGN PATENT DOCUMENTS

| | | |
|---|---|---|
| JP | 63-179323 | 7/1988 |
| JP | 2-154223 | 6/1990 |
| JP | 03-246514 | 11/1991 |
| JP | 04-300672 | 10/1992 |
| JP | 04-301814 | 10/1992 |
| JP | 5-11260 | 1/1993 |
| JP | 05-53125 | 3/1993 |
| JP | 05-96730 | 4/1993 |
| JP | 05-115822 | 5/1993 |
| JP | 5-49700 | 6/1993 |
| JP | 5-190437 | 7/1993 |
| JP | 05-232451 | 9/1993 |
| JP | 05-232481 | 9/1993 |
| JP | 05-265011 | 10/1993 |
| JP | 05-326451 | 12/1993 |
| JP | 6-75233 | 3/1994 |
| JP | 06-085045 | 3/1994 |
| JP | 06-123865 | 5/1994 |
| JP | 06-148657 | 5/1994 |
| JP | 06-165964 | 6/1994 |
| JP | 06-194615 | 7/1994 |
| JP | 06-214204 | 8/1994 |
| JP | 06-254464 | 9/1994 |
| JP | 07-005405 | 1/1995 |
| JP | 07-086247 | 3/1995 |
| JP | 07-215566 | 8/1995 |
| JP | 07-325311 | 12/1995 |
| JP | 08-076133 | 3/1996 |
| JP | 8-106101 | 4/1996 |
| JP | 08-157778 | 6/1996 |
| JP | 08-171094 | 7/1996 |
| JP | 08-211351 | 8/1996 |
| JP | 08-220547 | 8/1996 |
| JP | 08-211173 | 10/1996 |
| JP | 09-015612 | 1/1997 |
| JP | 09-061829 | 3/1997 |
| JP | 09-073096 | 3/1997 |
| JP | 09-090383 | 4/1997 |
| JP | 09-127472 | 5/1997 |
| JP | 09-127528 | 5/1997 |
| JP | 09-243982 | 9/1997 |
| JP | 9-304783 | 11/1997 |
| JP | 09-311340 | 12/1997 |
| JP | 10-026763 | 1/1998 |
| JP | 10-062774 | 3/1998 |
| JP | 10-068921 | 3/1998 |
| JP | 10-104562 | 4/1998 |
| JP | 10-260410 | 9/1998 |
| JP | 10-282502 | 10/1998 |
| JP | 10-303099 | 11/1998 |
| JP | 11-002824 | 1/1999 |
| JP | 11-059894 | 3/1999 |
| JP | 11-109388 | 4/1999 |
| JP | 11-153799 | 6/1999 |
| JP | 11-212103 | 8/1999 |
| JP | 11-231276 | 8/1999 |
| JP | 11-262720 | 9/1999 |
| JP | 11-287978 | 10/1999 |
| JP | 11-288995 | 10/1999 |
| JP | 2000-35588 | 2/2000 |
| JP | 2000-066163 | 3/2000 |
| JP | 2000-147525 | 5/2000 |
| JP | 2000-147795 | 5/2000 |
| JP | 2000-206548 | 7/2000 |
| JP | 2000-218150 | 8/2000 |
| JP | 2000-252227 | 9/2000 |
| JP | 2000-258746 | 9/2000 |
| JP | 2000-284295 | 10/2000 |
| JP | 2001-005405 | 1/2001 |
| JP | 2001005405 A | 1/2001 |
| JP | 2001-272640 | 10/2001 |
| JP | 2001-356313 | 12/2001 |
| KR | 1995-0004384 B1 | 4/1995 |
| KR | 1995-0009249 Y1 | 10/1995 |
| KR | 1998-17681 | 6/1998 |
| KR | 1998-024238 | 7/1998 |
| KR | 1999-014211 | 2/1999 |
| KR | 1999-023901 | 3/1999 |
| KR | 10-026195 | 4/1999 |
| KR | 1999-63511 | 7/1999 |
| KR | 2000-35483 | 6/2000 |

OTHER PUBLICATIONS

Machine translation of JP 2000-284295.

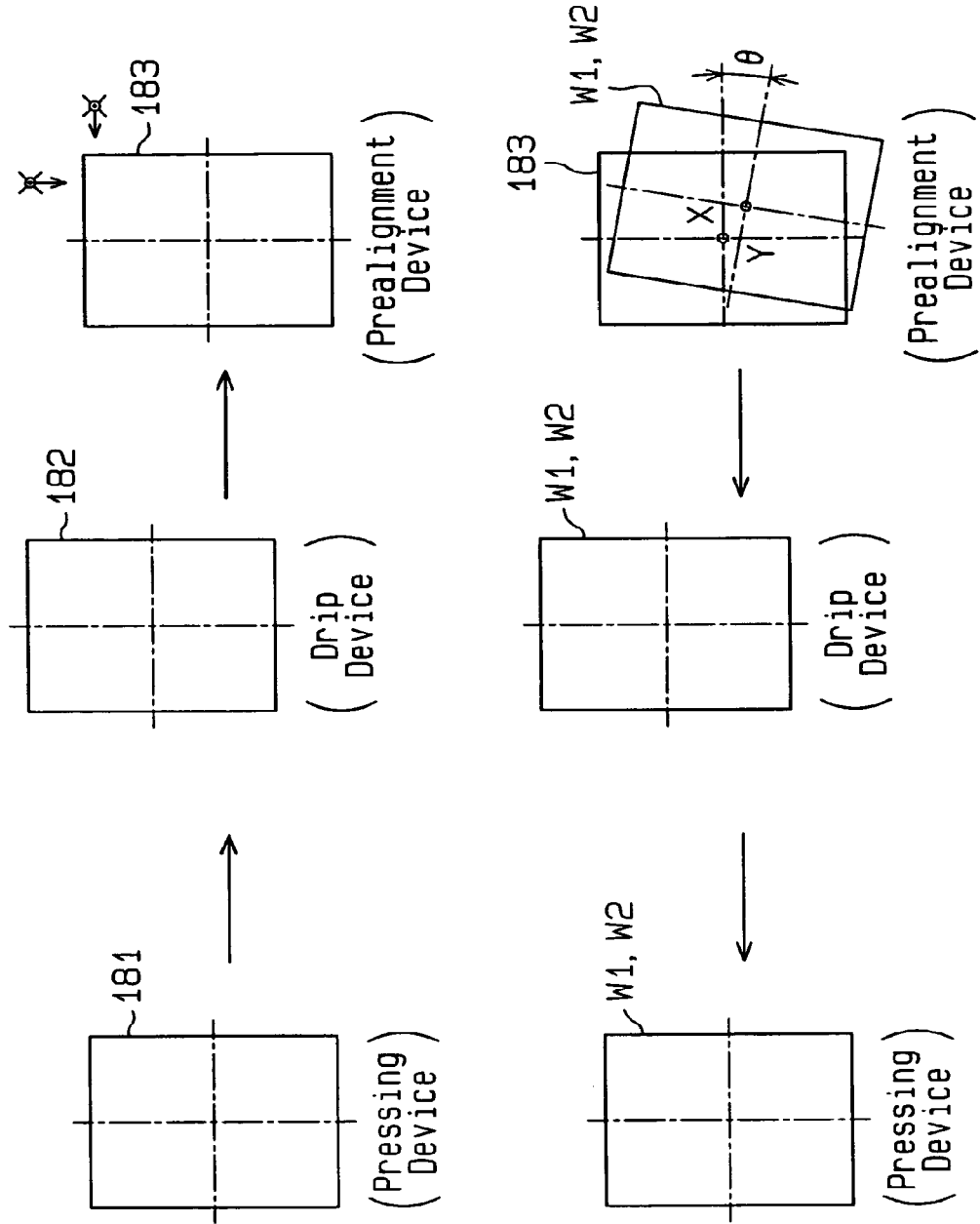

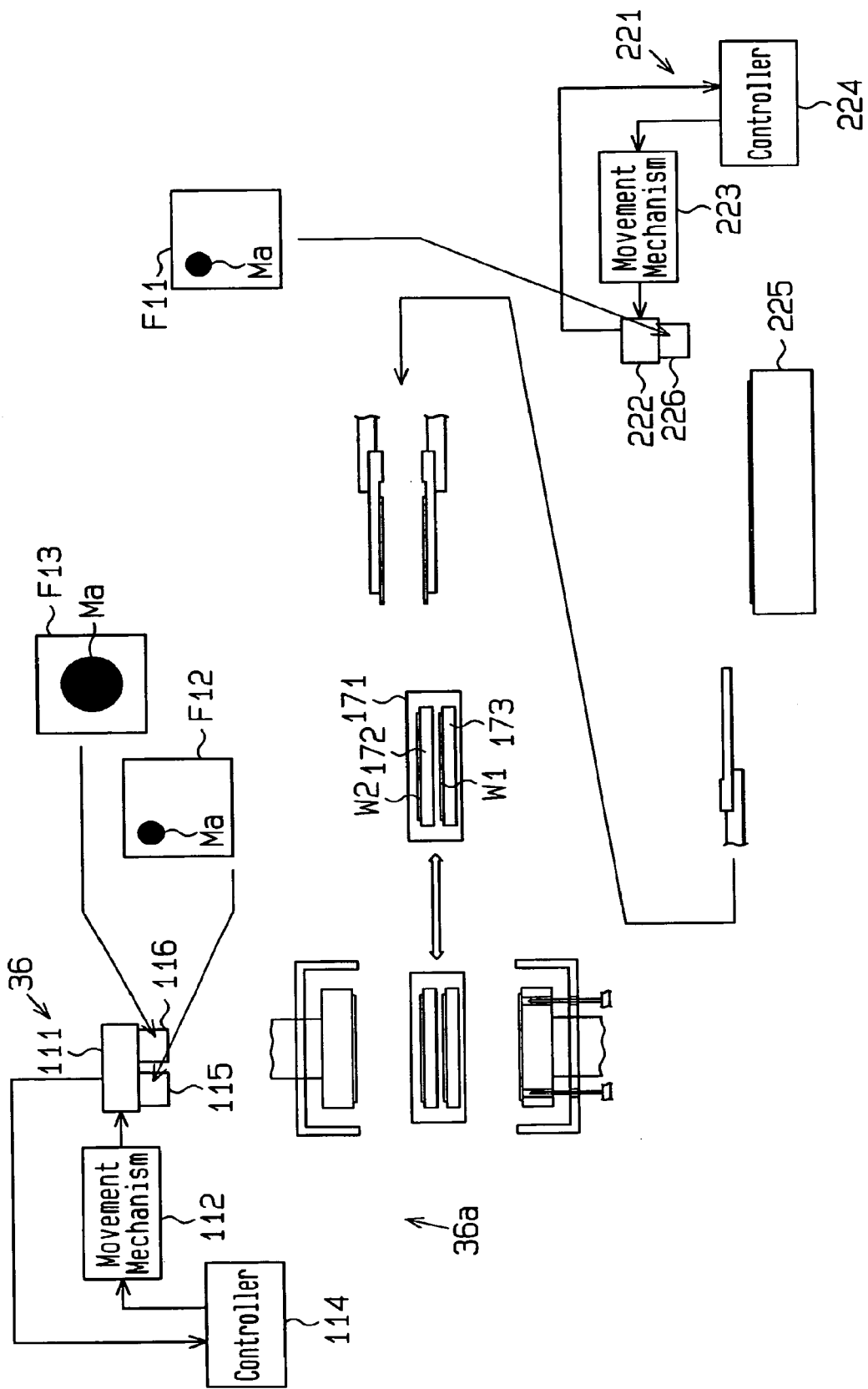

APPARATUS FOR MANUFACTURING BONDED SUBSTRATE

This is a Continuation of patent application Ser. No. 11/429,521, now U.S. Pat. No. 7,819,165, filed May 5, 2006, which is a Continuation of patent application Ser. No. 11/248,741, filed Oct. 12, 2005, (now U.S. Pat. No. 7,300,532), which is a Divisional of patent application Ser. No. 09/998,054, filed Nov. 30, 2001, (now U.S. Pat. No. 7,096,911).

BACKGROUND OF THE INVENTION

The present invention relates to apparatuses for manufacturing bonded substrates, and, more particularly, to apparatuses for manufacturing panel displays that have a predetermined gap between a pair of substrates, for example, liquid crystal displays (LCDs).

Panel displays such as LCDs with larger display areas are now being developed. Further, to improve the resolution, an increased pixel count per unit area is demanded in the panel displays. Accordingly, an apparatus for manufacturing panel displays with bonded substrates must be capable of accurately aligning the substrates even if each substrate is relatively large.

FIG. 1 is a plan view showing a portion of a prior art, active-matrix type liquid crystal panel display 10, as viewed from a color filter substrate.

The liquid crystal panel display 10 includes an array substrate 11 and a color filter (CF) substrate 16. The array substrate 11 has a plurality of pixel areas 12 that are formed in a matrix-like manner. Each pixel area 12 includes a switch element, or a thin film transistor (TFT) 13. The pixel areas 12 form a display area 14. A gate electrode of each TFT 13 is connected to a gate line (not shown). A drain electrode of each TFT 13 is connected to a data line (not shown). A source electrode of each TFT 13 is connected to a pixel electrode (not shown) formed in each pixel area 12. A plurality of data lines and gate lines are located at the periphery of the array substrate 11 and are connected to a terminal portion 15. The terminal portion 15 is connected to an external drive source (not shown).

The CF substrate 16 is smaller than the array substrate 11 by an area that substantially corresponds to the area of the terminal portion 15. The CF substrate 16 is spaced from the array substrate 11 at a predetermined interval. A cell gap is formed between the CF substrate 16 and the array substrate 11 and is filled with liquid crystal. The dimension of the cell gap (the cell thickness) is thus substantially equal to the interval between the CF substrate 16 and the array substrate 11. The CF substrate 16 includes a common electrode (not shown) and a black matrix (BM) 17, or a shielding film such as a color filter (red (R), green (G), or blue (B)) and a chrome film. The BM 17 is located at a position corresponding to certain pixel areas 12 in the display area 14 to form a contrast and shields each TFT 13, thus suppressing a light leak current. A BM periphery 18 shields the display area 14 from unnecessary light from the exterior. The array substrate 11 is bonded with the CF substrate 16 through a seal 19 that contains thermosetting resin.

A procedure for manufacturing a liquid crystal display mainly includes an array step, a cell step, and a module step. The array step includes formation of a wiring pattern and the switch elements (TFTs) 13 (in the case of an active-matrix type display) on each glass substrate 11, 16. The cell step includes alignment of liquid crystal, installation of spacers, and filling of liquid crystal in the cell gap between the substrates 11, 16. The module step includes installation of a driver IC and a backlight.

Conventionally, liquid crystal is filed in the cell gap in accordance with a vacuum method. In the method, the array substrate 11, which has the TFTs 13, is bonded with an opposed substrate, or the CF substrate 16, through the seal 19 located between the substrates 11, 16. After the seal 19 is hardened, the liquid crystal and the substrates 11, 16 are supplied to a depressurized treatment chamber. An inlet is formed in the seal 19, and the substrates 11, 16 are placed in the treatment chamber to immerse the inlet in the liquid crystal. The pressure in the treatment chamber is then increased to the atmospheric level. This introduces the liquid crystal into the gap between the substrates 11, 16. Subsequently, the inlet is sealed.

The liquid crystal may be filled in the cell gap in accordance with a drip method. In that method, the seal 19 is placed around the array substrate 11 in a frame-like shape. A predetermined amount of liquid crystal is then dripped on the array substrate 11. Subsequently, the array substrate 11 is bonded with the CF substrate 16 under depressurization. In this state, liquid crystal develops in the cell gap to fill the gap. As compared to the vacuum method, the drip method requires less liquid crystal and shortens the time consumed for the operation. This lowers the cost for manufacturing the panel display and improves mass-productivity.

However, an apparatus for manufacturing a panel display in accordance with the drip method has the following problems.

[1: Deformed Substrates, Display Defects, and Insufficient Substrate Attraction]

A conventional apparatus for manufacturing a bonded substrate holds each substrate 11, 16 with a vacuum chuck, an electrostatic chuck, or a mechanical chuck.

More specifically, when the vacuum chuck is used, each substrate 11, 16 is placed on an attraction side of a parallel surface plate. The vacuum chuck attracts a corresponding side of each substrate 11, 16 through vacuum, thus holding the substrate 11, 16. In this state, an appropriate amount of liquid crystal is dripped on the array substrate 11 with a dispenser. Subsequently, the CF substrate 16 is aligned with the array substrate 11, and the substrates 11, 16 are bonded together in a depressurized treatment chamber.

However, if the treatment chamber is depressurized sufficiently, the holding performance of the vacuum chuck is lowered and the vacuum chuck cannot hold each substrate 11, 16 in a stable manner. To avoid this, the treatment chamber cannot be depressurized optimally. Accordingly, sufficient pressure for bonding the substrates 11, 16 together does not act on each substrate 11, 16. As a result, the substrates 11, 16 are bonded together non-uniformly, thus causing a display defect in a resulting product.

The mechanical chuck holds the array substrate 11 and the CF substrate 16 with an engagement piece, such as a holder and a ring. In this case, the reactive force to the holding force of the mechanical chuck acts only in a limited part of each substrate 11, 16. This deforms the substrates 11, 16. Thus, the substrates 11, 16 are not located parallel with each other when bonding the substrates 11, 16 together. If the substrates 11, 16 are bonded in this state, the substrates 11, 16 are misaligned. This reduces the aperture ratio of each pixel (TFT) 13 or causes a problem such as a light leakage from a shielded portion.

In the case of the electrostatic chuck, voltage is supplied between an electrode formed on a parallel surface plate and a conductive film formed on each glass substrate 11, 16. This generates a Coulomb force between each glass substrate 11, 16 and the associated electrode to attract the glass substrate 11, 16 to the associated electrostatic chuck. The glass substrates 11, 16 are then placed in the treatment chamber as opposed to each other. The treatment chamber is then depressurized to bond the substrates 11, 16 together. However, in this case, glow discharge occurs between the opposed substrates 11, 16 during the depressurization of the treatment chamber. This damages a circuit or TFTs formed on each substrate 11, 16, thus causing a defective product. Further, if air is trapped between each substrate 11, 16 and the associated electrostatic chuck, the substrate 11, 16 may separate from the chuck during the depressurization of the treatment chamber.

[2: Damaged Liquid Crystal and Misaligned Substrates]

Conventionally, the seal 19 is formed of photoresist material that hardens in a relatively short time or thermosetting photoresist material that hardens when exposed to light and heat. However, when irradiating UV light to the seal 19 for hardening the seal 19, the liquid crystal in the vicinity of the seal 19 is also exposed to the light. This causes display non-uniformess near the boundary between the seal 19 and the liquid crystal.

Further, when the seal 19 is exposed to the liquid crystal before being hardened completely, a component of the seal 19 may elute into the liquid crystal, thus contaminating the same. To avoid this, an intense UV light may be used to irradiate to the seal 19 to rapidly harden the seal 19. However, in this case, the UV light is diffused by the substrates 11, 16, thus exposing the liquid crystal to the light.

Generally, exposure of liquid crystal to the UV light changes properties of the liquid crystal. Particularly, the substance's specific resistance is reduced. The liquid crystal thus cannot meet a requirement that an LCD with TFTs should have a relatively high voltage maintaining rate. That is, a liquid crystal cell's drive voltage in the exposed display portion is varied with respect to that in the non-exposed display portion, for example, the middle of the panel display. This causes display non-uniformess, particularly in half tone.

FIG. 2 shows a prior art panel display 10. The panel display 10 has a spacer frame 20 located along the periphery of each substrate 11, 16. The spacer frame 20 prevents the seal 19 in a non-hardened state from being exposed to liquid crystal 21. However, if an excessive amount of liquid crystal is filled in the gap between the substrates 11, 16, the liquid crystal flows from the gap through the spacer frame 20 (see FIG. 3). In this case, the seal 19, which is not yet hardened, is exposed to the liquid crystal, for example, at positions 22. Each dot in FIG. 3 corresponds to a position at which the liquid crystal 21 is dripped.

The substrates 11, 16 are bonded together under depressurization. Thus, if the substrates 11, 16 are exposed to the atmospheric pressure, the middle of each substrate 11, 16 is deformed, thus forming a space between the spacer frame 20 and the substrates 11, 16. In this case, the seal 19 is exposed to the liquid crystal 21, which is wet.

Further, even after the substrates 11, 16 are thermally hardened, a reactive force due to original waviness and warp of each substrate 11, 16 remains acting on the substrate 11, 16. Thus, if the seal 19 is formed of photoresist thermosetting material, the reactive force may be released when heating the substrates 11, 16 that are hardened. This misaligns the substrates 11, 16.

Also, there may be a change in the environment or condition of each substrate 11, 16 after the bonded substrates 11, 16 are exposed to the atmospheric pressure for hardening the seal 19. Further, when forming the cell gap, the substrates 11, 16 may be held in an unstable manner or may be distorted. In these cases, the opposed substrates 11, 16 are bonded together as misaligned, thus leading to a defect in the cell gap. Accordingly, it is complicated to manufacture the panel display 10 in a stable manner.

[3: Non-Uniform Cell Thickness and its Effects on Substrates]

To distribute liquid crystal uniformly between the substrates 11, 16, the substance must be dripped at a plurality of positions of the substrate 11. However, since the amount of liquid crystal supplied to the substrate 11 is relatively small as a whole, the drip amount for each drip position must be adjusted accurately. Further, if there is an environmental change, for example, a temperature variation, the viscosity or volume of liquid crystal is altered. Also, drip performance may be varied among dispensers (drip devices). These factors vary the drip amount for each drip position, and the resulting cell thickness becomes non-uniform.

FIGS. 4A, 4B, 4C are cross-sectional views for illustrating uniform or non-uniform cell thickness of a liquid crystal panel display. In the liquid crystal panel display of FIG. 4A, an optimal amount of liquid crystal is supplied between the substrates 11, 16. The panel display thus has a desired cell thickness. More specifically, the array substrate 11 is optimally bonded with the CF substrate 16 through the seal 19. A plurality of spacer beads 23 ensures a predetermined cell thickness.

As shown in FIG. 4B, if an excessive amount of liquid crystal is supplied between the substrates 11, 16, the seal 19 is not pressed to a target dimension. This causes display non-uniformess near the periphery of the panel display.

If a further excessive amount of liquid crystal is supplied between the substrates 11, 16, not only the seal 19 is insufficiently pressed, but also the middle of the panel display is expanded, as shown in FIG. 4C. In this state, display non-uniformess is caused in the entire panel display.

[4: Undesired Exposure of Substrates to Liquid Crystal]

Each substrate 11, 16 includes an alignment mark of several micrometers. As described, the substrates 11, 16 are bonded together under depressurization after liquid crystal is dripped on the substrate 11. During the bonding, the substrates 11, 16 are aligned based on a camera image of the alignment marks such that the substrate 16 is not exposed to the liquid crystal on the substrate 11. If the exposure occurs, the liquid crystal adheres to the substrate 16, thus causing a non-uniform cell gap in the resulting panel display or exposure of the seal 19 to the liquid crystal.

Generally, the substrates 11, 16 must be bonded together with the accuracy of an order of several micrometers. Thus, a lens with a relatively long focus distance is needed to view the alignment marks of both substrates 11, 16 at the same time, if the substrates 11, 16 are spaced from each other. However, this lens has a complicated structure and is sometimes unavailable. This makes the bonding procedure difficult, and a defect may be caused in the bonded substrates 11, 16.

[5: Non-Uniform Pressing of Substrates]

When bonding the substrates 11, 16 together, the opposed substrates 11, 16 are pressed to each other to obtain a predetermined cell thickness. Thus, each substrate 11, 16 must be maintained parallel with each other, and an equal pressure must be applied to the substrates 11, 16. More specifically, after dripping liquid crystal on the substrate 11, the substrates 11, 16 are pressed to each other in a vacuum treatment chamber. However, a pressing device, such as a hydraulic cylinder, is located outside the treatment chamber and is exposed to the atmospheric air. Thus, the atmospheric pressure corresponding to the introduction cross-sectional area of the pressing device acts on the pressed surface of each substrate 11, 16. Generally, the relationship between the operational amount of the pressing device and the pressure of the pressing device applied to each substrate 11, 16 is predetermined through an experiment. The pressure of the pressing device is controlled in accordance with this relationship. However, for example, aging of the pressing device may alter the pressure applied to the substrates 11, 16. This hampers reproducibility of the bonding. Further, the substrates 11, 16 may not be sufficiently pressed to each other.

BRIEF SUMMARY OF THE INVENTION

Accordingly, it is an objective of the present invention to provide an apparatus for manufacturing a bonded substrate that suppresses a defect in a resulting product.

To achieve the foregoing and other objectives and in accordance with the purpose of the present invention, the invention provides an apparatus for manufacturing a bonded substrate. The apparatus includes a treatment chamber and first and second holding units, which oppose each other in the treatment chamber. The first and second holding units respectively hold first and second substrates. At least one holding unit generates pressure to attract the associated substrate through vacuum. The apparatus further includes a vacuum pump, which depressurizes the treatment chamber, and a control device, which controls the treatment chamber, the first and second holding units, and the vacuum pump. The control device instructs each holding unit to attract the associated substrate through vacuum, depressurizes the treatment chamber, and substantially equalizes the pressure applied by at least one holding unit with the pressure in the treatment chamber.

A further perspective of the present invention is a method for bonding a first substrate with a second substrate in a treatment chamber, which accommodates a first holding unit that attracts the first substrate and a second holding unit that attracts the second substrate. The method includes the steps of transporting the first and second substrates as a pair to the treatment chamber, attracting each substrate to the associated holding unit through vacuum by applying pressure to the substrate, depressurizing the treatment chamber, and substantially equalizing the pressure applied to each substrate with the pressure in the treatment chamber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 29 is a view explaining correction of the alignment device;

FIG. 34 is a view showing another corrective transport operation;

DETAILED DESCRIPTION OF THE PREFERRED EMBODIMENTS

A bonded substrate manufacturing apparatus 30 of an embodiment according to the present invention will now be described with reference to FIGS. 5 to 22.

Figure 1:
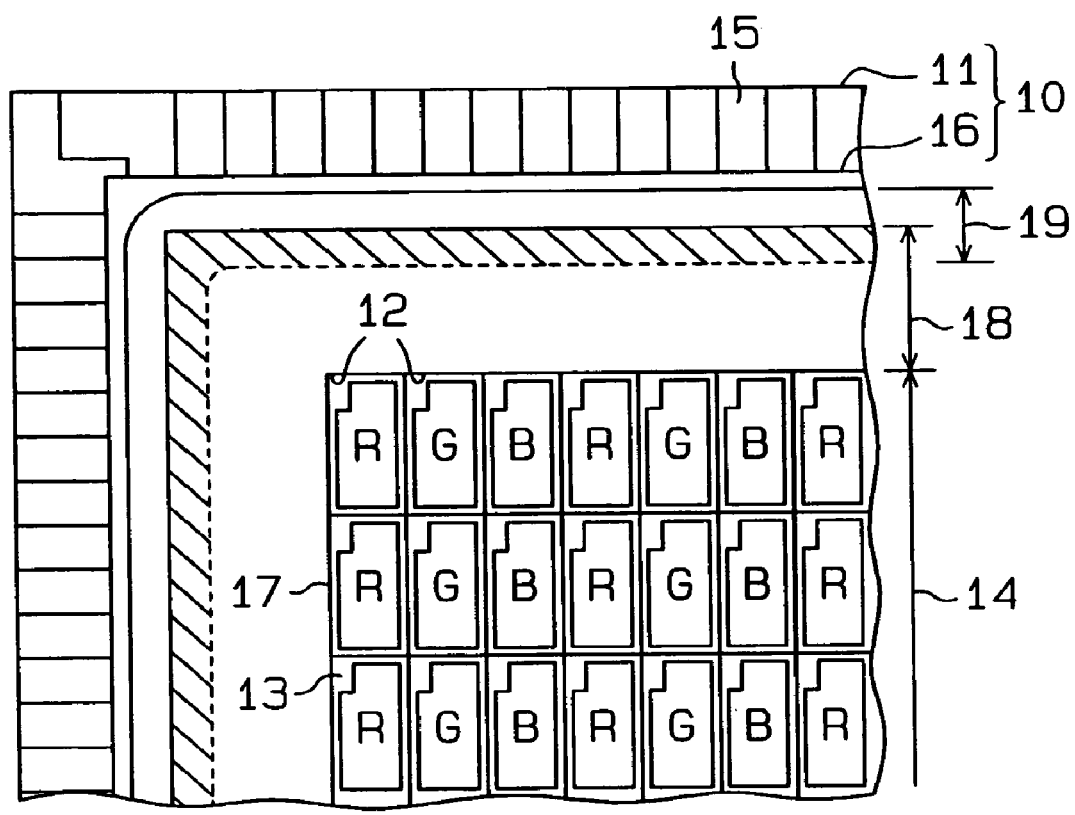
FIG. 1 is a partial view showing a prior art liquid crystal panel display.
Figure 2:
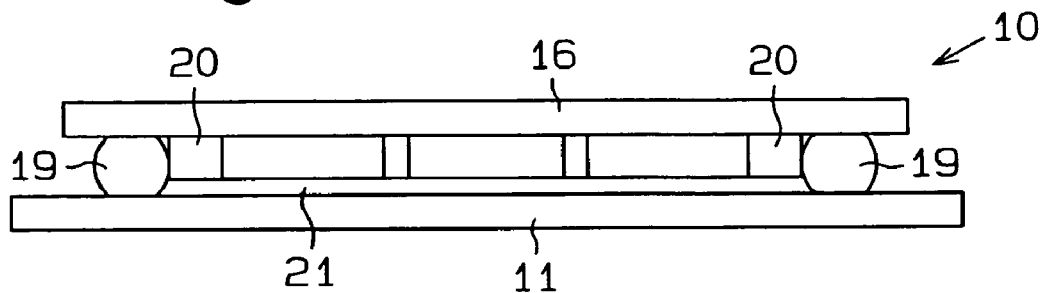
FIG. 2 is a cross-sectional view showing another prior art liquid crystal panel display.
Figure 3:
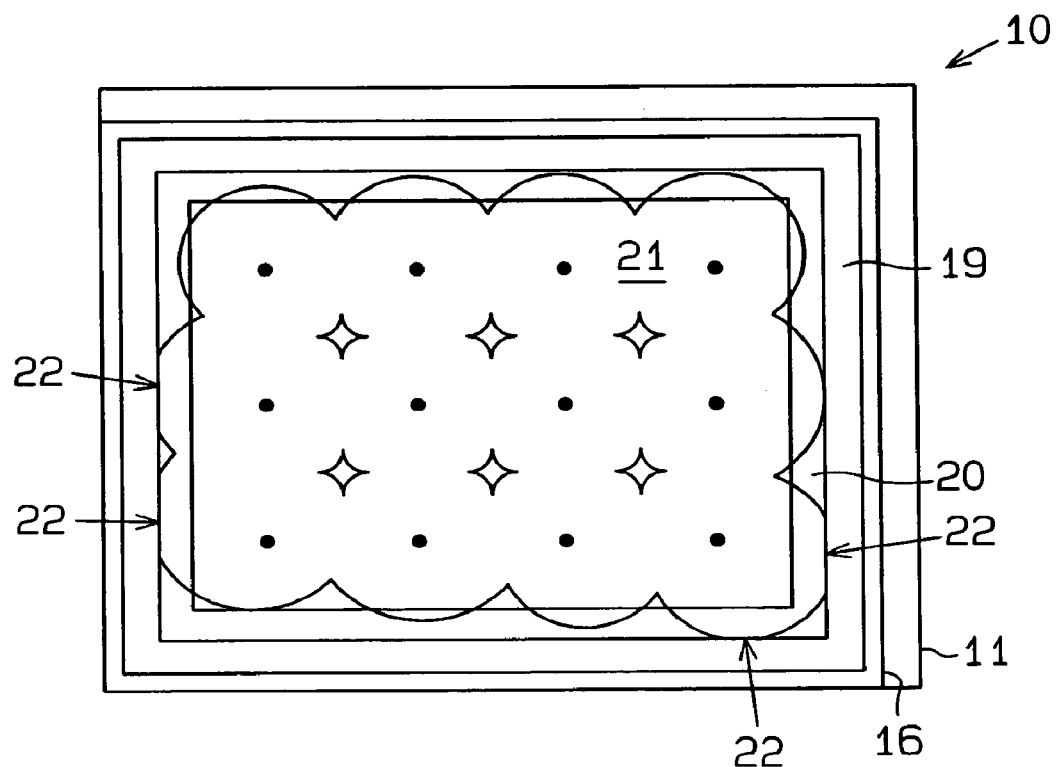
FIG. 3 is a view schematically showing a liquid crystal panel display fabricated in accordance with a prior art process.
Figure 4A:
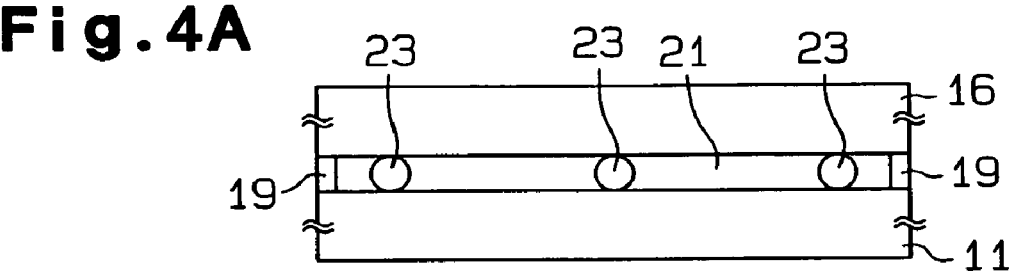
FIGS. 4A, 4B, and 4C are cross-sectional views each showing a liquid crystal panel display fabricated in accordance with a prior art process.
Figure 4B:
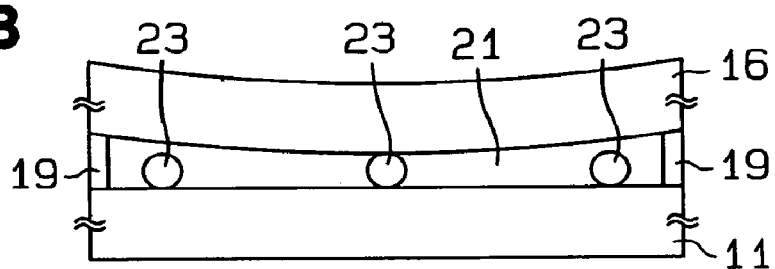
Figure 4C:
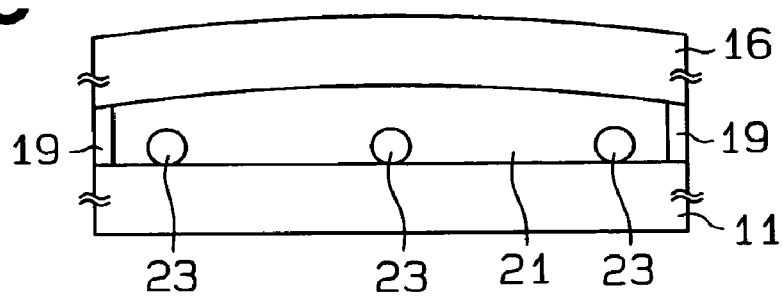
Figure 5:
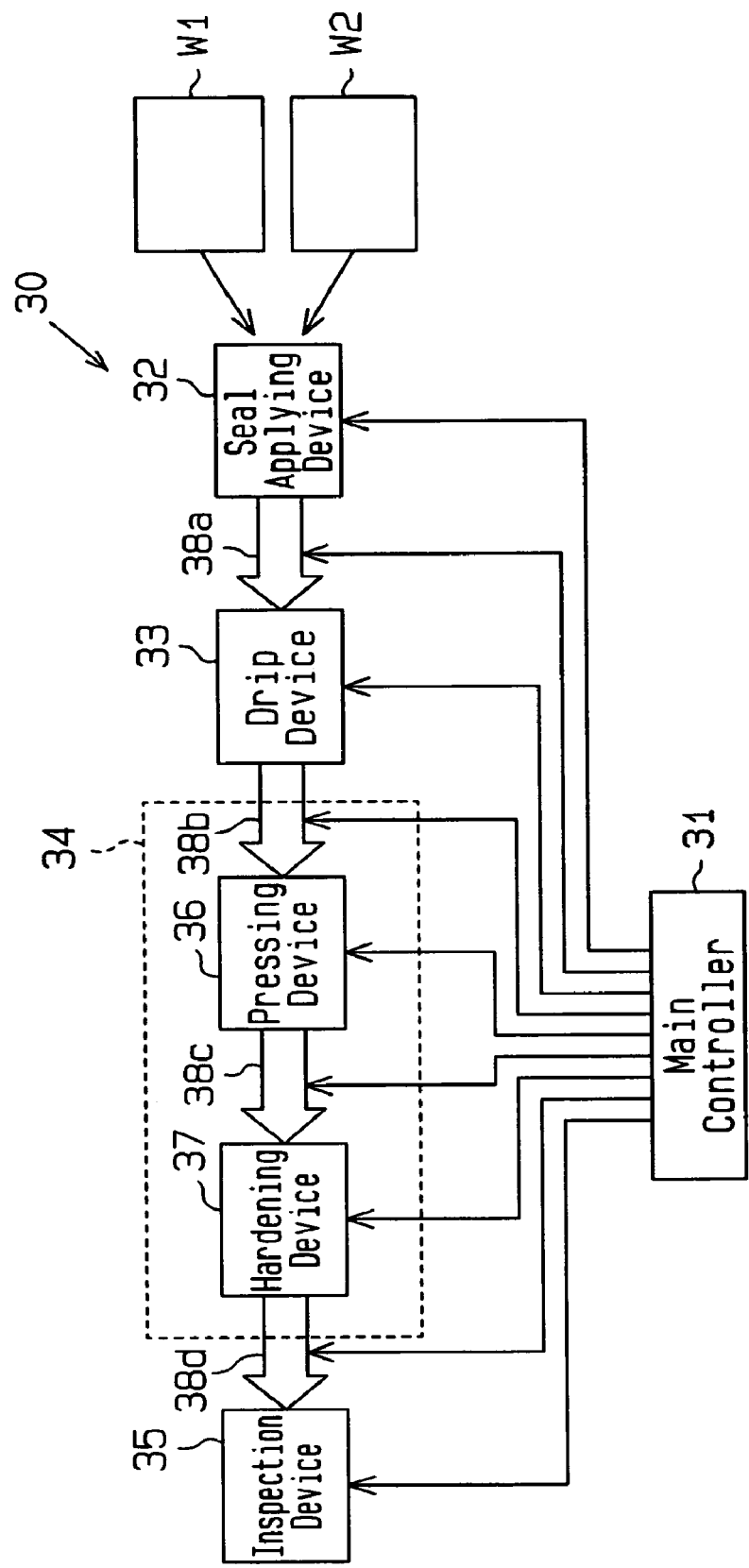
FIG. 5 is a block diagram schematically showing an embodiment of a bonding apparatus according to the present invention.

FIG. 5 is a view schematically showing the apparatus 30 that is used in a cell step of a process for fabricating a liquid crystal panel display. In the cell step, liquid crystal is dripped on a substrate, and the substrate is bonded with an opposed substrate.

In the liquid crystal panel display fabricated with the bonded substrate manufacturing apparatus 30, liquid crystal is filled in the gap between a first substrate W1 and a second substrate W2. If the panel display is an active matrix type, the first substrate W1 is a glass array substrate that includes switch elements such as TFTs, and the second substrate W2 is a color filter (CF) substrate that includes a color filter or a shielding film. The first substrate W1 and the second substrate W2 are fabricated in separate steps and are supplied to the apparatus 30. A seal is applied on a side of the first or second substrate W1, W2 (in this embodiment, the first substrate W1) along its periphery in a frame-like shape.

The apparatus 30 includes a main controller 31, a seal applying device 32, a liquid crystal drip device 33, a bonding device 34, an inspection device 35, and a plurality of transport devices 38a, 38b, 38c, 38d. The transport devices 38a-38d transport the first and second substrates W1, W2. The main controller 31 controls the devices 32-38. The bonding device 34 includes a pressing device 36 and a hardening device 37 that are controlled by the main controller 31. The main controller 31 controls the transport devices 38a-38d and transport robots to transport the first and second substrates W1, W2.

More specifically, the seal applying device 32 first receives the first and second substrates W1, W2. The seal applying device 32 then applies seal material on the upper side of the first or second substrate W1, W2 (for example, the glass substrate W1) along its circumference. An adhesive including a photo-curing adhesive is used as the seal material.

Subsequently, the transport device 38a receives the first substrate W1 and the corresponding second substrate W2 from the seal applying device 32 and transports the substrates W1, W2 to the drip device 33 as a pair.

The drip device 33 receives the first and second substrates W1, W2 and drips liquid crystal at a plurality of positions on a side of the first substrate W1 on which a seal is applied. Afterward, the transport device 38b transports the first and second substrates W1, W2 to the pressing device 36.

Figure 11:
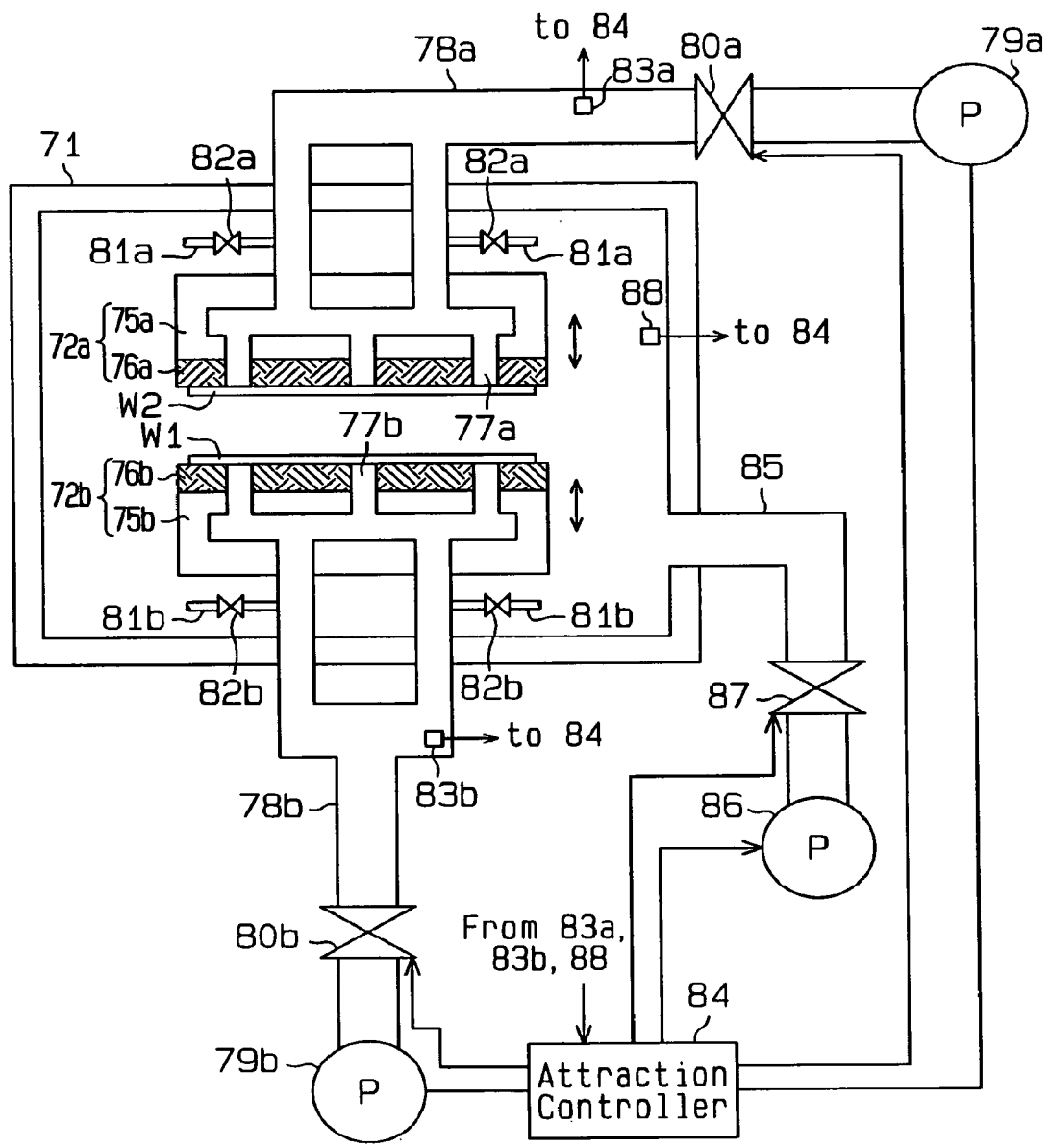
FIG. 11 is a view schematically showing the vacuum chamber and an electrostatic chuck.

As shown in FIG. 11, the pressing device 36 has a vacuum chamber 71. The vacuum chamber 71 includes a first or lower chuck unit 72b and a second or upper chuck unit 72a. When the lower and upper chuck units 72b, 72a attract the first substrate W1 and the second substrate W2, respectively, the vacuum chamber 71 is depressurized.

Subsequently, a prescribed gas is supplied to the vacuum chamber 71 for pretreatment. The gas includes exciting gas (reaction gas) for exciting plasma panel displays and replacement gas, such as nitrogen gas (inactive gas). In the pretreatment, impurities adhered on the substrates W1, W2 or a display element are exposed to the reaction gas and the replacement gas for a predetermined time.

The pretreatment stabilizes the quality of the bonding surfaces of the substrates W1, W2, which cannot be separated once the substrates W1, W2 are bonded together. More specifically, an oxide film formed on each substrate W1, W2 or a foreign object adhered to the substrate W1, W2 alters the surface state of the substrate W1, W2. The alteration is non-uniform among the substrates W1, W2, thus hampering stable fabrication of panel displays. However, the pretreatment suppresses formation of the oxide film and adhesion of the foreign object and removes impurities from the substrates W1, W2. This maintains the surface of each substrate W1, W2 in a predetermined state and stabilizes the quality of a product.

Each substrate W1, W2 includes an alignment mark. The pressing device 36 optically detects the alignment marks and aligns the first and second substrates W1, W2 without contacting the substrates W1, W2, such that an opposed side of the second substrate W2 is not exposed to the seal and liquid crystal applied on the first substrate W1. The pressing device 36 then applies a predetermined pressure to the first and second substrates W1, W2 in the vacuum chamber 71, thus pressing the substrates W1, W2 to each other to obtain a predetermined cell thickness. Afterward, the pressing device 36 increases the pressure in the vacuum chamber 71 to the atmospheric level and then opens the vacuum chamber 71.

The main controller 31 measures the time that elapses after the vacuum chamber 71 receives the first and second substrates W1, W2, thus controlling the time for which the substrates W1, W2 are exposed to the gases in the vacuum chamber 71 (the time from when the vacuum chamber 71 receives the substrates W1, W2 to when the substrates W1, W2 are bonded together). In this manner, the quality of the bonding surface of each substrate W1, W2 is maintained in a stable state after the substrates W1, W2 are bonded together.

Subsequently, the transport device 38c transports the pressed substrates W1, W2 from the pressing device 36 to the hardening device 37. More specifically, the main controller 31 starts to measure the time when the pressing of the first and second substrates W1, W2 is completed. After a predetermined time, the main controller 31 activates the transport device 38c to transport the first and second substrates W1, W2 from the pressing device 36 to the hardening device 37. The hardening device 37 receives the first and second substrates W1, W2 and irradiates light of a predetermined wavelength to the substrates W1, W2, thus hardening the seal. A liquid crystal panel display is thus fabricated.

As described, when the predetermined time elapses after the first and second substrates W1, W2 are pressed together, the light for hardening the seal is irradiated to the first and second substrates W1, W2. The time is varied in relation to diffusion speed of liquid crystal and the time needed for completely releasing reactive force generated against the pressing of the substrates W1, W2. The time is determined through an experiment.

The liquid crystal filled in the gap between the first and second substrates W1, W2 diffuses or develops when the substrates W1, W2 are pressed together and then are exposed to the atmospheric air. Thus, it is preferred that the aforementioned time is shorter than the time needed for the liquid crystal to completely diffuse and reach the seal. In this case, the seal is completely hardened by the time the seal is exposed to the liquid crystal.

The first and second substrates W1, W2 are deformed due to reactive force when pressure is applied to each substrate W1, W2 to press the substrates W1, W2 together. Since the seal is still being hardened when the transport device 38c is transporting the substrates W1, W2 to the hardening device 37, the reactive force is released from the first and second substrates W1, W2 during this period. Accordingly, it is preferred that the aforementioned time is longer than the time required for completely releasing the reactive force. In this case, by the time the seal reaches the hardening device 37, the reactive force has been reduced. This prevents the first and second substrates W1, W2 from being misaligned.

After the seal hardens, the transport device 38d transports the liquid crystal panel display to the inspection device 35. The inspection device 35 inspects the liquid crystal panel display for misalignment between the first and second substrates W1, W2. That is, the inspection device 35 detects a misalignment direction and a misalignment amount of each substrate W1, W2. The inspection device 35 informs the main controller 31 of the result.

In accordance with the result, the main controller 31 corrects the alignment of the pressing device 36. In other words, before pressing the first and second substrates W1, W2 together, the substrates W1, W2 are located offset from each other in accordance with the detected misalignment amount in an opposite direction to the detected misalignment direction. This cancels the misalignment between the first and second substrates W1, W2. In this manner, a panel display with the aligned substrates W1, W2 is obtained in a subsequent operation cycle.

Figure 6:
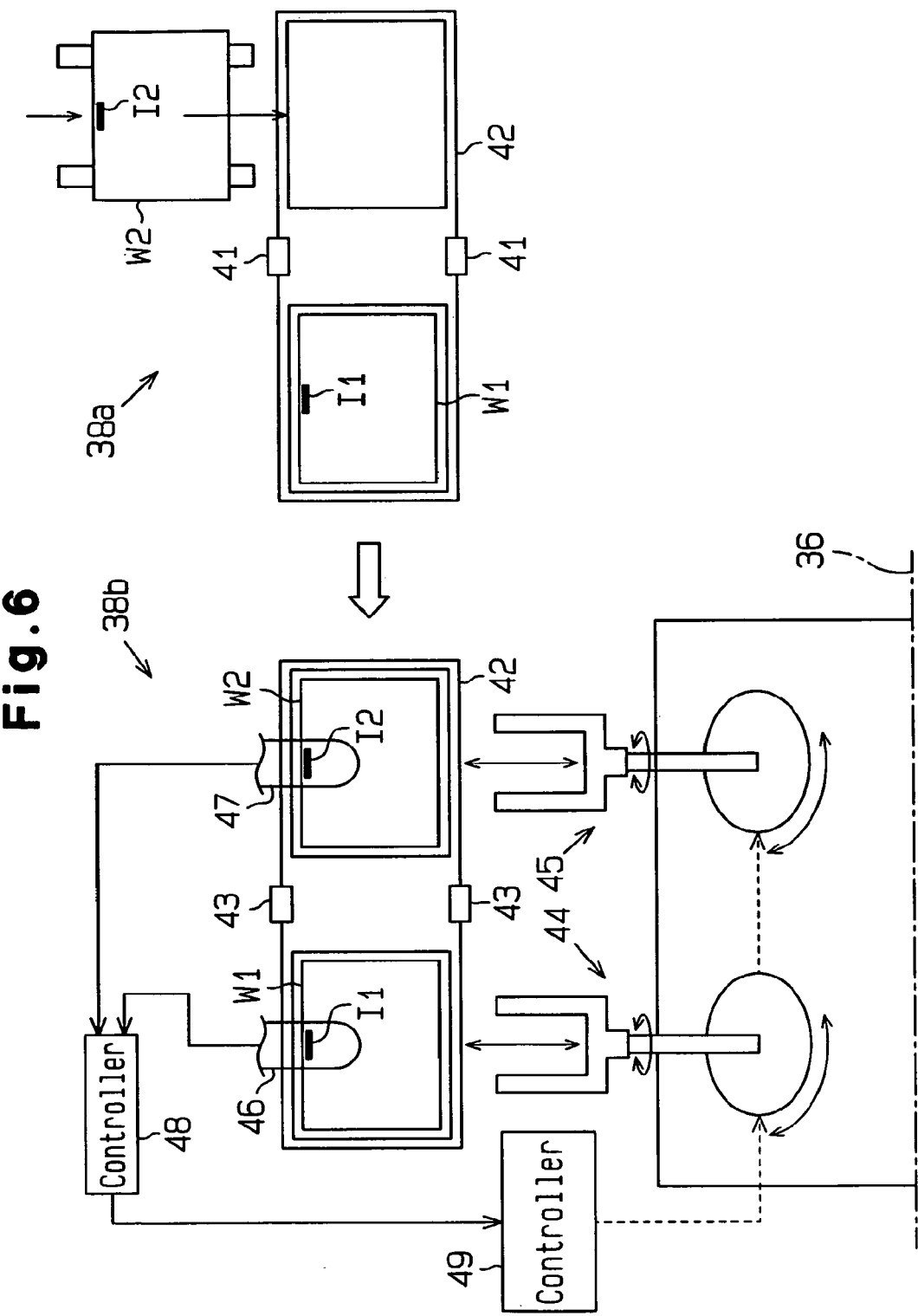
FIG. 6 is a view schematically showing a transport device of FIG. 5.
Figure 7:
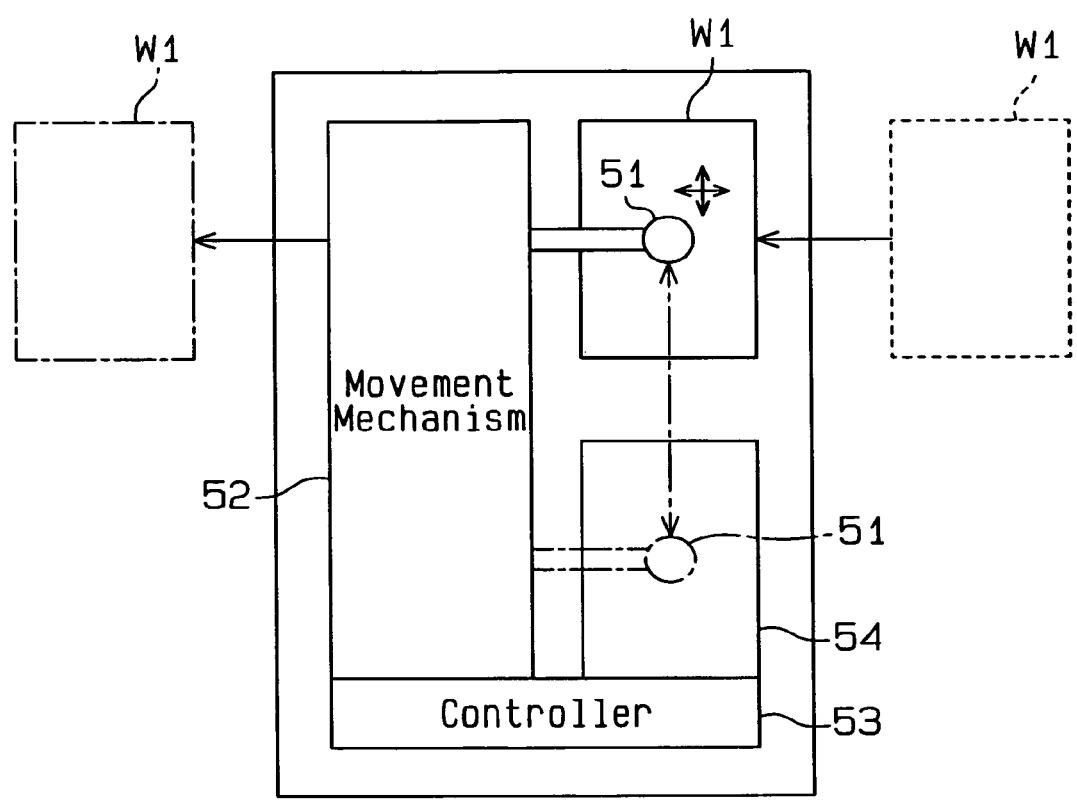
FIG. 7 is a view schematically showing a liquid crystal drip device of FIG. 5.
Figure 8A:
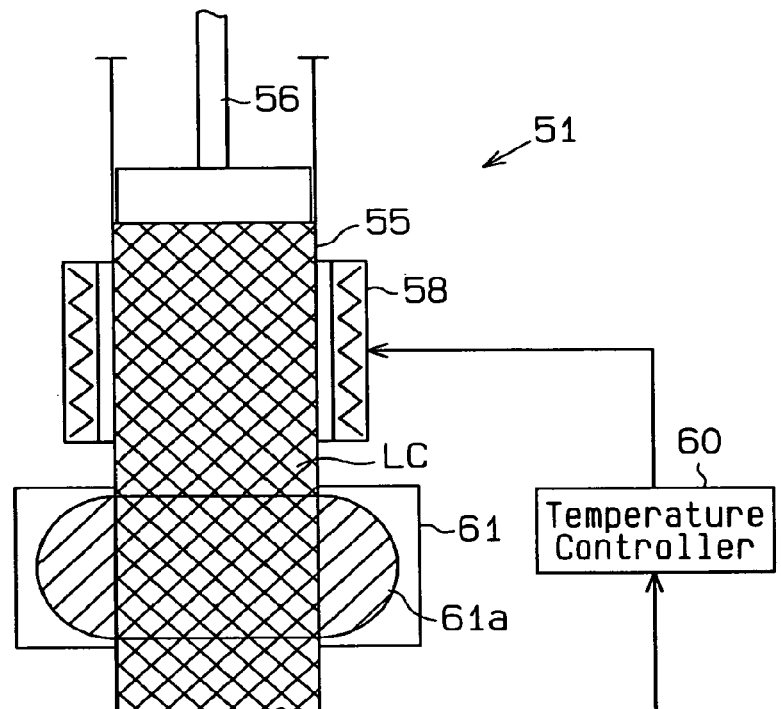
FIGS. 8A, 8B, 8C, 8D are views each schematically showing a dispenser of FIG. 7.
Figure 17:
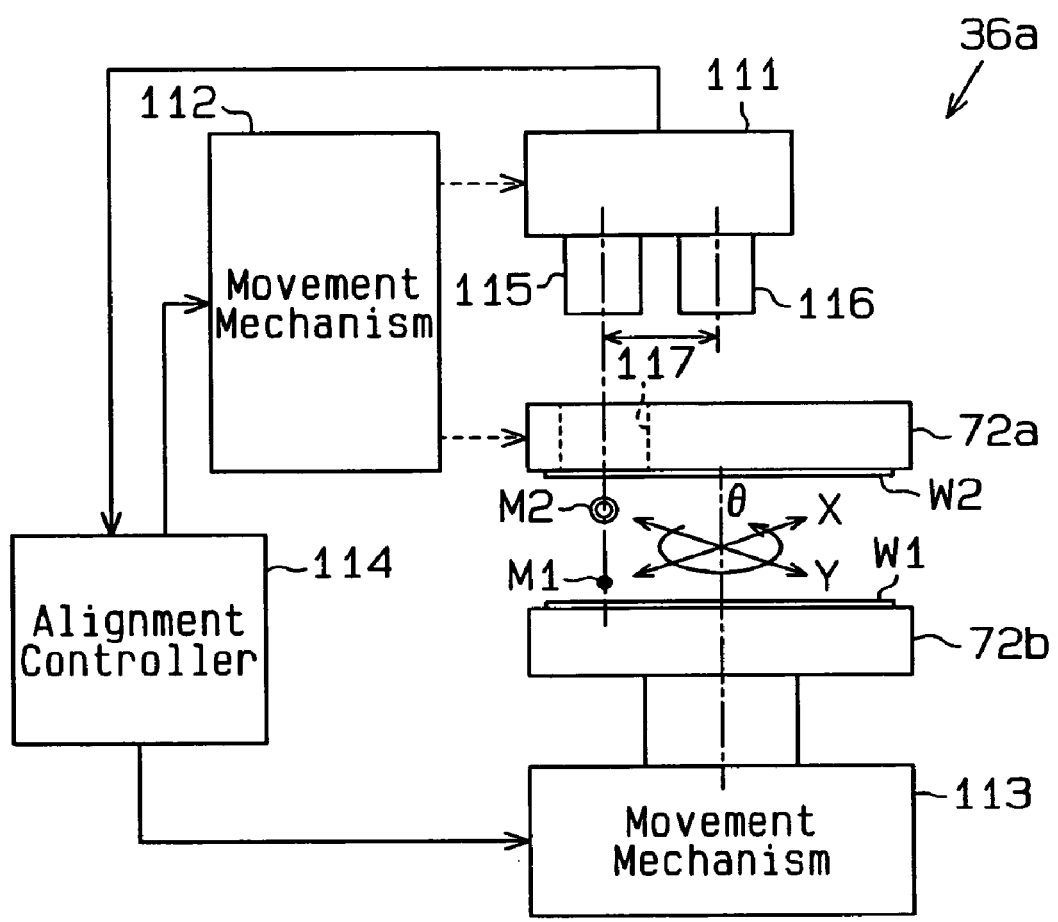
FIG. 17 is a view schematically showing an alignment device.
Figure 19:
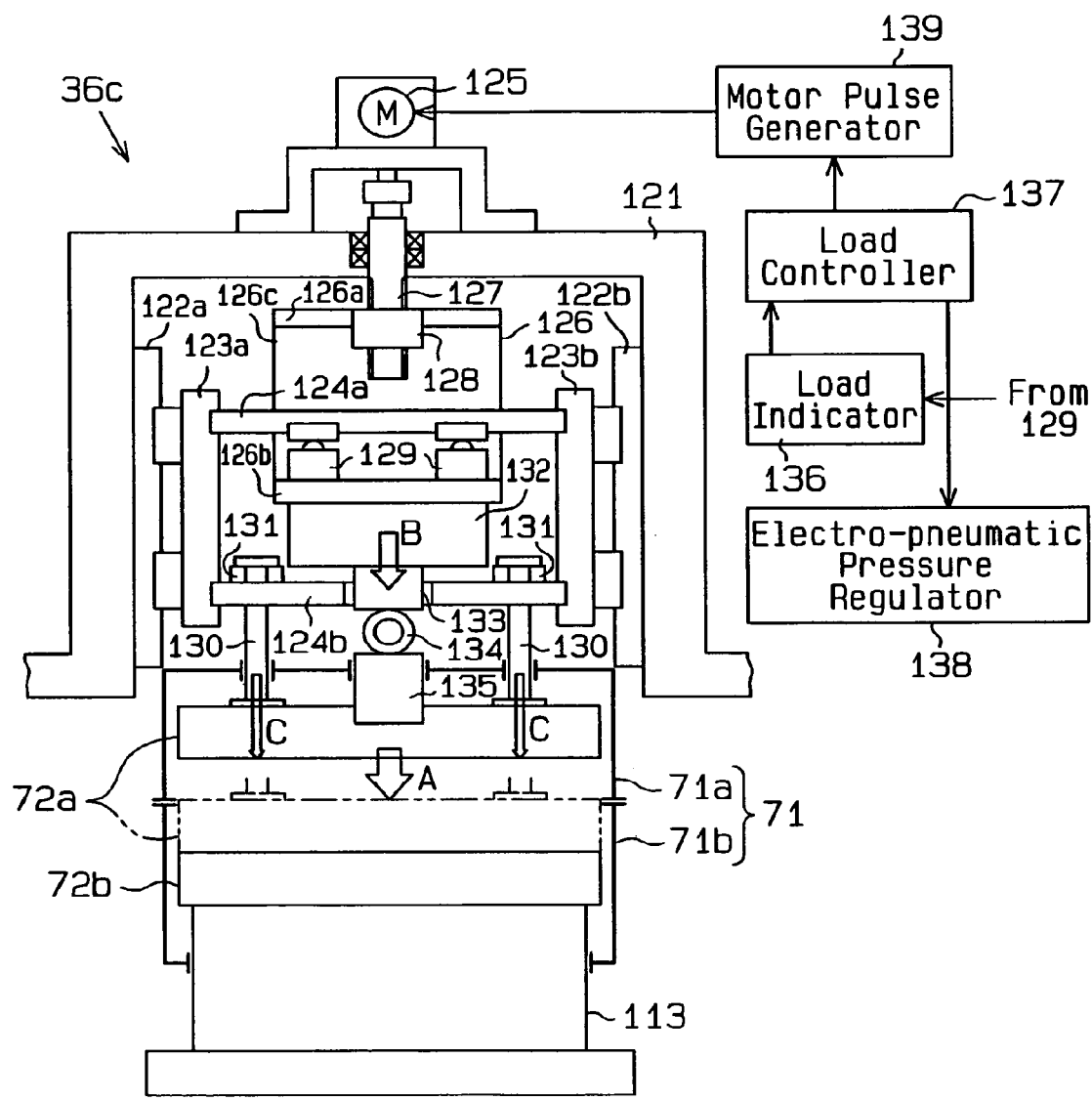
FIG. 19 is a view schematically showing a pressing device.
Figure 22:
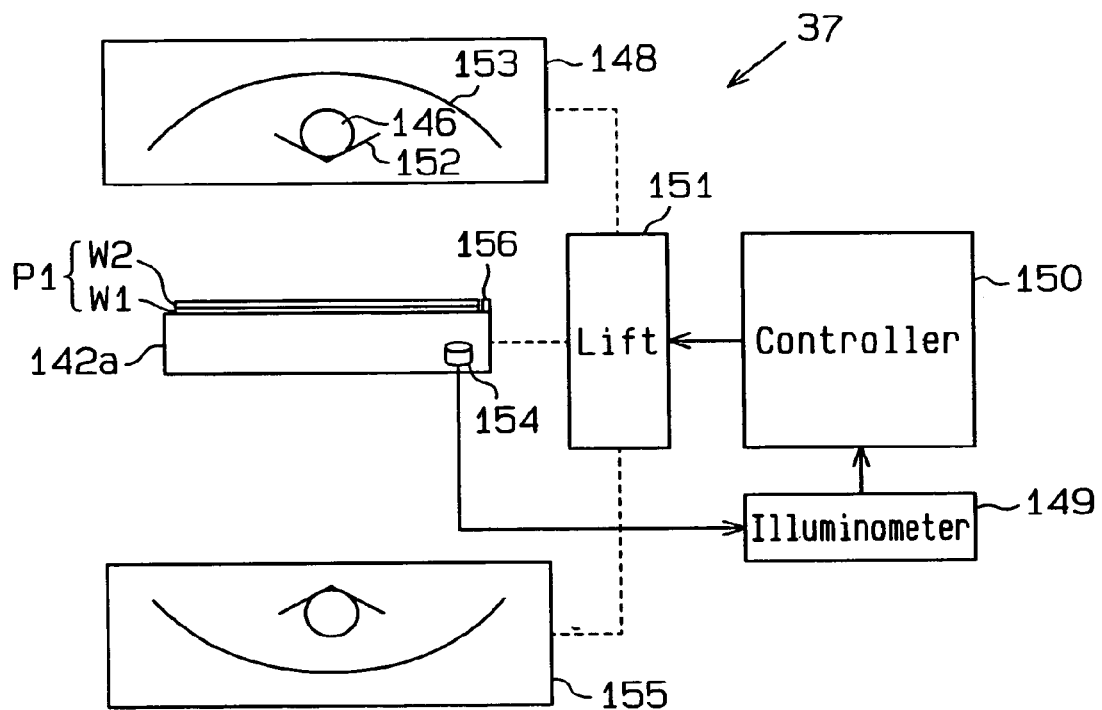
FIG. 22 is a view schematically showing a seal hardening device.
Figure 27:
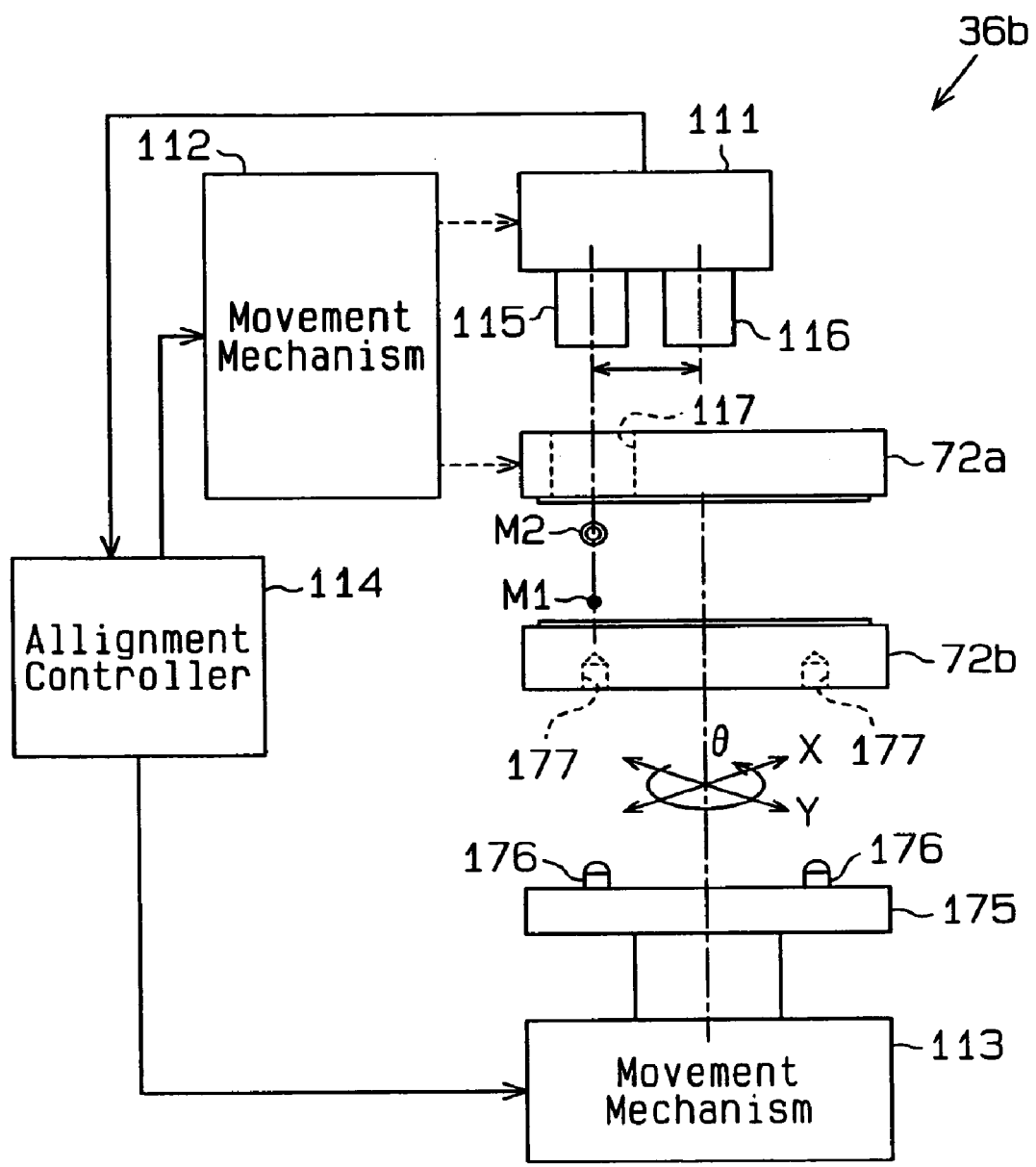
FIG. 27 is a view schematically showing a modification of the alignment device of FIG. 17.

The main controller 31 includes a transport controller 48 and a robot controller 49 of FIG. 6, a drip controller 53 of FIG. 7, a temperature controller 60 of FIG. 8A, an attraction controller 84 of FIG. 11, an alignment controller 114 of FIG. 17 or 27, a load controller 137 of FIG. 19, and an irradiation controller 150 of FIG. 22.

The drip device 33, the bonding device 34, the inspection device 35, the pressing device 36, the hardening device 37, and the transport devices 38a-38d will now be described in detail.

First, the transport device 38a, 38b will be described with reference to FIG. 6. The transport device 38a includes a slider 41 that moves a tray 42 in a transport direction. The tray 42 receives the first substrate W1 and the second substrate W2 that includes electrodes and TFTs or a color filter. More specifically, each substrate W1, W2 is placed on the tray 42 such that the side that includes the electrodes faces upward. The first and second substrates W1, W2 each has an identification code (for example, a bar code) I1, I2, respectively, for distinguishing the substrates W1, W2 from each other.

As described, the first and second substrates W1, W2 are fabricated in separate steps before being supplied to the transport device 38a. The transport device 38a transports one first substrate W1 and a corresponding second substrate W2 as a pair to the drip device 33. The first and second substrates W1, W2 thus reach the bonding device 34. This prevents the bonding device 34 from receiving only one substrate W1 or W2 and suspending its operation, thus improving efficiency for manufacturing liquid crystal panel displays.

The transport device 38b includes a slider 43 and a pair of transport robots 44, 45. The slider 43 moves the tray 42 in a predetermined direction. The transport robots 44, 45 receive the first and second substrates W1, W2, respectively. One transport robot (44 or 45) reverses the associated substrate (W1 or W2) such that the electrode side of the first substrate W1 opposes the electrode side of the second substrate W2. In this embodiment, the transport robot 45 reverses the second substrate W2, which does not include the seal. The transport robots 44, 45 then transport the first and second substrates W1, W2 to the pressing device 36 as opposed to each other.

More specifically, the main controller 31 includes a pair of ID code readers 46, 47, the transport controller 48, and the robot controller 49. The ID code readers 46, 47 read out the ID codes I1, I2 of the first and second substrates W1, W2, respectively, and inform the transport controller 48 of the result. In accordance with the result, the transport controller 48 selects the substrate to be reversed (in this embodiment, the second substrate W2) and informs the robot controller 49 of the selection.

As described, the transport robots 44, 45 receive the first and second substrates W1, W2, respectively. Thus, in accordance with the selection of the transport controller 48, the robot controller 49 controls the transport robot 45 to reverse the substrate W2. Accordingly, the electrode side of the first substrate W1 opposes the electrode side of the second substrate W2. The robot controller 49 then controls the transport robots 44, 45 to transport the first and second substrates W1, W2 to the pressing device 36.

The liquid crystal drip device 33 will be described with reference to FIGS. 7, 8, and 9.

As shown in FIG. 7, the drip device 33 includes a dispenser 51, a movement mechanism 52, the drip controller 53, and a measurement device 54. The dispenser 51 includes liquid crystal. The movement mechanism 52 supports the dispenser 51 and moves the dispenser 51 horizontally.

The drip controller 53 controls the dispenser 51 in accordance with a signal from the main controller 31, thus accurately dripping liquid crystal on the first substrate W1. In other words, the drip controller 53 maintains the temperature of liquid crystal in the dispenser 51 at a constant level. The drip controller 53 controls the movement mechanism 52 to move the dispenser 51 to a plurality of positions on the first substrate W1. At each position, the dispenser 51 drips a predetermined amount of liquid crystal. The drip controller 53 then moves the dispenser 51 to a position corresponding to the measurement device 54 and drips liquid crystal through the dispenser 51. The measurement device 54 measures the weight of the liquid crystal dripped by the dispenser 51 and informs the drip controller 53 of the measurement. The drip controller 53 corrects the drip amount of the dispenser 51 in accordance with the measurement such that the dispenser 51 drips a constant amount of liquid crystal. This suppresses the temperature variation of liquid crystal in the dispenser 51. Further, when there is an environmental change, the drip amount of the dispenser 51 is corrected to be the constant value.

As shown in FIG. 8A, the dispenser 51 includes a cylindrical syringe 55, a plunger 56, and a heater 58. Liquid crystal is received in the syringe 55 and is discharged from the syringe 55 when pressed by a plunger 56. The heater 58 heats the liquid crystal LC. The drip controller 53 controls the plunger 56 to apply a certain pressure to the liquid crystal LC. A predetermined amount of liquid crystal LC is thus dripped from a nozzle 57 at the distal end of the syringe 55.

The heater 58 has a substantially annular shape and is located around the outer side of the syringe 55. A thermocouple 59 is located near the distal end of the syringe 55 to measure the temperature of the liquid crystal LC. The heater 58 and the thermocouple 59 are connected to the temperature controller 60 located in the drip controller 53. The temperature controller 60 determines the temperature of the liquid crystal LC in accordance with a signal from the thermocouple 59 and controls the heater 58 to maintain the temperature of the liquid crystal LC at a constant level.

Figure 8B:
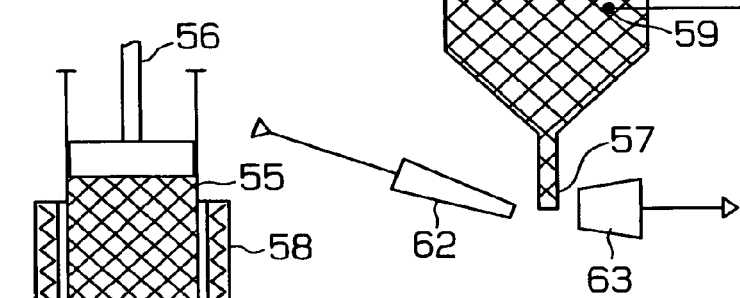
Figure 8C:
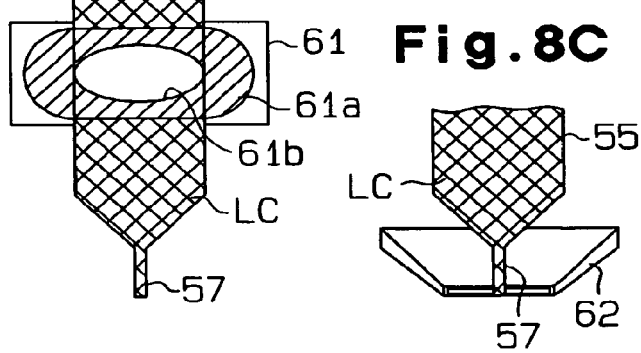

The syringe 55 includes a rotary valve 61 that has a cylindrical rotary body 61a. The rotary body 61a extends through the syringe 55 in a direction perpendicular to the axis of the syringe 55. The rotary body 61a rotates around the axis of the syringe 55. As shown in FIG. 8B, a valve hole 61b is formed in the rotary body 61a. The diameter of the valve hole 61b is substantially equal to the inner diameter of the syringe 55. The drip controller 53 controls the position at which the rotary valve 61 rotates.

That is, if the drip controller 53 rotates the rotary body 61a such that the axis of the valve hole 61b corresponds to the axis of the syringe 55, an upper section of the syringe 55 is connected integrally to a distal section of the syringe 55. This transmits the pressure of the plunger 56 to the distal end of the syringe 55 without causing any loss. The pressure acts to drip the liquid crystal LC from the nozzle 57.

In contrast, if the drip controller 53 rotates the rotary body 61a such that the axis of the valve hole 61b becomes substantially perpendicular to the axis of the syringe 55, the upper section of the syringe 55 is disconnected from the distal end of the syringe 55. This reduces the pressure applied to the liquid crystal LC by the plunger 56. Further, air is prevented from entering the syringe 55 through the nozzle 57 when the plunger 56 is raised. Thus, the liquid crystal LC is dripped from the nozzle 57 without forming bubbles.

Further, the rotary valve 61 automatically supplies the liquid crystal LC to the syringe 55. For example, a liquid crystal reservoir (not shown) is connected to a section between the plunger 56 and the rotary valve 61 through a supply passage. When the rotary valve 61 is closed and the plunger 56 is raised, the liquid crystal LC is introduced from the reservoir to the syringe 55. The liquid crystal LC is thus automatically supplied to the syringe 55 without stopping the operation of the dispenser 51. Further, in this state, the rotary valve 61 in the closed state prevents air from entering the syringe 55 through the nozzle 57, suppressing bubble formation. The rotary valve 61 may be replaced by a valve body that moves horizontally and has a valve hole with a diameter substantially equal to the inner diameter of the syringe 55.

An air blower 62 and an air drawer 63 are located at opposite sides of the nozzle 57 of the syringe 55. The air blower 62 is connected to a compressor (not shown) and has a lateral elongated outlet (see FIG. 8C). The air blower 62 blows air to form an air curtain in a direction perpendicular to the drip direction of the liquid crystal LC, or the axis of the nozzle 57. The air curtain blows away excessive liquid crystal LC from the distal end of the nozzle 57.

Figure 8D:
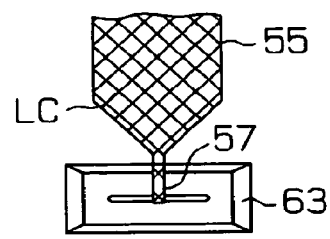

The air drawer 63, or an air inlet, is connected to a vacuum pump (not shown) and includes a lateral elongated inlet (see FIG. 8D). The air drawer 63 thus draws and collects the air and the liquid crystal LC blown by the air blower 62. The air drawer 63 also draws the liquid crystal LC from the distal end of the nozzle 57. The air flow (the air curtain) from the air blower 62 to the air drawer 63 efficiently blows away the excessive liquid crystal from the distal end of the nozzle 57 and collects the same. In this manner, the nozzle 57 is constantly cleaned, thus maintaining the drip amount of the liquid crystal LC as accurate.

The drip controller 53 actuates the air blower 62 and the air drawer 63 during a waiting period of the dispenser 51 (for example, when the dispenser 51 is being moved from one drip position to another for a subsequent drip). This maintains the drip amount of the liquid crystal LC as accurate. Further, the excessive liquid crystal LC is prevented from accidentally dripping on the corresponding side of the first substrate W1.

The dispenser 51 does not necessarily have to include the air blower 62 and the air drawer 63 but may include only the air drawer 63. This structure also prevents the first substrate W1 from being contaminated by the excessive liquid crystal LC. Further, the drip amount of the liquid crystal LC is maintained as accurate.

That is, the heater 58, the rotary valve 61, the air blower 62, and the air drawer 63 that are provided in the dispenser 51 form a drip amount equalizing device.

Figure 9:
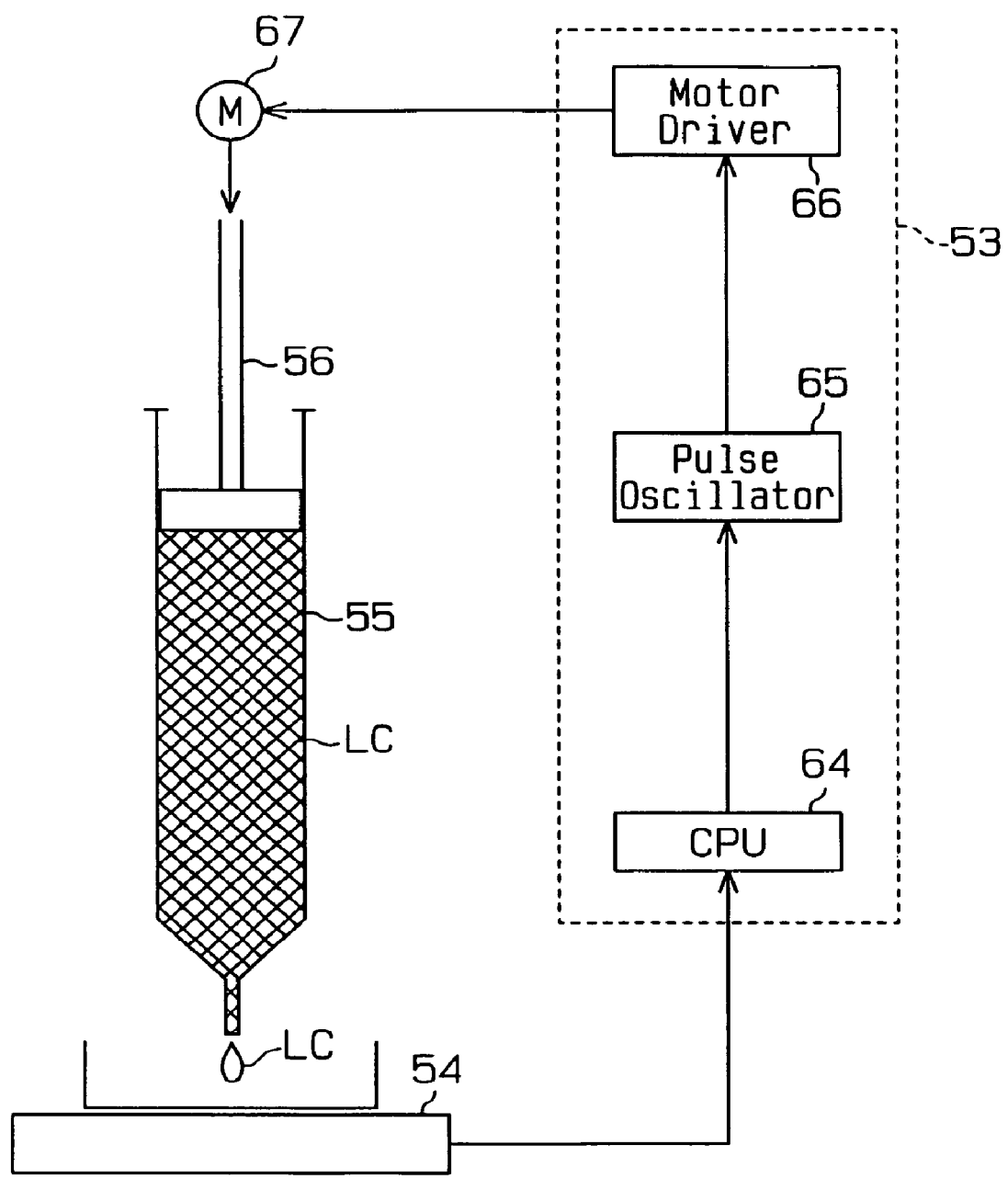
FIG. 9 is a diagram schematically showing dripping of liquid crystal.

As shown in FIG. 9, the measurement device 54 is preferably an electronic balance. The measurement device 54 measures the weight of the liquid crystal LC dripped by the dispenser 51 and informs the drip controller 53 of the measurement.

The drip controller 53 includes a central processing unit (CPU) 64, a pulse oscillator 65, and a motor driver 66. The CPU 64 sends a control signal that represents the weight of the liquid crystal LC measured by the measurement device 54 to the pulse oscillator 65. The pulse oscillator 65 generates a pulse signal in accordance with the control signal and sends the pulse signal to the motor driver 66. The motor driver 66 generates a drive signal for a motor 67 in accordance with the pulse signal. It is preferred that the motor 67 is a pulse motor that selectively raises and lowers the plunger 56, depending on the drive signal. If the motor 67 lowers the plunger 56, the liquid crystal LC is dripped. The drip amount of the liquid crystal LC thus corresponds to the operation amount of the plunger 56.

More specifically, the CPU 64 calculates the drip amount of the liquid crystal LC based on the measurement of the measurement device 54. The CPU 64 then corrects the control signal to maintain the drip amount of the liquid crystal LC as a constant value. The CPU 64 sends the corrected control signal to the pulse oscillator 65. This prevents the drip amount of the liquid crystal LC from being altered due to a change in the condition (such as the viscosity) of the liquid crystal LC or a change in the operation amount of the plunger 56 (due to, for example, friction of the plunger 56 or the condition of the motor 67). The liquid crystal LC is thus continuously dripped automatically.

The transportation of the first and second substrates W1, W2 to the pressing device 36 will be described with reference to FIG. 10.

The vacuum chamber 71 of the pressing device 36 includes an upper lid 71a and a lower lid 71b. A drive mechanism (not shown) movably supports the upper lid 71a. When the drive mechanism lifts the upper lid 71a from the lower lid 71b, the vacuum chamber 71 becomes open.

As described, in the vacuum chamber 71, the upper chuck unit 72a and the lower chuck unit 72b support the second substrate W2 and the first substrate W1, respectively. A first movement mechanism 112 (FIG. 17) supports the upper chuck unit 72a and selectively lifts and lowers the upper chuck unit 72a. A second movement mechanism 113 (FIG. 17) supports the lower chuck unit 72b and moves the lower chuck unit 72b horizontally (in a direction X and a direction Y). The second movement mechanism 113 also rotates the lower chuck unit 72b horizontally (in a direction θ).

The lower lid 71b includes a plurality of lift pins 73 that are raised and lowered. The transport robot 44 first places the first substrate W1 on the distal ends of the lift pins 73 that are held at a raised position. The lift pins 73 are then lowered to place the first substrate W1 on the lower chuck unit 72b, thus allowing the lower chuck unit 72b to attract the first substrate W1.

The upper lid 71a includes a pair of arms 74. The transport robot 45 first passes the second substrate W2 to the arms 74. In this state, the upper chuck unit 72a attracts the second substrate W2.

Figure 10:
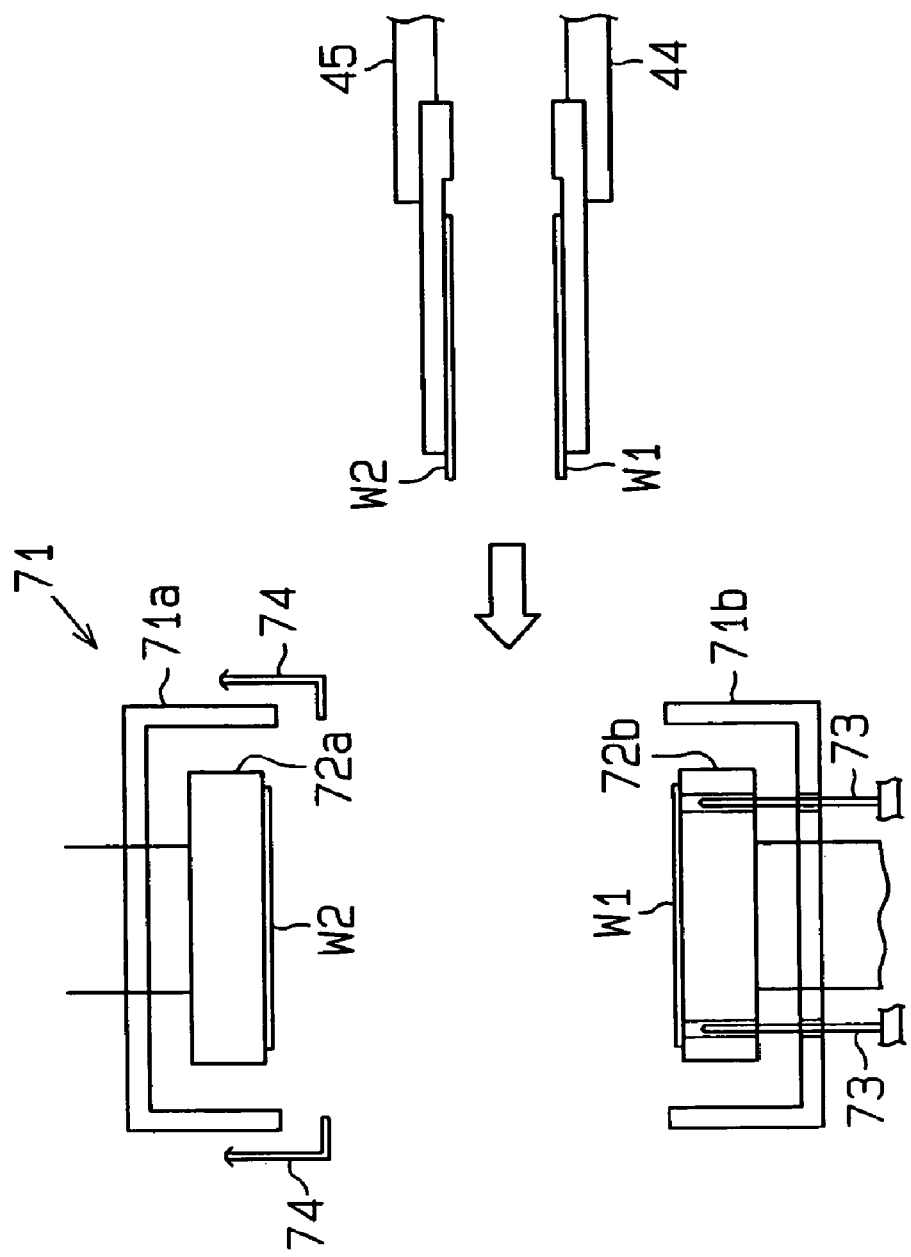
FIG. 10 is a view schematically showing a transport device that transports a substrate to a vacuum chamber.

The lower side of the upper chuck unit 72a (an upper attraction side) and the upper side of the lower chuck unit 72b (a lower attraction side), as viewed in FIG. 10, are flattened through machining. It is preferred that the flatness of each attraction side is 100 micrometers or smaller. The attraction sides are adjusted to be parallel with each other when the upper and lower chuck units 72a, 72b oppose each other. It is preferred that a parallel level between the attraction sides is 50 micrometers or smaller. The term "parallel level" is defined as a dimension of a space between the upper and lower attraction sides when the attraction sides contact each other. If the attraction sides are entirely parallel, the attraction sides form no space when contacting each other. In this state, the parallel level is defined as zero. However, if the attraction sides are only partially parallel, a space is formed between the attraction sides. In this case, the parallel level is defined as greater than zero. The greater the parallel level is, the larger the space is.

Next, the operation of the upper and lower chuck units 72a, 72b will be described.

As shown in FIG. 11, the upper chuck unit 72a includes an upper holding plate 75a and an upper electrostatic chuck 76a attached to the upper holding plate 75a. An upper attraction line 77a is formed in the upper chuck unit 72a for attracting the second substrate W2 through vacuum (using a difference in pressure). The upper attraction line 77a includes a plurality of upper attraction holes, an upper horizontal passage, and a plurality of upper discharge passages. The upper attraction holes open at the lower side, or the attraction side, of the upper electrostatic chuck 76a. The upper horizontal passage extends laterally in the upper holding plate 75a and is connected to the upper attraction holes. Each upper discharge passage extends from the upper horizontal line in an upward direction. The upper attraction line 77a is connected to a vacuum pump 79a through a depressurization line 78a. A depressurization valve 80a is located in the depressurization line 78a and is connected to the attraction controller 84.

The depressurization line 78a is connected to the vacuum chamber 71 through a pair of pressure equilibration lines 81a. Each pressure equilibration line 81a includes a pressure equilibration valve 82a. A pressure sensor 83a is located in the depressurization line 78a. The pressure sensor 83a measures the pressure in the depressurization line 78a and informs the attraction controller 84 of the measurement.

The lower chuck unit 72b includes a lower holding plate 75b and a lower electrostatic chuck 76b attached to the lower holding plate 75b. A lower attraction line 77b is formed in the lower chuck unit 72b for attracting the first substrate W1 through vacuum. The lower attraction line 77b includes a plurality of lower attraction holes, a lower horizontal passage, and a plurality of lower discharge passages. The lower attraction holes open at the upper side, or the attraction side, of the lower electrostatic chuck 76b. The lower horizontal passage extends laterally in the lower holding plate 75b and is connected to the lower attraction holes. Each lower discharge passage extends from the lower horizontal line in a downward direction. The lower attraction line 77b is connected to a vacuum pump 79b through a depressurization line 78b. A depressurization valve 80b is located in the depressurization line 78b and is connected to the attraction controller 84.

The depressurization line 78b is connected to the vacuum chamber 71 through a pair of pressure equilibration lines 81b. Each pressure equilibration line 81b includes a pressure equilibration valve 82b. A pressure sensor 83b is located in the depressurization line 78b. The pressure sensor 83b measures the pressure in the depressurization line 78b and informs the attraction controller 84 of the measured value.

The vacuum chamber 71 is connected to a vacuum pump 86 through a line 85 that has a valve 87. The vacuum pump 86 depressurizes the vacuum chamber 71. The attraction controller 84 controls the vacuum pump 86 and the valve 87 to adjust the pressure in the vacuum chamber 71. A pressure sensor 88 is located in the vacuum chamber 71 to measure the pressure in the vacuum chamber 71. The pressure sensor 88 is connected to the attraction controller 84.

When the attraction controller 84 actuates the vacuum pumps 79a, 79b to open the depressurization valves 80a, 80b, each depressurization line 78a, 78b and the associated attraction line 77a, 77b are depressurized. This attracts each substrate W2, W1 to the associated chuck unit 72a, 72b through vacuum. If the attraction controller 84 applies voltage to the upper and lower electrostatic chucks 76a, 76b, each electrostatic chuck 76a, 76b generates Coulomb force. The force acts to electrostatically attract the second and first substrates W2, W1 to the associated chuck units 72a, 72b.

The attraction controller 84 switches between a vacuum attraction mode and an electrostatic attraction mode, depending on the pressure (the vacuum level) in the vacuum chamber 71.

In other words, the attraction controller 84 opens the vacuum chamber 71 to receive the first and second substrates W1, W2, as shown in FIG. 10. The attraction controller 84 then actuates the vacuum pumps 79a, 79b, thus enabling each chuck unit 72a, 72b to attract the associated substrate W2, W1. Subsequently, the attraction controller 84 closes the vacuum chamber 71 and controls the vacuum pump 86 and the valve 87 to reduce the pressure in the vacuum chamber 71. The attraction controller 84 detects the pressure in the vacuum chamber 71 and the pressure in each depressurization line 78a, 78b in accordance with detection signals from the pressure sensors 83a, 83b, and 88. When the pressure in the vacuum chamber 71 reaches a predetermined level, the attraction controller 84 applies voltage to the electrostatic chucks 76a, 76b to generate Coulomb force. This electrostatically attracts each substrate W2, W1 to the associated electrostatic chuck 76a, 76b. Before the pressure in the vacuum chamber 71 becomes equal to or lower than the pressure in each depressurization line 78a, 78b, or, preferably, when the pressure in the vacuum chamber 71 reaches the predetermined level (and the electrostatic attraction mode is started), the attraction controller 84 closes the depressurization valves 80a, 80b and opens the pressure equilibration valves 82a, 82b in the pressure equilibration lines 81a, 81b. This equilibrates the pressure in each depressurization line 78a, 78b and the pressure in the associated attraction line 77a, 77b with the pressure in the vacuum chamber 71.

If the pressure in the vacuum chamber 71 becomes lower than the pressure in each depressurization line 77a, 77b when each electrostatic chuck 76a, 76b holds the associated substrate W2, W1 through vacuum, gas flows from the depressurization lines 77a, 77b to the vacuum chamber 71. In this case, the second substrate W2 separates from the upper chuck unit 72a, and the first substrate W1 may possibly move relative to the lower chuck unit 72b. These problems are avoided if the attraction controller 84 switches between the vacuum attraction mode and the electrostatic attraction mode in accordance with the pressure (the vacuum level) in the vacuum chamber 71.

Figure 12C:
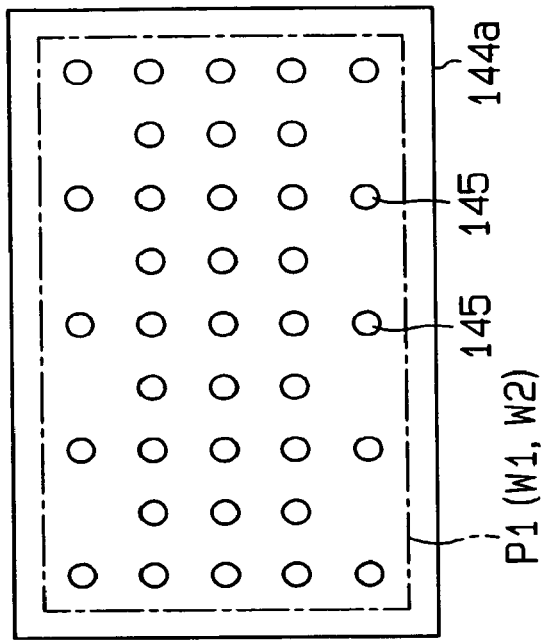
FIGS. 12C and 12D are views schematically showing a flat plate of FIG. 21.
Figure 12D:
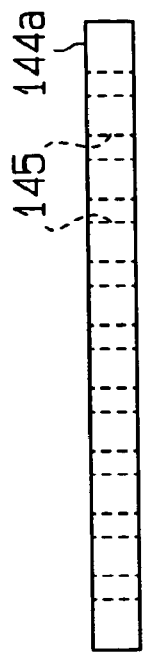
Figure 12A:
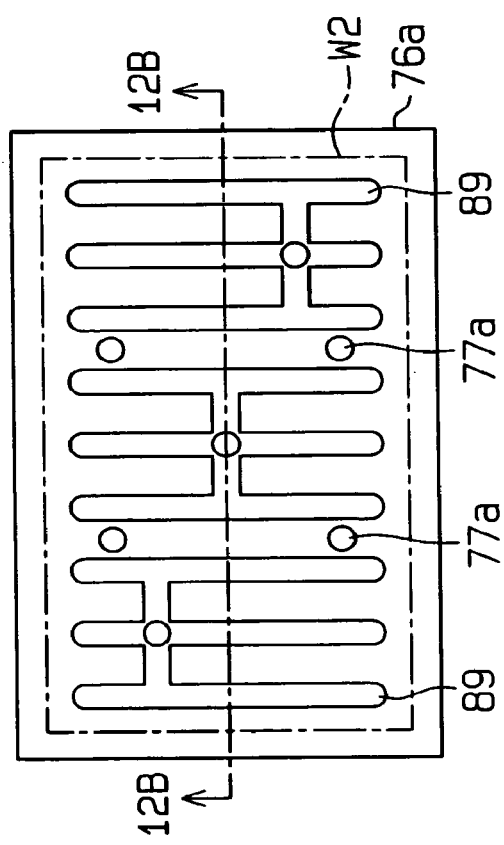
FIGS. 12A and 12B are views schematically showing an attraction side of the electrostatic chuck.
Figure 12B:
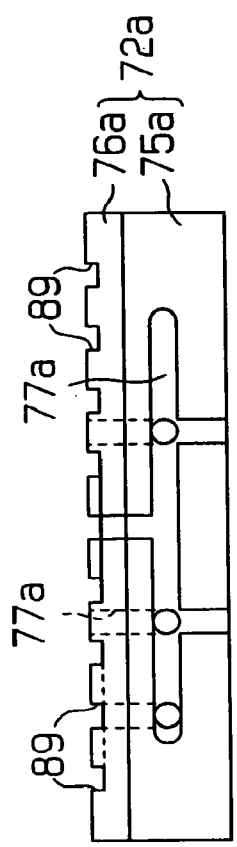

As shown in FIGS. 12A and 12B, a plurality of attraction grooves 89 are formed in the attraction side of the upper electrostatic chuck 76a. The position of each attraction groove 89 corresponds to the second substrate W2 when the upper electrostatic chuck 76a attracts the substrate W2. It is preferred that the depth of each groove 89 is half of the lateral dimension of the groove 89.

Each attraction groove 89 prevents gas from being trapped between the attraction side of the upper electrostatic chuck 76a and the second substrate W2. Thus, even if the pressure in the vacuum chamber 71 is reduced, the second substrate W2 neither separates from the upper electrostatic chuck 72a nor moves respective to the electrostatic chuck unit 72a.

The attraction grooves 89 are aligned parallel with each other. Accordingly, as compared the case in which the grooves 89 are arranged in a crossed manner, waviness in the second substrate W2 is suppressed.

The attraction grooves 89 reduce the contact area between the attraction side of the upper electrostatic chuck 76a and the second substrate W2. That is, without the grooves 89, the upper electrostatic chuck 76a attracts and contacts the entire corresponding side of the second substrate W2. In this case, if pressure is applied to the second substrate W2, the second substrate W2 shrinks, thus accumulating reactive force in the substrate W2 with respect to the attraction force of the upper electrostatic chuck 76a. The reactive force is released when separating the bonded substrates W2, W1 from the upper electrostatic chuck 76a. This misaligns the bonded substrates W1, W2. However, the attraction grooves 89 prevent the second substrate W2 from expanding or shrinking when the pressure is applied to the substrate W2 held by the upper electrostatic chuck 76a. As a result, the bonded substrates W1, W2 are maintained as aligned.

Although not illustrated, the attraction grooves 89 are formed in the attraction side of the lower electrostatic chuck 76b, like those of the attraction side of the upper electrostatic chuck 76a. This structure prevents the first substrate W1 from separating from or moving relative to the lower electrostatic chuck 76b and being deformed.

The electrostatic attraction mode of the upper electrostatic chuck 76a will hereafter be described.

Figure 13A:
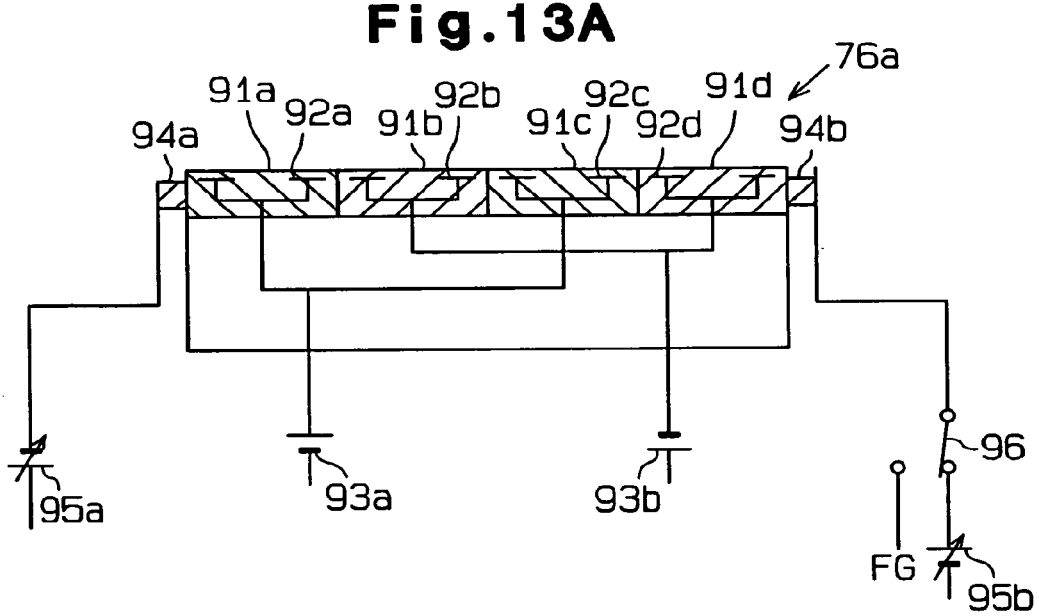
FIGS. 13A and 13B are cross-sectional views schematically showing the electrostatic chuck.

FIG. 13A is a block diagram schematically showing the electric circuit of the upper electrostatic chuck 76a. The upper electrostatic chuck 76a includes a plurality of dielectric layers that are applied on the upper holding plate 75a. In this embodiment, the upper electrostatic chuck 76a has four dielectric layers, or first, second, third, and fourth dielectric layers 91a, 91b, 91c, 91d. First, second, third, and fourth electrodes 92a, 92b, 92c, 92d are embedded in the first to fourth dielectric layers 91a-91d, respectively. In each dielectric layer 91a-91d, the interval between the attraction side of the upper electrostatic chuck 76a and the associated electrode 92a-92d (the electrode embedding depth) is preferably one millimeter or more.

The first and third electrodes 92a, 92c are connected to a first attraction power source 93a, and the second and fourth electrodes 92b, 92d are connected to a second attraction power source 93b. In other words, adjacent electrodes 92a-92d are connected to different power sources, or the first and second attraction power sources 93a, 93b.

The attraction controller 84 controls the first and second attraction power sources 93a, 93b. The first attraction power source 93a applies positive voltage to the first and third electrodes 92a, 92c. The second attraction power source 93b applies negative voltage to the second and fourth electrodes 92b, 92d. This causes a relatively high potential difference between the first and second electrodes 92a, 92b and between the third and fourth electrodes 92c, 92d. That is, the attraction controller 84 controls the first and second attraction power sources 93a, 93b to vary the attraction force of the upper electrostatic chuck 76a in a stepped manner. This makes it easy for the upper electrostatic chuck 76a to selectively attract and separate the second substrate W2.

As viewed in FIG. 13A, first and second conductive connectors 94a, 94b are connected to opposite lateral sides of the upper electrostatic chuck 76a, or the left side of the first dielectric layer 91a and the right side of the fourth dielectric layer 91d, respectively. The first conductive connector 94a is connected to a switching power source 95a. The second conductive connector 94b is connected to a switching power source 95b through a switch 96.

The switch 96 includes a common terminal, a first connecting terminal, and a second connecting terminal. The common terminal is connected to the second conductive connector 94b. The first connecting terminal is connected to a frame ground FG. The second connecting terminal is connected to the switching power source 95b.

The attraction controller 84 supplies voltage to the switching power sources 95a, 95b, thus controlling the output voltage of the switching power sources 95a, 95b in a stepped manner in accordance with the voltage supply. This activates an electric charge that is generated by the electrostatic force of the upper electrostatic chuck 76a. More specifically, when separating the second substrate W2 from the upper electrostatic chuck 76a, the attraction controller 84 nullifies the voltage supply. The attraction controller 84 then controls the switch 96 to connect the second conductive connector 94b to the frame ground FG or generates an electric current that flows from the switching power source 95b to the switching power source 95a through the fourth to first dielectric layers 91d-91a and the first conductive connector 94a. This cancels the electric charge accumulated in the first to fourth dielectric layers 91a-91d during the attraction of the upper electrostatic chuck 76a. Accordingly, even if the interval between the second substrate W2 and the attraction side of the upper electrostatic chuck 76a is increased, separation charge (discharge) is prevented from being caused by a rapid increase in the voltage generated by the accumulated electric charge (or the potential difference between the second substrate W2 and the upper electrostatic chuck 76a). Accordingly, the circuit components such as the TFTs and patterns formed on the second substrate W2 (and the first substrate W1), are maintained as undamaged, thus suppressing a defect in the bonded substrates W1, W2.

Figure 14A:
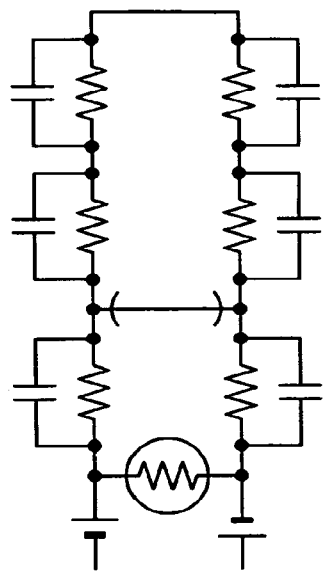
FIGS. 14A and 14B are block diagrams showing an equivalent circuit of the electrostatic chuck.

FIG. 14A is a block diagram showing the equivalent circuit formed on the first to fourth dielectric layers 91a-91d, the second substrate W2, and the contact surfaces between the dielectric layers 91a-91d and the second substrate W2. Although the equivalent circuit of FIG. 14A is considered as infeasible for the second substrate W2 formed of a substantially insulating material, or glass, the applicant of the present invention has confirmed that the second substrate W2 actually forms the equivalent circuit as illustrated. That is, the second substrate W2 includes resistance and capacitor components. Thus, although the second substrate W2 is formed of the insulating material, the second substrate W2 is attracted to the electrostatic chuck 76a.

Figure 14B:
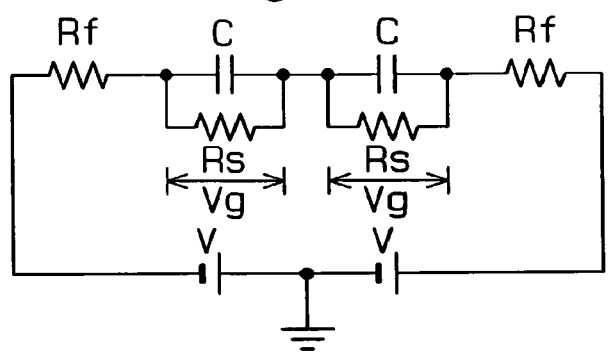

FIG. 14B is a block diagram for explaining the attraction of the upper electrostatic chuck 76a. In the drawing, the reference index V indicates a voltage supply, Vg indicates a voltage that acts to attract the second substrate W2 to the upper electrostatic chuck 76a, Rf indicates the film resistance of each dielectric layer 91a-91d, Rs indicates the contact resistance between each dielectric layer 91a-91d and the second substrate W2, and C indicates the capacitance between the second substrate W2 and the attraction side of the upper electrostatic chuck 76a. The voltage Vg is obtained by the following equation:

$$Vg=(Rs/(Rf+Rs))\times V$$

Figure 13B:
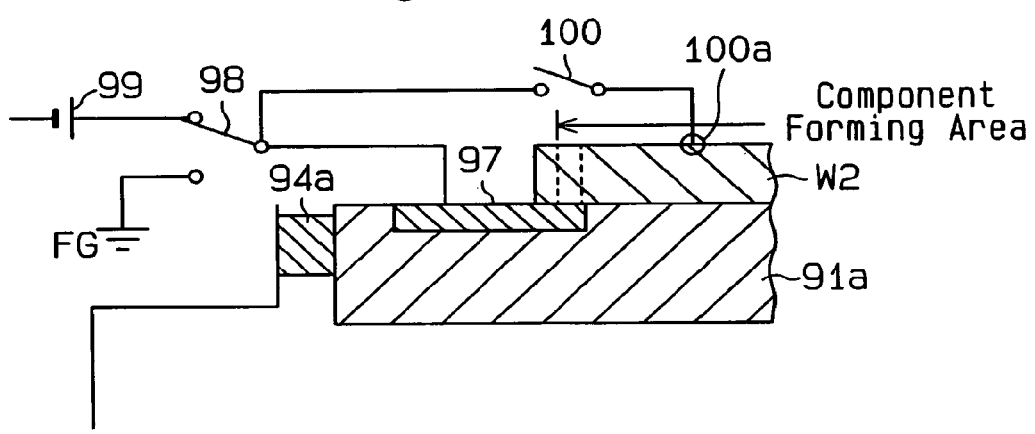

FIG. 13B shows a modification of the electric circuit of the upper electrostatic chuck 76a for suppressing the separation charge. The drawing corresponds to the left end portion of the upper electrostatic chuck 76a in FIG. 13A.

As shown in FIG. 13B, a conductive body 97 is embedded in a surface (attraction side) of the dielectric layer 91a to contact the second substrate W2. More specifically, the conductive body 97 is located along a corresponding side of the second substrate W2. In this manner, as viewed in FIG. 13B, a lateral portion of the conductive body 97 corresponds to the circuit component forming area (the area in which the circuit components and wiring are located) of the second substrate W2. The conductive body 97 is connected to a frame ground FG through a switch 98.

To separate the second substrate W2 from the upper electrostatic chuck 76a, the attraction controller 84 controls the switch 98 to connect the conductive body 97 to the frame ground FG. Accordingly, the electric charge accumulated in the dielectric layer 91a and the second substrate W2 during the attraction of the upper electrostatic chuck 76a escape to the frame ground FG. The second substrate W2 thus easily separates from the upper electrostatic chuck 76a. This prevents the separation charge from occurring, and the second substrate W2 is prevented from being damaged (neither the circuit components nor the wiring of the second substrate W2 are damaged).

The switch 98 may be connected to a switching power source 99 instead of the frame ground FG. The attraction controller 84 generates an electric current that flows from the switching power source 99 to the conductive body 97 through the switch 98, thus canceling the electric charge in the dielectric layer 91a and the second substrate W2. Accordingly, the second substrate W2 separates easily from the upper electrostatic chuck 76a, thus preventing the separation charge from occurring. As a result, also in this case, the second substrate W2 is prevented from being damaged.

The conductive body 97 is connected to the wiring of the second substrate W2 through a switch 100 and a contact pin 100a. When the upper electrostatic chuck 76a electrostatically attracts the second substrate W2, one side of the second substrate W2 is charged positive and the other side of the second substrate W2 is charged negative. However, since the electric charge in the second substrate W2 are canceled when the switch 100 is turned on, the second substrate W2 easily separates from the dielectric layer 91a. Further, the separation charge is stopped from occurring by turning on the switch 100, thus preventing the second substrate W2 (the circuit components and wiring of the second substrate W2) from being damaged.

Also, the switch 98 connects the conductive body 97 selectively to the frame ground FG or the power source 99 to prevent the separation charge from occurring.

Figure 15:
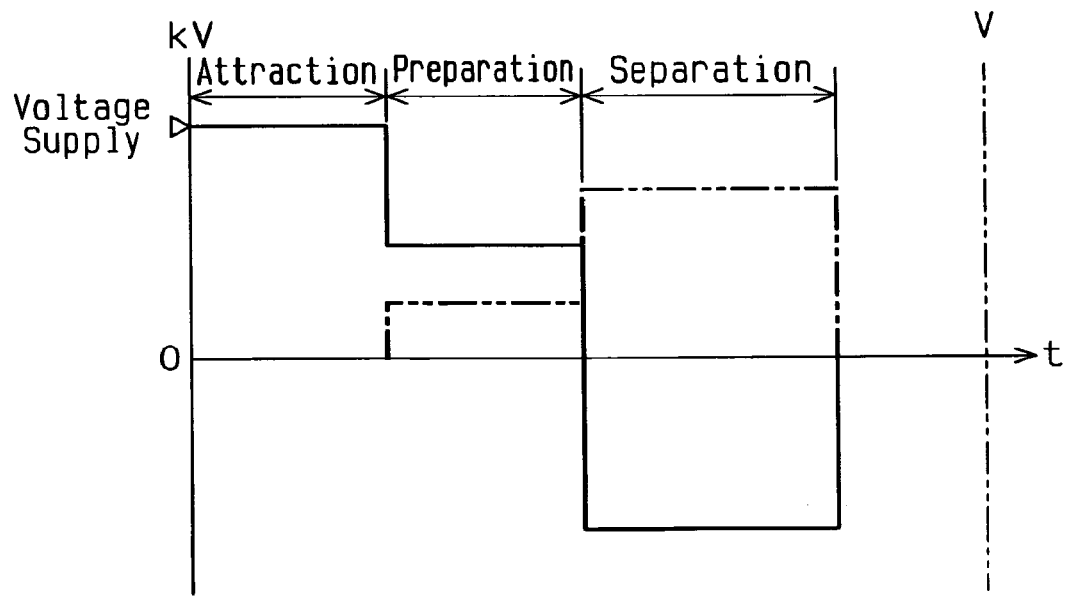
FIG. 15 is a timing chart showing variation in waveforms of voltage applied to the electrostatic chuck.

FIG. 15 is a timing chart showing variation in waveforms of voltage supplied to the upper electrostatic chuck 76a. In the chart, the solid line represents a first voltage supplied by the first and second attraction power sources 93a, 93b of FIG. 13A. The first voltage is plotted along the left vertical axis (unit: kV) of the chart, as viewed in FIG. 15. The double-dotted broken line represents the voltage supplied by the switching power sources 95a, 95b. This voltage is plotted along the right axis (unit: V) of the chart.

As shown in FIG. 15, in an attraction period, the attraction controller 84 controls the first and second attraction power sources 93a, 93b to supply the dielectric layers 91a-91d with the first voltage that is sufficiently large to electrostatically attract the second substrate W2. Subsequently, in a preparation period, the attraction controller 84 lowers the first voltage and controls the switching power sources 95a, 95b to supply a relatively low preparation voltage to the dielectric layers 91a-91d. Finally, in a separation period, the attraction controller 84 reduces the first voltage to a negative value and controls the switching power sources 95a, 95b to supply a relatively high separation voltage to the dielectric layers 91a-91d. The separation period corresponds to the time needed for activating the electric charge in the dielectric layer 91a-91d and the second substrate W2 and is determined through, for example, an experiment.

In this manner, the second substrate W2 is separated from the upper electrostatic chuck 76a simply in accordance with the prescribed periods. That is, it is unnecessary to detect the electric charge accumulated in the dielectric layers 91a-91d and the second substrate W2. Further, a rapid voltage increase is suppressed, and the electric charge is prevented from remaining in the dielectric layers 91a-91d and the second substrate W2. This makes it easy to separate the second substrate W2 from the upper electrostatic chuck 76a. In addition, the separation charge is stopped from occurring, thus preventing the second substrate W2 (the circuit components and wiring of the second substrate W2) from being damaged.

Although not illustrated, the lower electrostatic chuck 76b is identical to the upper electrostatic chuck 76a. The attraction controller 84 supplies voltage to the lower electrostatic chuck 76b to control the lower electrostatic chuck 76b.

The separation of each substrate W1, W2 from the associated electrostatic chuck 76b, 76a will hereafter be described with reference to FIGS. 16A, 16B, 16C.

Figure 16A:
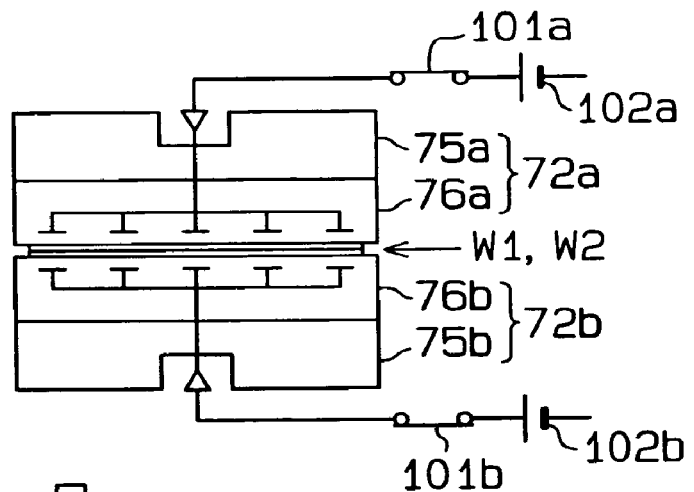
FIGS. 16A, 16B, and 16C are views schematically showing a process for separating substrates.

As shown in FIG. 16A, to press the first and second substrates W1, W2 to each other (during the attraction period), the attraction controller 84 turns on an upper switch 101a and a lower switch 101b. An upper attraction power source 102a and a lower attraction power source 102b thus supply voltage to the upper and lower electrostatic chucks 76a, 76b, respectively. Each attraction power source 102a, 102b includes the first and second attraction power sources 93a, 93b of FIG. 13A.

Figure 16B:
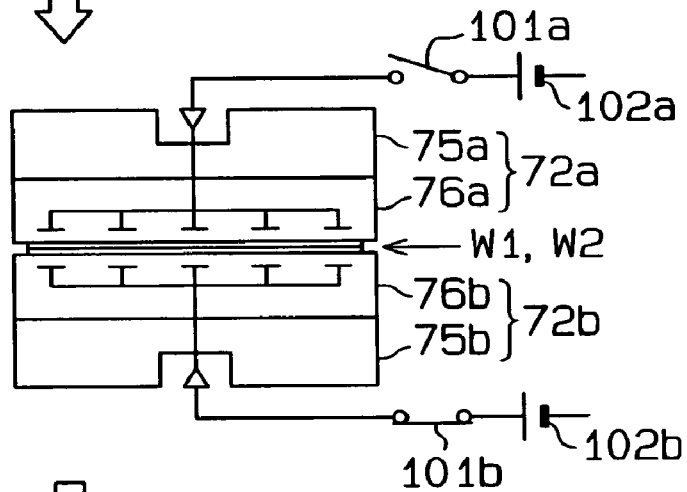

In the preparation period, as shown in FIG. 16B, the attraction controller 84 turns off the upper switch 101a, thus nullifying the voltage supply to the upper electrostatic chuck 76a.

Figure 16C:
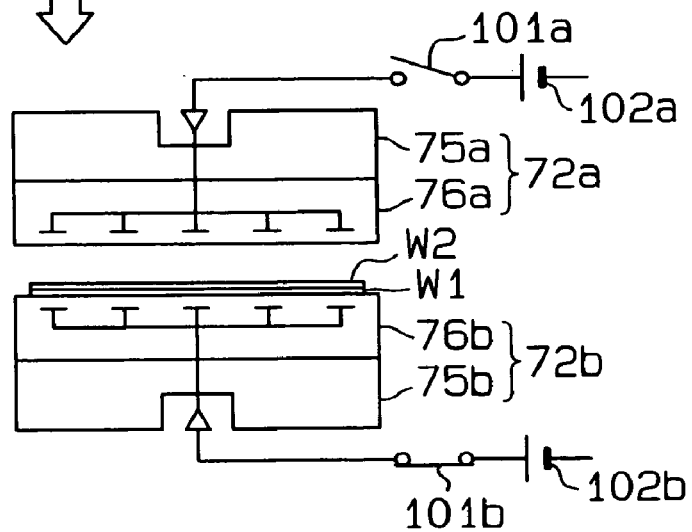

In the separation period, as shown in FIG. 16C, the attraction controller 84 maintains the lower switch 101b in a turned-on state and raises the upper chuck unit 72a. In this state, the lower power source 102b continuously supplies voltage to the lower electrostatic chuck 76b. Thus, the lower chuck unit 72b attracts the first and second substrates W1, W2, thus preventing the substrates W1, W2 from moving relative to each other. Further, the second substrate W2 easily separates from the upper electrostatic chuck 76a, and the upper chuck unit 72a easily separates from the lower chuck unit 72b.

After raising the upper chuck unit 72a, the attraction controller 84 opens the vacuum chamber 71 of FIG. 11, thus introducing the atmospheric air to the vacuum chamber 71. In this state, the lower chuck unit 72b continuously attracts the bonded substrates W1, W2 electrostatically. This prevents each substrate W1, W2 from being deformed due to the pressure variation in the vacuum chamber 71.

Figure 18:
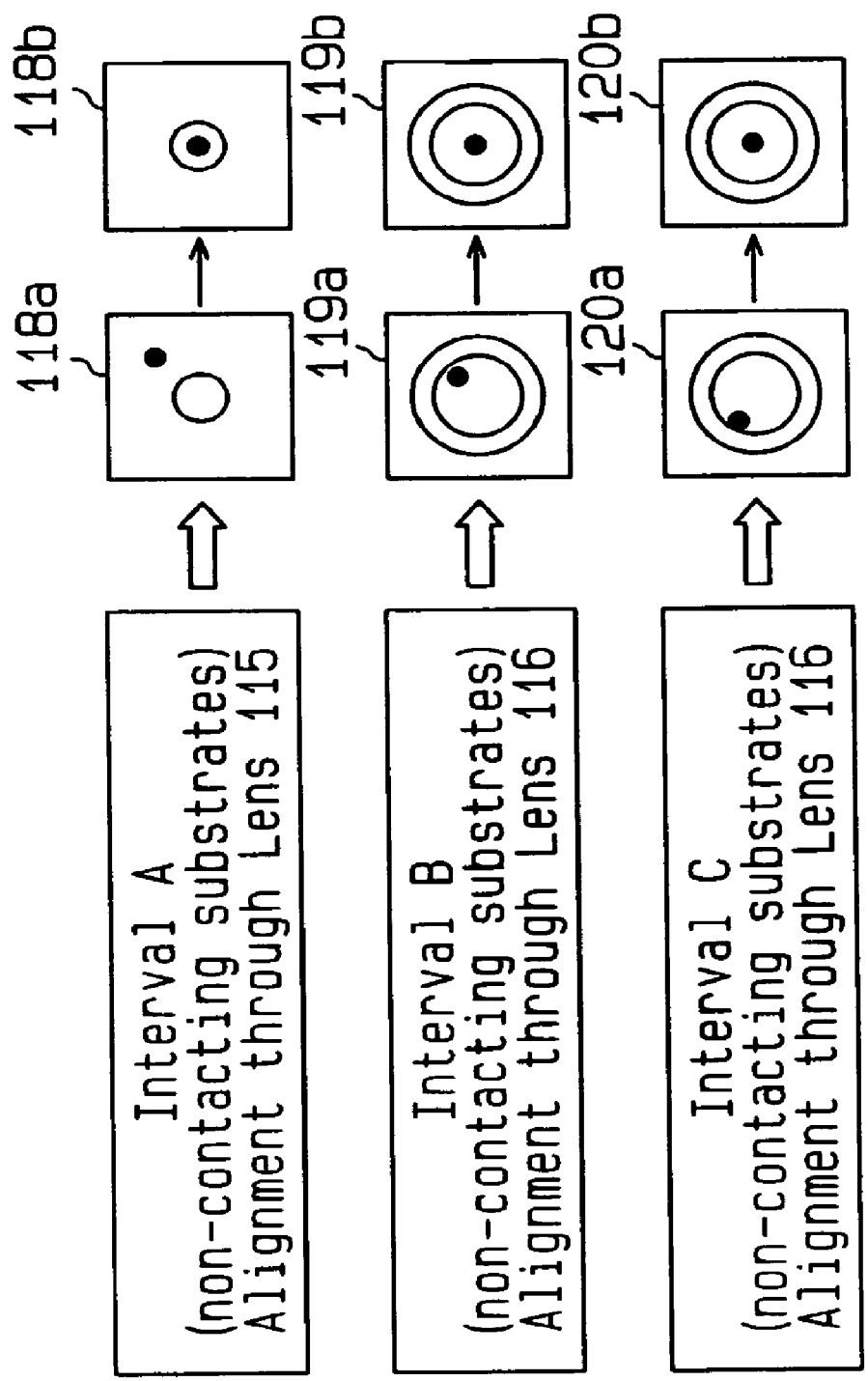
FIG. 18 is a view explaining an alignment control procedure.

Next, an alignment device 36a of the pressing device 36 will be described with reference to FIGS. 17 and 18.

As shown in FIG. 17, the alignment device 36a includes an image pickup device 111, the first and second movement mechanisms 112, 113, and an alignment controller 114. The image pickup device 111 has first and second lenses 115, 116. Each lens 115, 116 has a different magnification. More specifically, the magnification of the first lens 115 is lower than that of the second lens 116. That is, the field of view of the first lens 115 is broader than that of the second lens 116. Further, the depth of focus and the depth of field of the first lens 115 are larger than those of the second lens 116.

The first movement mechanism 112 movably supports the upper chuck unit 72a and the image pickup device 111. The first movement mechanism 112 selectively raises and lowers the upper chuck unit 72a and the image pickup device 111. The first movement mechanism 112 constantly holds the image pickup device 111 at a position above the upper chuck unit 72a and maintains the vertical interval between the upper chuck unit 72a and each lens 115, 116 at a constant value. In other words, the position of each lens 115, 116 relative to the upper chuck unit 72a does not change. The depth of field of each lens 115, 116 is selected to be capable of focusing on the second substrate W2 held by the upper chuck unit 72a and the first substrate W1 held by the lower chuck unit 72b.

A through hole 117 extends vertical through the upper chuck unit 72a. The first and second lenses 115, 116 are aligned in a horizontal direction at a predetermined interval. The first movement mechanism 112 horizontally moves the image pickup device 111 such that the axis of the first or second lens 115, 116 corresponds to the axis of the through hole 117. In this manner, the image pickup device 111 switches between the first lens 115 and the second lens 116.

The second movement mechanism 113 supports the lower chuck unit 72b to horizontally move the lower chuck unit 72b (in the direction X and the direction Y) and rotate the same in the direction θ.

The first and second substrates W1, W2 include first and second alignment marks M1, M2, respectively. These alignment marks M1, M2 are located at matching positions of the substrates W1, W2. In this embodiment, the first alignment mark M1 is a dot, while the second alignment mark M2 is a double circle.

When the first and second substrates W1, W2 are spaced from each other, the alignment controller 114 substantially aligns the substrates W1, W2 using the first lens 115, which has a relatively large depth of focus. When the first and second substrates W1, W2 are located relatively close to each other, the alignment controller 114 precisely aligns the substrates W1, W2 using the second lens 116, which has a relatively small depth of focus. More specifically, the alignment controller 114 first controls the first movement mechanism 112 to separate the upper chuck unit 72a from the lower chuck unit 72b at a first interval A. In this state, as shown in FIG. 18, the center of the first alignment mark M1 is located offset from that of the second alignment mark M2, as viewed in a view 118a of the first lens 115. Further, in the view 118a, although the second alignment mark M2 is actually the double circle, the second alignment mark M2 appears to be a single circle due to the relatively low magnification of the first lens 115. The alignment controller 114 controls the second movement mechanism 113 such that the center of the first alignment mark M1 corresponds to that of the second alignment mark M2 (as viewed in a view 118b).

The first interval A is selected such that the field of view of the first lens 115 reliably includes the first and second alignment marks M1, M2. The first interval A is determined through an experiment or the like. When each chuck unit 72a, 72b receives the associated substrate W1, W2, the position of each substrate W1, W2 relative to the associated chuck unit 72a, 72b is varied due to, for example, a dimension error. The amount of the variation is determined through an experiment or an operation test. Further, regardless of the variation, the first interval A and the field of view (the magnification) of the first lens 115 are selected to reliably include the first and second alignment marks M1, M2 in the field of view of the first lens 115.

Subsequently, the alignment controller 114 controls the first movement mechanism 112 to lower the upper chuck unit 72a and the image pickup device 111 such that the upper chuck unit 72a is spaced from the lower chuck unit 72b at a second interval B. The second interval B is shorter than the first interval A. Further, the alignment controller 114 horizontally moves the image pickup device 111 such that the axis of the second lens 116 corresponds to the axis of the through hole 117. In this state, as shown in FIG. 18, the center of the first alignment mark M1 is located offset from that of the second alignment mark M2, as viewed in a view 119a of the second lens 116. The alignment controller 114 thus controls the second movement mechanism 113 such that the center of the first alignment mark M1 corresponds to that of the second alignment mark M2 (as viewed in a view 119b of the second lens 116).

Next, the alignment controller 114 controls the first movement mechanism 112 to lower the upper chuck unit 72a and the image pickup device 111 such that the upper chuck unit 72a is spaced from the lower chuck unit 72b at a third interval C. The third interval C is shorter than the second interval B. The third interval C is selected to prevent the second substrate W2 from being exposed to the seal and liquid crystal applied on the first substrate W1. As shown in FIG. 18, the center of the first alignment mark M1 is located offset from that of the second alignment mark M2, as viewed in a view 120a of the second lens 116. The alignment controller 114 thus controls the second movement mechanism 113 such that the center of the first alignment mark M1 corresponds to that of the second alignment mark M2 (as viewed in a view 120b of the second lens 116).

Even if the center of the first alignment mark M1 corresponds to that of the second alignment mark M2, as viewed in the view 120b (when the upper chuck unit 72a is spaced from the lower chuck unit 72b at the third interval C), the first and second substrates W1, W2 may be actually misaligned. The third interval C is thus selected to contain the misalignment amount in an acceptable range.

As described, the image pickup device 111 switches between the first lens 115 and the second lens 116. Further, the interval between the first and second substrates W1, W2 is adjusted in accordance with the depth of focus of each lens 115, 116. Accordingly, the image pickup device 111 aligns the first and second substrates W1, W2 without contacting the substrates W1, W2 such that the misalignment amount between the substrates W1, W2 falls in the acceptable range.

A pressing mechanism 36c of the pressing device 36 will now be described with reference to FIG. 19. FIG. 19 is a side view showing the pressing mechanism 36c. The pressing mechanism 36c applies pressure to the first and second substrates W1, W2, thus bonding the substrates W1, W2 together.

The pressing mechanism 36c is formed like a gate. The pressing mechanism 36c includes a support frame 121, a motor 125, a pair of linear rails 122a, 122b, and a pair of linear guides 123a, 123b. The support frame 121 is fixed at a predetermined position. The motor 125 is secured to the top of the support frame 121, as viewed in the drawing. The linear rails 122a, 122b are attached to the support frame 121 and oppose each other. The linear rails 122a, 122b movably support the linear guides 123a, 123b, respectively. Upper and lower plates 124a, 124b are held between the linear guides 123a, 123b. The upper and lower plates 124a, 124b and the linear guides 123a, 123b form a support. A support arm 126 suspends the upper plate 124a. The motor 125 selectively lifts and lowers the support arm 126.

More specifically, a ball spring 127 is connected to the output shaft of the motor 125 and rotates integrally with the motor 125. The ball spring 127 is fastened to a threaded portion 128 that is formed in a top plate 126a of the support arm 126. The ball spring 127 thus rotates to selectively lift and lower the support arm 126 depending on the direction in which the motor 125 rotates.

The support arm 126 includes the top plate 126a, a bottom plate 126b, and a connecting plate 126c. The top plate 126a and the bottom plate 126b are parallel with each other. The connecting plate 126c connects the top plate 126a to the bottom plate 126b. A plurality of load cells 129 are attached to the upper side of the bottom plate 126b and abut the lower side of the upper plate 124a, as viewed in FIG. 19.

Figure 20:
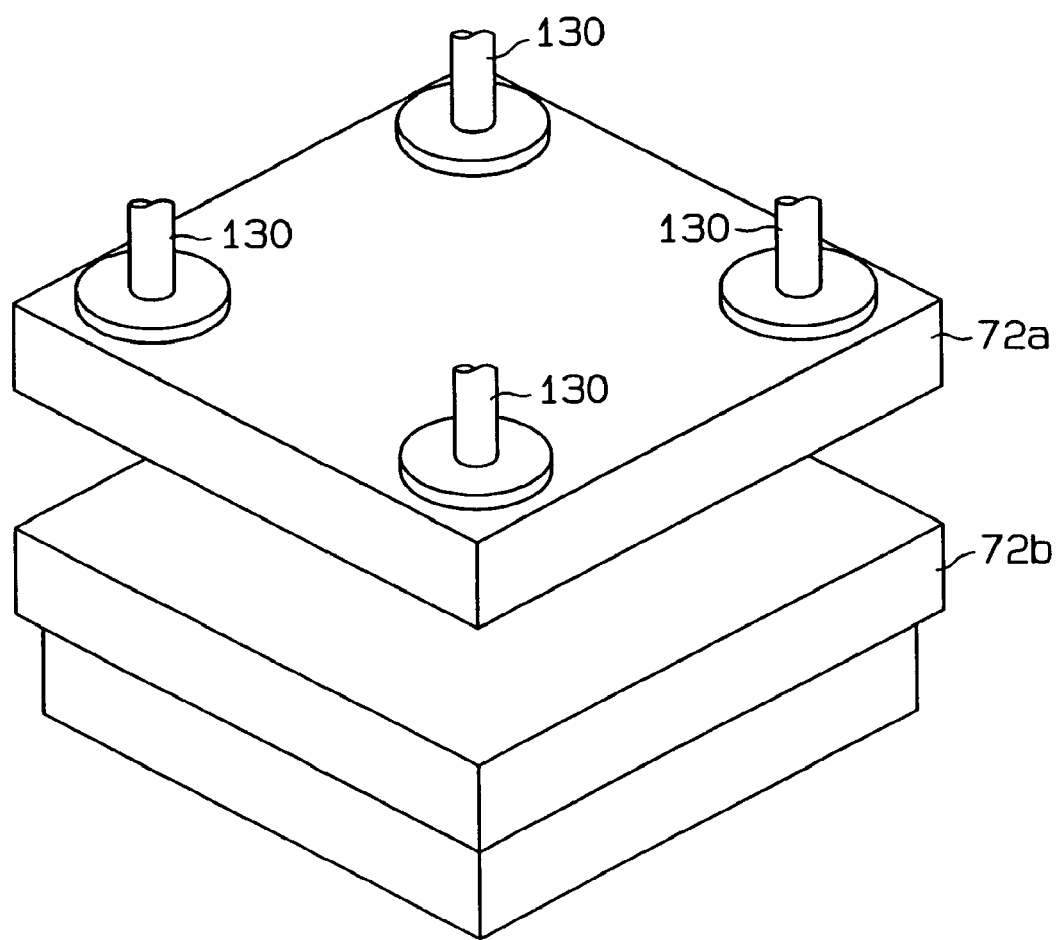
FIG. 20 is a perspective view showing a chuck unit.

The upper chuck unit 72a is suspended from the lower side of the lower plate 124b. More specifically, a plurality of (four) holes are formed in the lower plate 124b, and each hole receives a support post 130. The lower plate 124b includes a plurality of level adjusting portions 131 at positions corresponding to the holes. As shown in FIG. 20, the upper chuck unit 72a is attached to the distal ends, or the lower ends, of the support posts 130. The diameter of the upper end of each support post 130 is larger than that of the lower end such that the support post 130 does not fall from the lower plate 124b. Each level adjusting portion 131 is located between the upper end of the associated support post 130 and the lower plate 124b.

It is preferred that each level adjusting portion 131 is a nut that engages with a threaded portion of the associated support post 130. Each level adjusting portion 131 rotates to selectively lift and lower the associated support post 130, thus adjusting the horizontal level of the upper chuck unit 72a. In this manner, the level adjusting portions 131 adjusts the parallel level between the lower chuck unit 72b and the upper chuck unit 72a to 50 micrometers or smaller.

A pressing cylinder 132 is attached to the bottom plate 126b of the support arm 126 and supplies pressure to the upper chuck unit 72a. It is preferred that a pressing cylinder 132 is an air pressure cylinder. A pressing piston 133 projects downward from the pressing cylinder 132, and the distal end of the pressing piston 133 abuts against a pressing member 135 through a cylindrical coupling 134. The pressing member 135 is attached to the upper chuck unit 72a. If the axis of the pressing cylinder 132 is located offset from the center of the upper chuck unit 72a, the coupling 134 cancels the offset amount.

Each load cell 129 measures the pressure from the upper plate 124a. If the first and second substrates W1, W2 are not pressed to each other, the pressure is determined as the sum of the total weight A1 of the components supported by the support arm 126 (the upper plate 124a, the linear guides 123a, 123b, the lower plate 124b, the support posts 130, the upper chuck unit 72a, and the pressing cylinder 132), the pressure A2 applied by the pressing cylinder 132 to the upper chuck unit 72a, and the atmospheric pressure A3, or (A1+A2+A3). The measurement of each load cell 129 is supplied to a load indicator 136.

When the vacuum chamber 71 is depressurized, the atmospheric pressure of about 1 kg/cm$^2$ acts on the upper chuck unit 72a through the support posts 130. The atmospheric pressure acts on each load cell 129 through the lower plate 124b, the linear guides 123a, 123b, and the upper plate 124a. If the motor 125 is driven to lower the support arm 126 for bonding the first substrate W1 to the second substrate W2, or if the substrates W1, W2 are pressed to each other, the measurement of each load cell 129 decreases by an amount corresponding to the reactive force D of the first and second substrates W1, W2 (=A1+A2+A3−D). Accordingly, the load (pressure) that actually acts on each substrate W1, W2 is determined in accordance with the measurement of each load cell 129.

The load indicator 136 supplies the load controller 137 with the measurement of each load cell 129. The load controller 137 is connected to an electro-pneumatic pressure regulator 138. The load controller 137 computes the pressure that acts on the first and second substrates W1, W2 (either is not shown in FIG. 19) based on the measurement of each load cell 129, when the substrates W1, W2 are pressed to each other between the upper and lower chuck units 72a, 72b. In accordance with the computation, the load controller 137 sends a correction signal to the electro-pneumatic pressure regulator 138 such that a constant pressure acts on the first and second substrates W1, W2. It is preferred that the electro-pneumatic pressure regulator 138 is a variable pressure regulator. The electro-pneumatic pressure regulator 138 thus varies the air pressure supplied to the pressing cylinder 132 in accordance with the correction signal from the load controller 137. In this manner, a constant pressure acts on the first and second substrates W1, W2 that are located between the upper and lower chuck units 72a, 72b. The first and second substrates W1, W2 are thus bonded together through the constant pressure.

Further, external factors such as the parallel level between the upper and lower chuck units 72a, 72b, a foreign object trapped in the pressing device 36, and offset installation of mechanical components reduce the pressure that acts on each load cell 129, in the same manner as the reactive force D. Accordingly, the load that actually acts on the first and second substrates W1, W2 is constantly measured based on a decrease in the measurement of each load cell 129. The load controller 137 supplies the electro-pneumatic pressure regulator 138 with the correction signal in accordance with the measurement of each load cell 129 such that the constant pressure acts on the upper and lower chuck units 72a, 72b, regardless of the external factors.

The load controller 137 sends a movement signal to a motor pulse generator 139 to selectively raise and lower the upper chuck unit 72a. The motor pulse generator 139 generates a pulse signal in accordance with the movement signal and sends the pulse signal to the motor 125, thus actuating the motor 125 in accordance with the pulse signal.

Although the pressing cylinder 132 applies pressure to the first and second substrates W1, W2 in the illustrated embodiment, an actuator such as a motor may replace the pressing cylinder 132. Further, the pressing cylinder 132 may be operated in accordance with hydraulic pressure instead of air pressure.

Further, the position of the lower chuck unit 72b may be adjusted instead of that of the upper chuck unit 72a to vary the parallel level between the upper chuck unit 72a and the lower chuck unit 72b.

In addition, the pressing cylinder 132 or other pressure devices may be omitted as long as the total weight of the components held by the support arm 126 generates a sufficient pressure for pressing the first and second substrates W1, W2 to each other. In this case, each load cell 129 receives the total weight A1 of the upper chuck unit 72a and the components that support the upper chuck unit 72a and the atmospheric pressure A3 that acts on the upper chuck unit 72a when the vacuum chamber 71 is depressurized. Thus, if the first and second substrates W1, W2 are pressed to each other, the measurement of each load cell 129 decreases by an amount that corresponds to the reactive force D of the substrates W1, W2. Accordingly, the load controller 137 determines the pressure that actually acts on the first and second substrates W1, W2 based on the measurement of each load cell 129 (=A1+A3−D).

Figure 21:
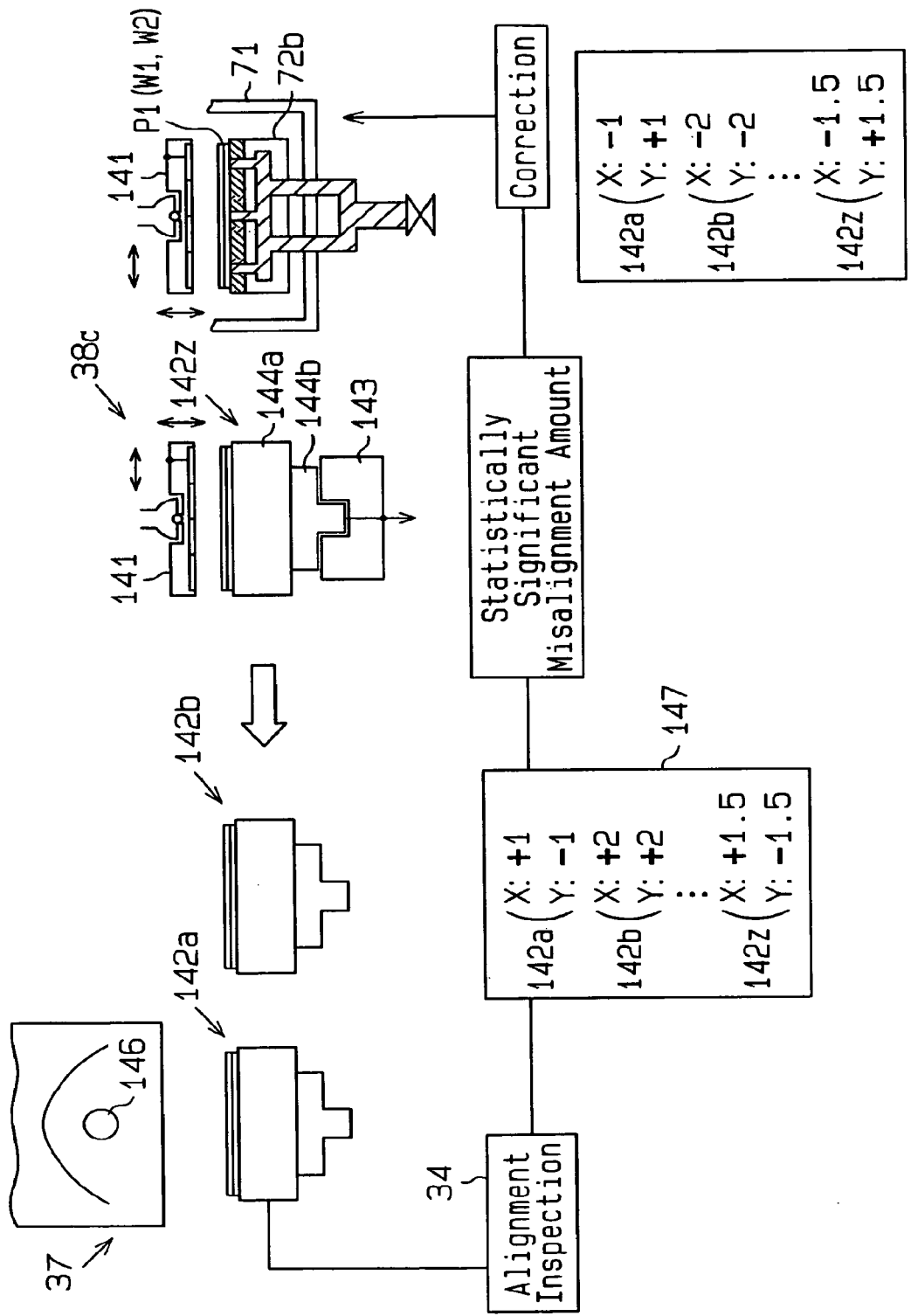
FIG. 21 is a view schematically showing a transport device that transports a substrate to a seal hardening device.

FIG. 21 is a view schematically showing the transport device 38c that transports the first and second substrates W1, W2 from the pressing device 36 to the hardening device 37 of FIG. 5. The lower part of FIG. 21 indicates a procedure of the main controller 31 for controlling the alignment of the first and second substrates W1, W2. The transport device 38c includes a transfer arm 141, a plurality of transport trays 142a, 142b, . . . 142z, and a lift 143.

The transfer arm 141 electrostatically attracts the bonded substrates W1, W2, or a panel display P1, from the lower chuck unit 72b and transports the panel display P1 to the exterior of the vacuum chamber 71. The transfer arm 141 does not necessarily have to be an electrostatic attraction type but may scoop the panel display P1 from the lift pins 73 that lift the panel display P1 separately from the lower chuck unit 72b. Further, if the upper chuck unit 72a holds the panel display P1, the transfer arm 141 receives the panel display P1 from the upper chuck unit 72a.

Each transport tray 142a-142z is attached to the lift 143 one at a time. The lift 143 lifts the corresponding transport tray 142a-142z to a receiving position at which the transfer arm 141 places the panel display P1 on the transport tray 142a-142z.

Each transport tray 142a-142z includes a flat plate 144a and a vacuum holding mechanism 144b that is secured to the lower side of the flat plate 144a, as viewed in FIG. 21. In the drawing, only the flat plate 144a of the transport tray 142z is given the reference index.

The upper side of each flat plate 144a is machined to a flatness of 100 micrometers or smaller. As shown in FIGS. 12C and 12D, a plurality of attraction holes 145 is formed in each flat plate 144a. The vacuum holding mechanism 144b attracts the panel display P1 to the flat plate 144a through vacuum. The vacuum holding mechanism 144b has a check valve. More specifically, when one transport tray 142a-142z is attached to the lift 143, the attraction holes 145 are connected to an air discharge device such as a vacuum pump (not shown). The air discharge device thus attracts the panel display P1 to the corresponding transport tray 142a-142z through vacuum. After the transport tray 142a-142z is detached from the lift 143, the check valve prevents air from flowing in an inverse direction. Accordingly, the panel display P1 is held as attracted to the upper side of the flat plate 144a.

It is preferred that each attraction hole 145 is a round hole with a diameter of two millimeters or smaller. The attraction holes 145 suppress deformation (waviness) of the panel display P1, like the grooves 89 of the upper and lower chuck units 72a, 72b.

The panel display P1 is transported to the hardening device 37 as held on the corresponding transport tray 142a-142z. More specifically, when bonding of one first substrate W1 with the corresponding second substrate W2 is completed, the main controller 31 starts to measure the time for each panel display P1, or the corresponding transport tray 142a-142z. After a predetermined waiting period, the main controller 31 permits each transport tray 142a-142z to transport the corresponding panel display P1 to the hardening device 37.

Even after the first and second substrates W1, W2 are bonded together, reactive force remains acting on the bonded substrates W1, W2, or each panel display P1. The force is gradually released while the seal of the panel display P1 is being hardened. Accordingly, the release of the remaining reactive force from each panel display P1 is substantially controlled through adjustment of the waiting period. In other words, the transport device 38c holds the transport trays 142a-142z at their waiting positions during the waiting period such that the reactive force is substantially released from each panel display P1. As a result, by the time the seal is completely hardened, the reactive force is completely released from the panel display P1. This suppresses a defect in the panel display P1.

If the waiting period is uniform for each transport tray 142a-142z, the amount of the reactive force released from each panel display P1 is uniform. This makes deformation level of each panel display P1 (the bonded substrates W1, W2) uniform. Accordingly, the panel displays P1 are stably manufactured without variation, thus improving the reproducibility for manufacturing the panel displays P.

The hardening device 37 includes an UV lamp 146. The UV lamp 146 irradiates light of a predetermined wavelength that includes a wavelength at which the seal hardens. Further, it is preferred that the light has a wavelength that suppresses adverse effects of the light on liquid crystal. Since the second substrate W2, or the CF substrate, is located above the first substrate W1 of each panel display P1, the UV lamp 146 irradiates the light to each panel display P1 from above. During the irradiation, liquid crystal is not directly exposed to the light. This prevents the liquid crystal from being damaged by the light.

After the seal is hardened, the transport device 38d transports each panel display P1 from the hardening device 37 to the inspection device 35 of FIG. 5. The inspection device 35 performs an alignment inspection. That is, the inspection device 35 inspects each panel display P1 to detect the misalignment amount between the first substrate W1 and the second substrate W2. The inspection device 35 informs the main controller 31 of the detection result.

The main controller 31 associates the detection result with each transport tray 142a-142z. In accordance with the detection result, the main controller 31 corrects the alignment of the first and second substrates W1, W2 in the pressing device 36 in a feed-back manner. More specifically, since each flat plate 144a has a different flatness, each transport tray 142a-142z causes a different amount of misalignment between the corresponding substrates W1, W2. Before bonding the substrates W1, W2 together in the pressing device 36, the main controller 31 associates each panel display P1 with one transport tray 142a-142z. Thus, the main controller 31 misaligns the substrates W1, W2 in the pressing device 36 by an amount corresponding to the misalignment amount of the associated transport tray 142a-142z. The first and second substrates W1, W2 are then bonded together. This compensates the misalignment amount for each transport tray 142a-142a.

More specifically, as shown in FIG. 21, the main controller 31 stores a misalignment table 147 that includes data associated with each transport tray 142a-142z. For example, the misalignment table 147 includes the data associated with the transport tray 142a (X: +1, Y: −1). Thus, regarding the first and second substrates W1, W2 carried by the transport tray 142a, the main controller 31 selects the data (X: +1, Y: −1) as a correction amount from the misalignment table 147. The main controller 31 then moves each substrate W1, W2 in accordance with the correction amount for aligning the first and second substrates W1, W2. That is, the main controller 31 controls the alignment of the first and second substrates W1, W2 in accordance with the detection result of the inspection device 35 in a feedback manner. This suppresses misalignment between the first and second substrates W1, W2 in each panel display P1.

The hardening device 37 will hereafter be described with reference to FIG. 22. The hardening device 37 includes a light source 148, an illuminometer 149, the irradiation controller 150, and a light source lift 151. The light source 148 includes the UV lamp 146 and first and second reflection plates 152, 153. Each reflection plate 152, 153 reflects the light of the UV lamp 146 on the entire panel display P1 in a substantially uniform manner. In this manner, the light source 148 exposes the entire panel display P1 to a substantially uniform energy while preventing liquid crystal from being damaged by the light. If the light source 148 does not have the first reflection plate 152, the center of the panel display P1 could be exposed to a more intense light than the periphery of the panel display P1. It is thus preferred that the light source 148 includes the first and second reflection plates 152, 153.

The light lift 151 supports each transport tray 142a-142z. Each transport tray 142a-142z includes an irradiation sensor 154. Each irradiation sensor 154 supplies the illuminometer 149 with an irradiation signal that has a value (for example, a voltage) representing the intensity of irradiation to which the corresponding panel display P1 is exposed.

Based on the irradiation signal, the illuminometer 149 informs the irradiation controller 150 of the intensity of irradiation to which each panel display P1 is exposed. The irradiation controller 150 generates a control signal in accordance with the information and sends the control signal to the light source lift 151. The control signal includes, for example, a signal adjusted to make the intensity of irradiation uniform or a signal that varies the intensity of irradiation as time elapses.

In response to the control signal, the light source lift 151 varies the interval between the transport tray 142a and the light source 148, as shown in FIG. 22. It is thus possible to easily control the intensity of irradiation to which each panel display P1 is exposed, even if the irradiation of the first light source 148 is varied (due to, for example, aging of the UV lamp 146, replacement of the UV lamp 146, or a change in the reflection surface of each reflection plate 152, 153). Accordingly, the seal hardens uniformly, thus suppressing a defect in each panel display P1.

A second light source 155 identical to the first light source 148 may be located below the transport tray 142a, as shown in FIG. 22. The second light source 155 irradiates light to the panel display P1 through the bottom of the transport tray 142a, thus hardening the seal quickly. Further, in this case, it is preferred that the light source lift 151 moves the second light source 155 relative to the transport tray 142a.

The irradiation controller 150 may control the drive voltage and drive current of the light source 148 (155) in accordance with the amount of irradiation, such that the amount of irradiation becomes substantially uniform between the substrate W1 and the substrate W2. Further, an irradiation sensor 156 may be located on the transport tray 142a. The irradiation controller 150 thus controls the drive voltage and drive current of the light source 148 (155) in accordance with the amount of irradiation that is measured by the irradiation sensor 156. If this is the case, insufficient hardening of the seal is suppressed even if the irradiating device deteriorates to decrease the intensity of irradiation.

The illustrated embodiment has the following advantages.

(1) When the pressure in the vacuum chamber 71 is substantially at the atmospheric level, the upper and lower chuck units 72a, 72b respectively hold the first and second substrates W1, W2 through vacuum. If the vacuum chamber 71 is depressurized, each chuck unit 72a, 72b attracts the associated substrate W1, W2 electrostatically. More specifically, if the vacuum chamber 71 is depressurized, the pressure in each depressurization line 78a, 78b and the pressure in each attraction line 77a, 77b (the pressure that attracts each substrate W1, W2 to the associated chuck unit 72a, 72b) are controlled to be equal to the pressure in the vacuum chamber 71. In this state, each substrate W1, W2 is electrostatically held by the associated chuck unit 72a, 72b and is prevented from falling from or moving relative to the chuck unit 72a, 72b. This suppresses misalignment between the first and second substrates W1, W2.

(2) The attraction grooves 89 formed in the upper electrostatic chuck 76a suppress deformation (waviness) of the second substrate W2 when the upper electrostatic chuck 76a attracts the second substrate W2.

(3) The upper electrostatic chuck 76a attracts the second substrate W2 when voltage is supplied to the electrodes 92a-92d in the dielectric layers 91a-91d. Further, when the first conductive connector 94a, which is connected to the dielectric layer 91a, supplies pressure to the dielectric layer 91a, the second substrate W2 separates from the upper electrostatic chuck 76a. It is thus easy to control the attraction and separation of the second substrate W2 with respect to the upper electrostatic chuck 76a.

(4) The seal material includes a photo-curing adhesive. The interval between the light source 148 and the first and second substrates W1, W2 is adjusted in accordance with the intensity of irradiation to which the seal to be hardened is exposed. The seal thus hardens uniformly, thus suppressing a defect in the resulting product.

(5) The drip controller 53 includes the syringe 55 that presses the liquid crystal LC through the nozzle 57 and the temperature controller 60 that controls the temperature of the liquid crystal LC. The drip controller 53 is thus capable of dripping a relatively small amount of the liquid crystal LC with a high accuracy without being affected by the ambient temperature. Further, the liquid crystal LC is dripped without forming bubbles, and the drip amount of the liquid crystal LC is maintained as constant.

(6) The image pickup device 111 is switched between the first and second lenses 115, 116, which have different fields of view, in accordance with the interval between the first and second substrates W1, W2. The first and second substrates W1, W2 are thus aligned with a high accuracy without being contacted by the alignment device 36a.

(7) When the first and second substrates W1, W2 are pressed to each other, the measurement of each load cell 129 does not include the reactive force of the first and second substrates W1, W2. That is, the measurement of each load cell 129 reflects the load that actually acts on the first and second substrates W1, W2. The load controller 137 electrically controls the electro-pneumatic pressure regulator 138 in accordance with the measurement of each load cell 129. In this manner, a constant pressure acts on the first and second substrates W1, W2 regardless of the external factors.

It should be apparent to those skilled in the art that the present invention may be embodied in many other specific forms without departing from the spirit or scope of the invention. Particularly, it should be understood that the invention may be embodied in the following forms.

Each of the upper and lower electrostatic chucks 76a and 76b, as another holding device, can be changed to any known holding device, such as a mechanically holding arm (not shown), for holding the associated substrate W1 and W2.

Figure 23A:
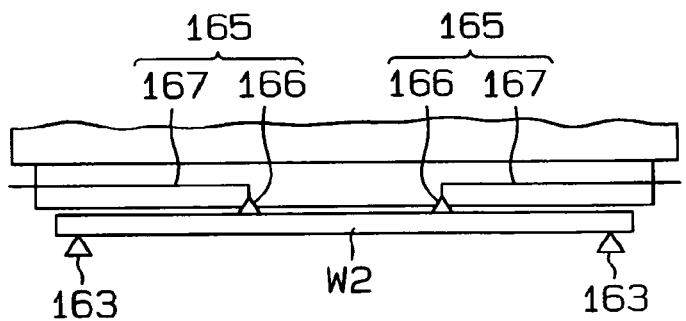
FIGS. 23A and 23B are views schematically showing a bending correction mechanism.
Figure 23B:
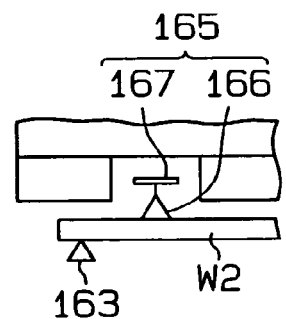
Figure 24A:
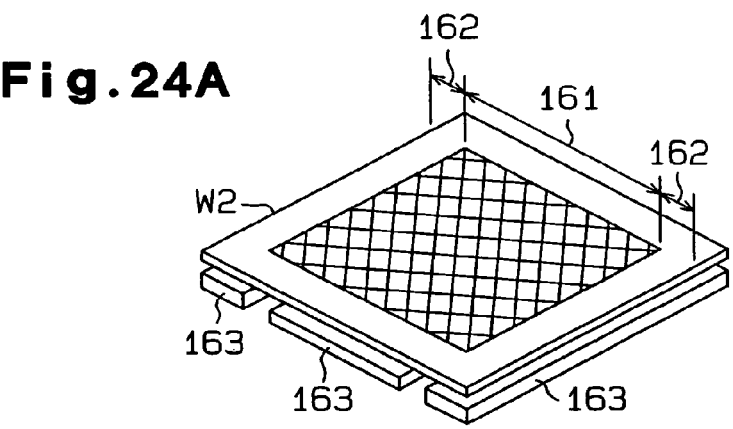
FIGS. 24A and 24B are views explaining bending of a substrate.
Figure 24B:

To prevent the side of each substrate W1, W2 at which the components are formed (the component forming side) from being contaminated or damaged, the opposite side of the substrate W1, W2 may be attracted to the associated chuck unit 72a, 72b, as shown in FIG. 24A. Further, each transfer arm 74 (see FIG. 10), which supports the first and second substrates W1, W2, may include a holder 163 that holds a peripheral portion 162 around a component forming portion 161. In this case, the second substrate W2 tends to bend, as shown in FIG. 24B. If the second substrate W2 is bent, the second substrate W2 may be located offset with respect to the upper chuck unit 72a or may not be sufficiently attracted to the upper chuck unit 72a. This causes, for example, misalignment between the first and second substrates W1, W2. To avoid this, the pressing device 36 may include correction mechanisms 165 for correcting the shape of the second substrate W2, as shown in FIGS. 23A and 23B.

Each correction mechanism 165 includes a holding pad 166, an arm 167 that supports the holding pad 166, and an arm lift (not shown) that selectively raises and lowers the arm 167. The correction mechanisms 165 lift the middle of the second substrate W2. More specifically, when the upper chuck unit 72a attracts the second substrate W2 through vacuum, the attraction controller 84 actuates the correction mechanisms 165 to correct the bent shape of the second substrate W2.

Figure 25:
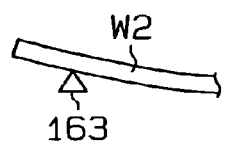
FIGS. 25A, 25B, 25C, 25D, and 25E are views explaining a method for correcting the bending of the substrate.
Figure 25:
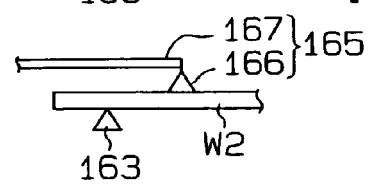
Figure 25:
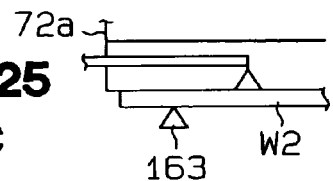
Figure 25:
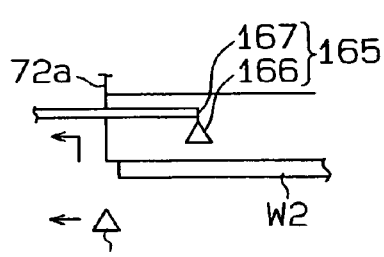
Figure 25:
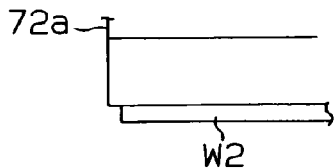

FIG. 25A shows the second substrate W2 in a bent state. Each correction mechanism 165 corrects the bent shape of the second substrate W2, as shown in FIG. 25B. The upper chuck unit 72a is then lowered to attract the second substrate W2 through vacuum, as shown in FIG. 25C. Subsequently, as shown in FIG. 25D, the upper chuck unit 72a is raised and each correction mechanism 165 and the holder 163 are separated from the second substrate W2. As a result, as shown in FIG. 25E, the upper chuck unit 72a attracts the second substrate W2 at an accurate position. This increases the reproducibility for attracting the second substrate W2 to the upper chuck unit 72a.

Although each correction mechanism 165 of FIGS. 23 and 24 includes the holding pad 166, the correction mechanism 165 may be configured in any other manner as long as the bent shape of the second substrate W2 is corrected. For example, the correction mechanisms 165 may correct the bent shape of the second substrate W2 without contacting the second substrate W2. In either case, the correction mechanisms 165 have the same advantage.

Figure 26:
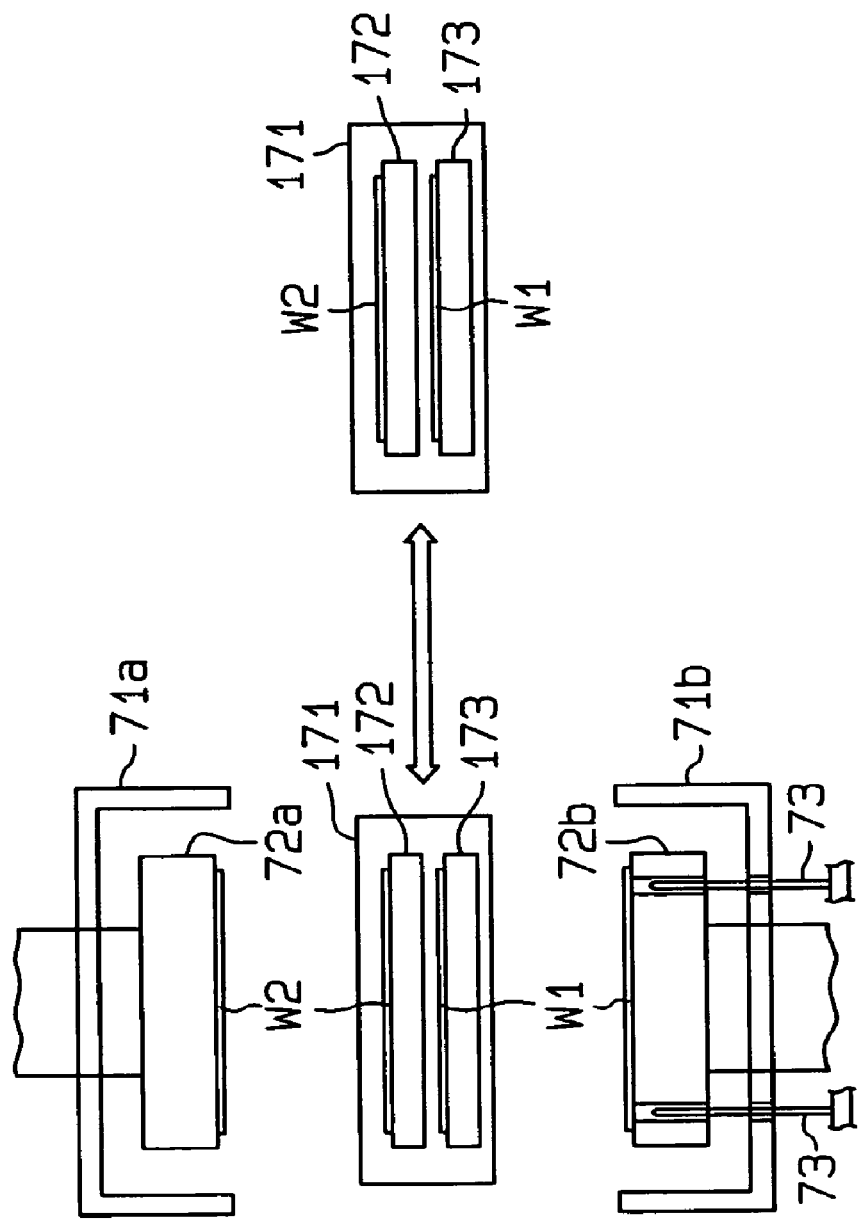
FIG. 26 is a view schematically showing a modification of the transport device of FIG. 10.

As shown in FIG. 26, a transport table 171 may replace the transport robot 45 of FIG. 10. The transport table 171 transports the first and second substrates W1, W2 together and includes an upper holder 172 and a lower holder 173. The upper holder 172 holds the second substrate W2 such that the bonding side (the components forming side) faces downward. The lower holder 173 holds the first substrate W1 such that the bonding side faces upward. The upper holder 172 holds the second substrate W2 at a position outward from the seal applied on the first substrate W1. The upper chuck unit 72a attracts the second substrate W2 from the upper holder 172. The lower holder 173 places the first substrate W1 on the distal ends of the lift pins 73. The lift pins 73 then allows the lower chuck unit 72b to attract the first substrate W1.

The transport table 171 aligns the first and second substrates W1, W2 before placing the substrates W1, W2 in the vacuum chamber 71. The transport table 171 thus transports the first and second substrates W1, W2 together as held in an aligned state. This shortens the time needed for alignment of the first and second substrates W1, W2 in the pressing device 36.

An alignment device 36b, as shown in FIG. 27, may be employed. In this case, it is preferred that the lower chuck unit 72b is detachable from the movement mechanism 113. Further, the movement mechanism 113 includes a base stage 175 and a plurality of alignment pins 176. The base stage 175 supports the lower chuck unit 72b, or a chuck portion. The alignment pins 176 project from the base stage 175, and matching alignment holes 177 are formed in the lower chuck unit 72b. When each alignment pin 176 is fitted in the associated alignment hole 177, the lower chuck unit 72b is stopped from moving horizontally with respect to the base stage 175.

After the first and second substrates W1, W2 are bonded together, the substrates W1, W2 are maintained as held on the lower chuck unit 72b. The lower chuck unit 72b is then detached from the movement mechanism 113. The transport device 38c of FIG. 5 thus transports the substrates W1, W2 together with the lower chuck unit 72b to the hardening device 37. It is thus unnecessary to transfer the first and second substrates W1, W2 from the transport device 38c to the corresponding transport tray 142a-142z. This reduces the number of the manufacturing steps, and the panel display P1 is manufactured in a further stable manner.

Figure 28C:
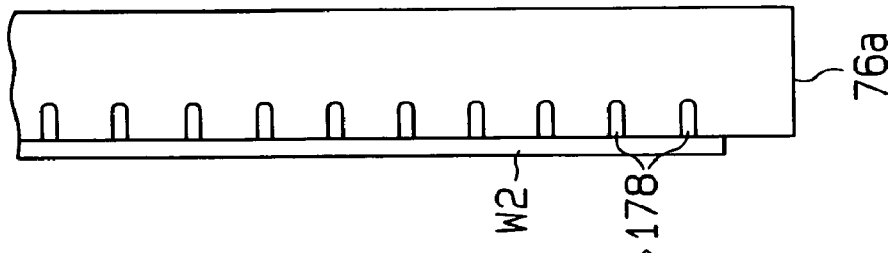
FIGS. 28A, 28B, and 28C are views each showing a modification of the attraction side of FIG. 12A.
Figure 28A:
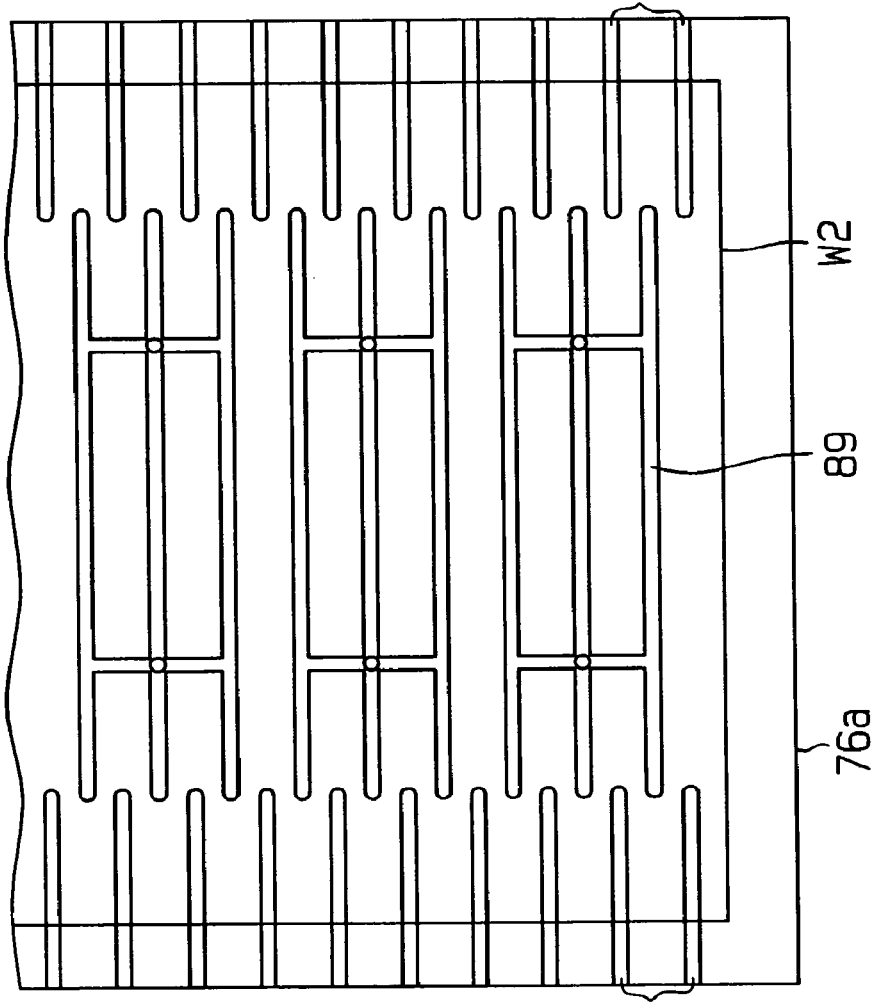
Figure 28B:
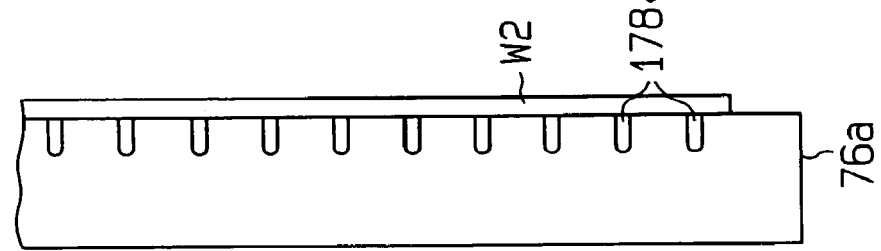

As shown in FIGS. 28A, 28B, 28C, a plurality of discharge grooves 178 may be formed in the attraction side of the upper electrostatic chuck 76a, in addition to the attraction grooves 89. The discharge grooves 178 equilibrate the pressure that acts on a portion of the attraction side of the upper electrostatic chuck 76a around the second substrate W2 with the pressure in the vacuum chamber 71.

Each discharge groove 178 extends in a longitudinal direction of each attraction groove 89. An end of each discharge groove 178 is located in a portion of the attraction side of the upper electrostatic chuck 76a that attracts the second substrate W2. The other end of each discharge groove 178 corresponds to an end of the upper electrostatic chuck 76a. The discharge grooves 178 thus discharges air trapped between the periphery of the second substrate W2 and the corresponding portion of the attraction side of the upper electrostatic chuck 76a. This prevents the second substrate W2 from moving relative to or falling from the upper electrostatic chuck 76a.

The discharge grooves 178 reduce the contact area between the second substrate W2 and the upper electrostatic chuck 76a. This further suppresses misalignment between the first and second substrates W1, W2 when the substrates W1, W2 are bonded together.

Alternatively, the discharge grooves 178 may be formed in the attraction side of the lower electrostatic chuck 76b. This structure prevents the first substrate W1 from moving relative to or falling from the lower electrostatic chuck 76b.

Each discharge groove 178 does not necessarily have to reach the end of the attraction side of the upper electrostatic chuck 76a, as long as the discharge groove 178 connects the portion of the attraction side of the upper electrostatic chuck 76a that contacts the periphery of the second substrate W2 to the portion of the attraction side of the electrostatic chuck 76a around the second substrate W2.

If necessary, each substrate W1, W2 may be aligned by a pre-alignment device before the substrates W1, W2 are transported to the pressing device 36 (for example, before the liquid crystal LC is dripped on the first substrate W1). The pre-alignment device includes a camera and a stage. The stage carries each substrate W1, W2 and moves along the axis X (perpendicular to the transport direction of each substrate W1, W2) and rotates in a direction θ. It is preferred that the lens power of the camera is lower than that of the first camera lens 115 (FIG. 17). That is, the bonded substrate manufacturing apparatus with the pre-alignment device includes at least two pairs of lenses that have a power lower than that of the second camera lens 116 (FIG. 17).

The pre-alignment device stores a reference image and compares an image of each substrate W1, W2 acquired by the camera with the reference image. The pre-alignment device thus detects misalignment between each substrate W1, W2 and the reference image along the axes X and Y and in the direction θ (misalignment amounts X, Y, and θ). The pre-alignment device moves the stage to correct the position of each substrate W1, W2 in accordance with the misalignment amounts X and θ. The pre-alignment device informs the transport device 38b of FIG. 5 of the misalignment amount Y. The transport device 38b corrects the position of the first and second substrates W1, W2 in accordance with the misalignment amount Y. That is, the transport device 38b corrects the misalignment between the first and second substrates W1, W2 along the axis Y while transporting the substrates W1, W2 to the pressing device 36, thus saving time. This increases the manufacturing efficiency of the panel display P1.

The reference image of the pre-alignment device is obtained as follows. When the apparatus 30 of FIG. 5 is assembled, the drip device 33 and the pressing device 36 are located slightly offset. The apparatus 30 is thus initially operated to detect the offset amount of the devices 32, 35.

More specifically, the upper section of FIG. 29 indicates a target position 181 for each substrate W1, W2 in the pressing device 36, a target position 182 for each substrate W1, W2 in the drip device 33, and the target position 183 for each substrate W1, W2 in the pre-alignment device. To locate each substrate W1, W2 at the target position 181 in the pressing device 36, the substrate W1, W2 must be located at the target position 183 in the pre-alignment device and the target position 182 in the drip device 33. In other words, if each substrate W1, W2 is located at the target position 183 in the pre-alignment device, the substrate W1, W2 is eventually located at the target position 181 in the pressing device 36. Thus, the pre-alignment device acquires an image of each substrate W1, W2 located at the target position 183 and stores the image as the reference image.

The lower section of FIG. 29 indicates a transport path of each substrate W1, W2 from the pre-alignment device to the pressing device 36. More specifically, when the pre-alignment device receives each substrate W1, W2, the center of the substrate W1, W2 is located offset from that of the reference position 183. The pre-alignment device thus compares a camera image of each substrate W1, W2 with the reference image and determines the misalignment amounts X, Y, and θ. The pre-alignment device then moves the stage to correct the position of each substrate W1, W2 in accordance with the misalignment amounts X and θ. The pre-alignment device informs the transport device 38b of the misalignment amount Y as a correction value. When the drip device 33 receives each substrate W1, W2 from the transport device 38a, the substrate W1, W2 is located substantially at the target position 182. The transport device 38b then moves the first and second substrates W1, W2 from the drip device 33 toward the pressing device 36 by a distance that corresponds to the total of the interval between the drip device 33 and the pressing device 36 and the correction value. Accordingly, by the time the pressing device 36 receives each substrate W1, W2, the misalignment amount Y is corrected. As a result, the first and second substrates W1, W2 are located substantially at the target position 181 when received by the pressing device 36.

As described, the pre-alignment device and the transport device 38b save time by correcting the misalignment amount Y of each substrate W1, W2 when the substrates W1, W2 are being transported from the drip device 33 to the pressing device 36. Further, when the pressing device 36 receives the first and second substrates W1, W2, each substrate W1, W2 is located substantially at the target position 181. The alignment of the first and second substrates W1, W2 in the pressing device 36 is thus quickly completed.

Further, the pre-alignment device aligns the first and second substrates W1, W2 through a camera image of the substrates W1, W2 without contacting the substrates W1, W2. This suppresses dust formation otherwise caused by contact between a rough surface of each substrate W1, W2 and the pre-alignment device.

The pre-alignment device stores the reference image during the initialization when the bonded substrate manufacturing apparatus 30 is assembled. This compensates an assembly error of the apparatus 30. It is thus easy to provide an additional treatment device to the apparatus 30.

The present invention may be applied to, for example, a plasma panel display (PDP), an electro-luminescence display (EL display), or an organic display, instead of a liquid crystal display.

When bonding the first and second substrates W1, W2 in the pressing device 36, the upper chuck unit 72a may be used as a reference position, instead of the lower chuck unit 72b.

A heater that thermally hardens the seal may replace the UV lamp 146 of the hardening device 37.

The transport trays 142a-142z of FIG. 21 may be transported together with the lift 143.

To prevent each substrate W1, W2 from falling from or moving relative to the associated chuck unit 72a, 72b in the vacuum chamber 71 of FIG. 11, the pressure for attracting the substrate W1, W2 needs be lower than the pressure in the vacuum chamber 71. Accordingly, the pressure equilibration valves 82a, 82b may be omitted. In this case, the attraction controller 84 opens the depressurization valves 80a, 80b when depressurizing the vacuum chamber 71. This structure also prevents each substrate W1, W2 from falling from or moving relative to the associated chuck unit 72a, 72b in the vacuum chamber 71.

Figure 30:
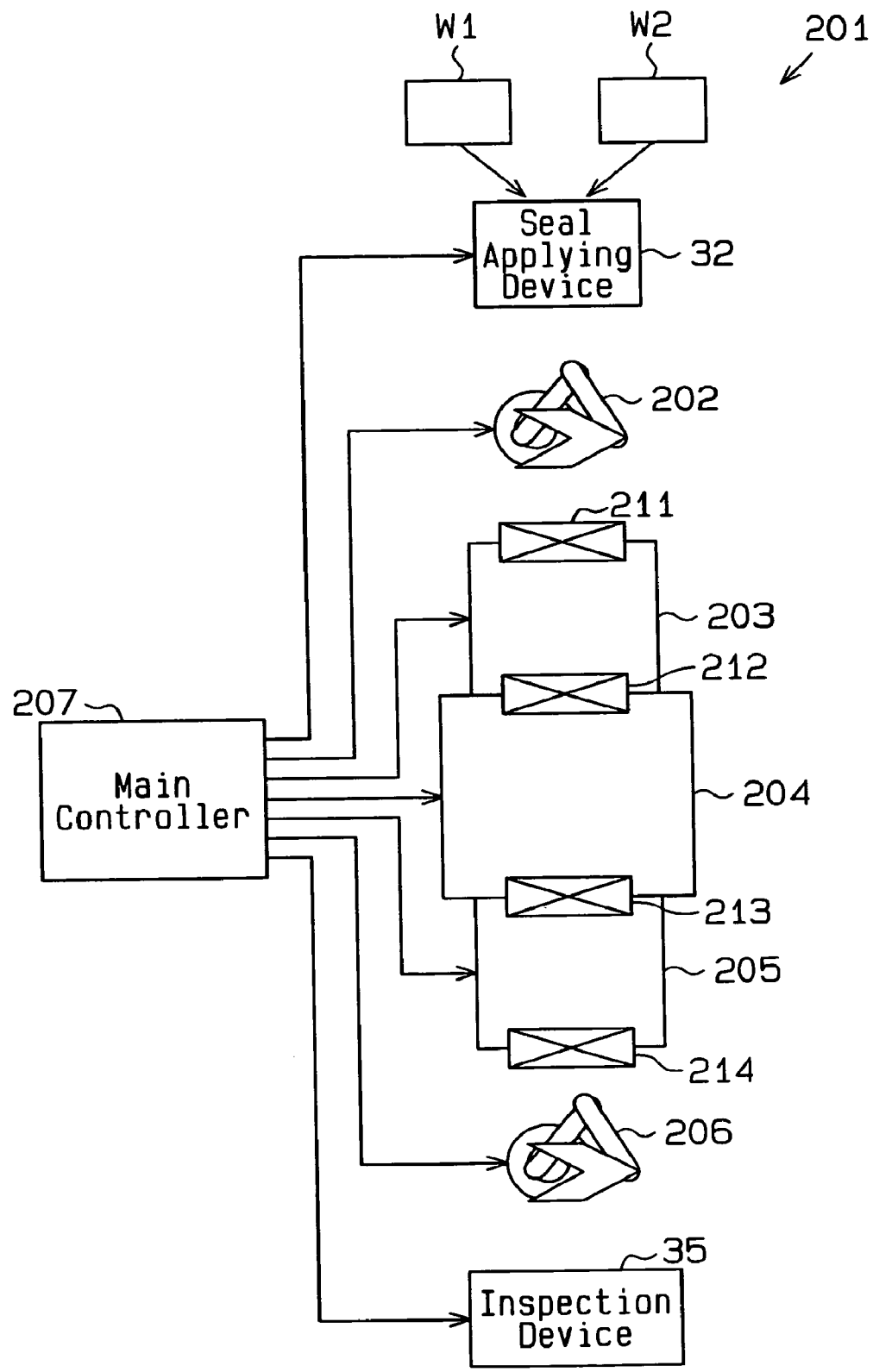
FIG. 30 is a view schematically showing a bonded substrate manufacturing apparatus of another embodiment according to the present invention.

As in a bonded substrate manufacturing apparatus 201 of FIG. 30, some steps other than the pressing step may be performed under depressurization. The apparatus 201 includes a seal applying device 32, a carrying-in robot 202, a first vacuum sub-chamber 203, a bonding chamber 204, a second vacuum sub-chamber 205, a carrying-out robot 206, an inspection device 35, and a main controller 207.

A first gate valve 211 is located in the first vacuum sub-chamber 203 for receiving the first and second substrates W1, W2. A second gate valve 212 separates the first vacuum sub-chamber 203 from the bonding chamber 204. A third gate valve 213 separates the bonding chamber 204 and the second vacuum sub-chamber 205. The substrates W1, W2 are bonded together in the bonding chamber 204. A fourth gate valve 214 is located in the second vacuum sub-chamber 205. The bonded substrates W1, W2, or a panel, exit the second vacuum sub-chamber 205 through the fourth gate valve 214.

The main controller 207 controls the operation of each gate valve 211-214, the pressure in each vacuum sub-chamber 203, 205, the pressure in the bonding chamber 204, the operation of the carrying-in robot 202, and the operation of the carrying-out robot 206. The seal applying device 32 applies seal on the upper side of the first substrate W1. The seal is not applied on any side of the second substrate W2. The carrying-in robot 202 transports the first and second substrates W1, W2 to the first vacuum sub-chamber 203. The main controller 207 then pretreats the substrates W1, W2 in the first vacuum sub-chamber 203. In the pretreatment, impurities adhered to the surfaces of each substrate W1, W2, or a display element, are exposed to reaction gas and replacement gas for a predetermined time. The reaction gas is, for example, exciting gas for plasma panel displays. The replacement gas is, for example, inactive gas such as nitrogen gas.

A pretreatment device that performs at least one of heating, plasma treatment, and the aforementioned gas treatment may be located in the first vacuum sub-chamber 203. If the heating is performed, the substrates W1, W2 are heated to alter the surface quality of each substrate W1, W2, activate the bonding surface of each substrate W1, W2, and remove water from the substrates W1, W2. If the plasma treatment is performed, the impurities and substances that cannot be activated through the reaction gas or the replacement gas or the heating are removed using plasma.

The pretreatment stabilizes the quality of the bonding surfaces of the substrates W1, W2, which cannot be separated once they are bonded together. More specifically, an oxide film formed on each substrate W1, W2 or a foreign object adhered to the substrate W1, W2 alters the surface state of the substrate W1, W2. The alteration is non-uniform among the substrates W1, W2, thus hampering stable fabrication of panel displays. However, the pretreatment suppresses formation of the oxide film and adhesion of the foreign object and removes impurities from the substrates W1, W2. This maintains the surface of each substrate W1, W2 in a certain state and stabilizes the quality of a product. As described, since the bonded substrate manufacturing apparatus 201 does not require a separate pretreatment device, the productivity for manufacturing bonded substrates is improved.

To prevent the plasma treatment from adversely affecting the seal on the first substrate W1, it is preferred that the seal is masked or that plasma is generated in the portions other than the seal.

When fabricating a liquid crystal panel display, the liquid crystal drip device 33 of FIG. 5 may be located in the first vacuum sub-chamber 203.

After the pretreatment, the first and second substrates W1, W2 are transported from the first vacuum sub-chamber 203 to the bonding chamber 204. The pressing device 36 of FIG. 5 is located in the bonding chamber 204. The pressing device 36 includes the alignment device 36a of FIG. 17 (or the alignment device 36b of FIG. 27).

The main controller 207 controls the pressure in the bonding chamber 204 and supply of the aforementioned gases. Further, the main controller 207 aligns the first and second substrates W1, W2 and bonds the substrates W1, W2 together. More specifically, the main controller 207 measures the time that elapses after the bonding chamber 204 receives the substrates W1, W2, thus controlling the time for which the substrates W1, W2 are exposed to the gases. This stabilizes the quality of the bonding surface of each substrate W1, W2. The bonded substrates W1, W2, or a panel, are transported from the bonding chamber 204 to the second vacuum sub-chamber 205.

The transport device 38c and the hardening device 37 of FIG. 5 are located in the second vacuum sub-chamber 205. After depressurizing the second vacuum sub-chamber 205, the main controller 207 transports the first and second substrates W1, W2 to the second vacuum sub-chamber 205. The main controller then operates the hardening device 37 to harden the seal in the second vacuum sub-chamber 205. Since the seal is hardened under depressurization, the substrates W1, W2 are prevented from becoming offset from each other when the pressure is restored.

The first vacuum sub-chamber 203 or the second vacuum sub-chamber 205 may be canceled.

Alternatively, a plurality of first vacuum sub-chambers 203 may be provided in parallel. In this case, a plurality of pairs of first and second substrates W1, W2 are pretreated in the first vacuum sub-chambers 203. Afterwards, each pair of first and second substrates W1, W2 is bonded together in the bonding chamber 204, one pair at a time. This reduces the manufacturing time per one bonded substrate, or one pair of first and second substrates W1, W2.

The alignment device 36a of FIG. 17 may perform the correction of the image pickup device 111 as follows. That is, the alignment device 36a stores the positions (within the field of view) of the alignment marks used for aligning the first and second substrates W1, W2. When receiving the substrates W1, W2, the alignment device 36a horizontally moves the image pickup device 111 in accordance with the difference (the coordinate difference) between the actual position of the alignment mark of each substrate W1, W2 and the stored positions.

Figure 31A:
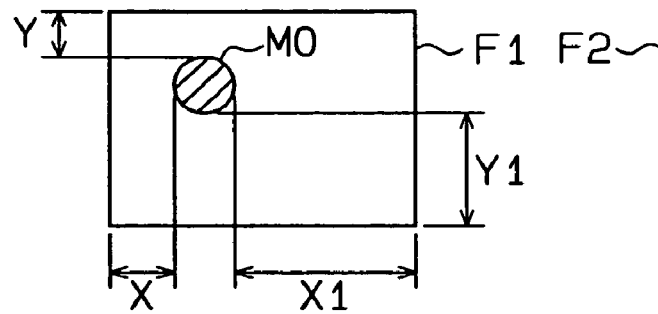
FIGS. 31A, 31B, and 31C are views explaining alignment marks.

More specifically, as shown in FIG. 31A, a reference substrate that has an alignment mark M0 is transported to the alignment device 36a, after the position of the reference substrate is corrected by the method shown in FIG. 29. Thus, even if the position of the reference substrate becomes offset during the transportation, the alignment mark M0 of the reference substrate is located within the field of view F1 of the first camera lens 115 (FIG. 31A). Further, when the image pickup device 111 is moved by a predetermined distance to acquire an image of the reference substrate with the second camera lens 116, the alignment mark M0 of the reference substrate is located within the field of view of the second camera lens 116. The alignment controller 114 of FIG. 17 stores the position (coordinates X, Y) of the alignment mark M0 in the field of view F1 of the first camera lens 115.

Figure 31B:
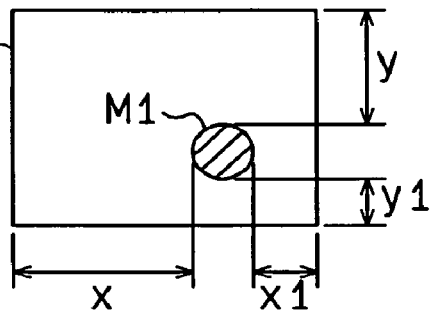
Figure 31C:
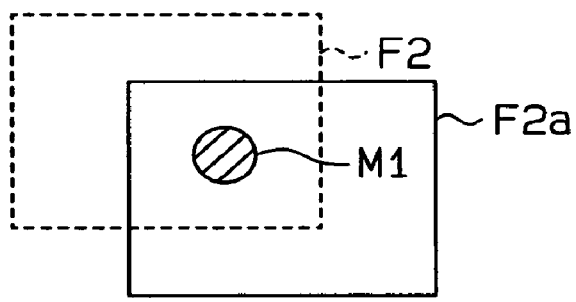

Subsequently, the first substrate W1 is transported to the alignment device 36a. The first camera lens 115 of the alignment device 36a acquires an image of the alignment mark M1 of the first substrate W1. In FIG. 31B, the alignment mark M1 is located in the field of view F2 of the first camera lens 115. The alignment controller 114 computes the position (coordinates x, y) of the alignment mark M1 in the field of view F2. The alignment controller 114 moves the first camera lens 115 in accordance with the difference between the computed coordinates (x, y) and the stored coordinates (X, Y) such that the position of the alignment mark M1 corresponds to the position of the alignment mark M0 in a corrected field of view F2a (FIG. 31C). Accordingly, when the first camera lens 115 is switched to the second camera lens 116, the alignment mark M1 is reliably located in the field of view of the second camera lens 116.

Further, the movement amount of the image pickup device 111 for switching the first camera lens 115 to the second camera lens 116 may be corrected in accordance with the difference between the computed coordinates (x, y) and the stored coordinates (X, Y).

Figure 32:
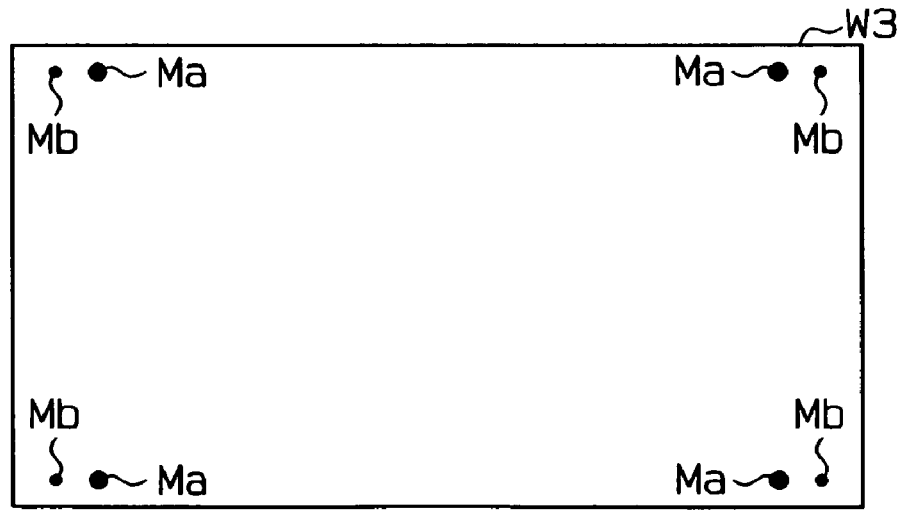
FIG. 32 is a view explaining another alignment control procedure.

In addition, the above operation, which includes the storing of the positions of the alignment marks M0, M1 in the field of view, may be applied to a substrate W3 that has a large alignment mark Ma and a small alignment mark Mb. The first camera lens 115, which has a relatively small power, acquires an image of the large alignment mark Ma. The second camera lens 116, which has a relatively large power, acquires an image of the small alignment mark Mb. For example, as shown in FIG. 32, four large alignment marks Ma, each of which is paired with one small alignment mark Mb, are located at predetermined positions (four corners) of the substrate W3. Each large alignment mark Ma is spaced from the corresponding small alignment mark Mb at a predetermined interval. Further, a substrate to be aligned with the substrate W3 (for example, the second substrate W2, if the large alignment marks Ma and the small alignment marks Mb are located in the first substrate W1) includes a plurality of alignment marks (not shown) that correspond to the large alignment marks Ma and the small alignment marks Mb of the substrate W3.

Figure 33A:
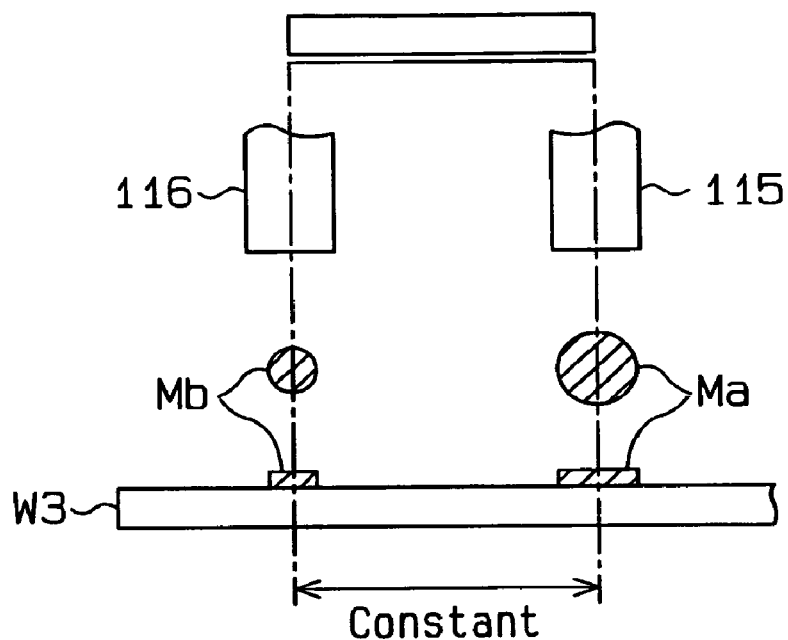
FIGS. 33A, 33B, 33C, 33D and 33E are views explaining another alignment control procedure.
Figure 33B:
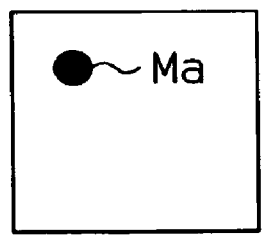

As shown in FIG. 33A, the axis of the first camera lens 115 and the axis of the second camera lens 116 are spaced from each other at an uniform interval. FIG. 33B is an image of one large alignment mark Ma acquired by the first camera lens 115 when the large alignment mark Ma is located at an optimal position. FIG. 33C is an image of one small alignment mark Mb acquired by the second camera lens 116 when the small alignment mark Mb is located at an optimal position. The alignment controller 114 stores the images of FIGS. 33B, 33C and the position of the image pickup device 111 corresponding to the image of FIG. 33B relative to the position of the image pickup device 111 corresponding to the image of FIG. 33C.

Figure 33D:
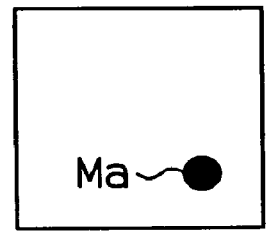
Figure 33C:
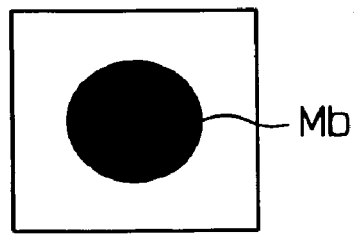

FIG. 33D is an image of one large alignment mark Ma of the substrate W3 acquired by the first camera lens 115 when the substrate W3 is transported to the alignment device 36a of FIG. 17. The alignment controller 114 computes the movement amount and movement angle (X, Y, and θ) of the image pickup device 111 for locating the large alignment mark Ma at the position corresponding to the stored image of FIG. 33B. The alignment controller 114 moves the image pickup device 111 in accordance with the computed movement amount and movement angle.

Subsequently, the alignment controller 114 moves the image pickup device 111 by a certain amount to switch from the first camera lens 115 to the second camera lens 116. This movement amount is equal to the interval between the position of the image pickup device 111 corresponding to the image of FIG. 33B and the position of the image pickup device 111 corresponding to the image of FIG. 33C. Thus, as long as the substrate W3 remains unmoved, the offset amount of the small alignment mark Mb in the field of view of the second camera lens 116 can be predicted from the position of the large alignment mark Ma in the field of view of the first camera lens 115.

Figure 33E:
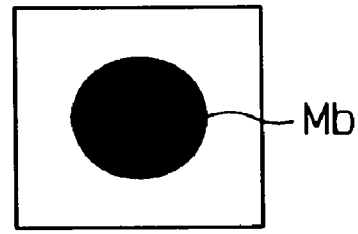

In this manner, the alignment marks are reliably located in the field of view of each camera lens 115, 116. Accordingly, when the substrate bonding is performed, the second camera lens 116 reliably acquires the small alignment mark Mb in its field of view, as shown in FIG. 33E. As a result, the substrate alignment is achieved further precisely.

The movement amount of the image pickup device 111 is controlled using a pulse. Further, the first and second camera lenses 115, 116 may be attached to separate cameras. If this is the case, the interval between the cameras (the optical axes of the camera lenses 115, 116) must be fixed.

The numbers, the positions, or the shapes of the large or small alignment marks Ma, Mb may be modified as necessary. For example, as shown in FIG. 32, a pair of large alignment marks Ma may be located at a pair of positions (near the middle of the upper side and near the middle of the lower side) of the substrate W3. Further, each alignment mark, Ma, Mb, M0, M1, M2 may be shaped as a square or a cross. In addition, the alignment marks of one substrate may have different shapes, thus making it easy to determine the orientation of the substrate.

The pre-alignment may be performed using the large alignment marks Ma before the first and second substrates W1, W2 are transported to the pressing device 36. FIG. 34 shows a portion of the pressing device 36, or the alignment device 36a. A pre-alignment device 221 pre-aligns the first and second substrates W1, W2 before the substrates W1, W2 are transported to the pressing device 36, which includes the alignment device 36a of FIG. 17.

The pre-alignment device 221 includes an image pickup device 222, a movement mechanism 223, a controller 224, a chuck unit 225, and a stage (not shown). The movement mechanism 223 moves the image pickup device 222. The controller 224 controls the movement mechanism 223. The chuck unit 225 holds a substrate W. The stage moves the chuck unit 225. More specifically, the stage horizontally moves the chuck unit 225 in the direction X parallel with the transport direction and the direction Y perpendicular to the transport direction. Further, the stage rotates the chuck unit 225 in the direction θ. The image pickup device 222 includes a third camera lens 226 with a power smaller than that of the first camera lens 115. That is, for example, the power of the first camera lens 115 is ×6, that of the second camera lens 116 is ×10, and that of the third camera lens 226 is ×2. The third camera lens 226, the first camera lens 115, and the second camera lens 116 acquire images of one large alignment mark in fields of view F11, F12, F13, respectively, as shown in FIG. 34. The bonded substrate manufacturing apparatus with the pre-alignment device 221 includes the second camera lens 116 for precise alignment and at least two lenses that have lower powers than that of the second camera lens 116. Although not illustrated, a plurality of pre-alignment devices 221 are located at positions at which each pre-alignment device 221 can acquire an image of the corresponding large alignment mark Ma.

The controller 224 stores a reference image of the large alignment mark Ma acquired by the third camera lens 226. The reference image is obtained as follows. A reference substrate is positioned at an optimal position in the alignment device 36a. The reference substrate is then returned from the pressing device 36 to the pre-alignment device 221 as shown in FIG. 29. Subsequently, the pre-alignment device 221 acquires an image of the large alignment mark Ma of the reference substrate. The controller 224 stores this image as the reference image.

Afterwards, the pre-alignment device 221 receives the first and second substrates W1, W2 (only the first substrate W1 is shown in FIG. 34). The pre-alignment device 221 then acquires an image of the substrate W1 with the third camera lens 226 and compares the image with the reference image to measure the offset amount between the position of the first substrate W1 and the reference position (X, Y, and θ). The offset amount is substantially equal to the relative coordinate position (the offset amount) of the corresponding small alignment mark Mb of the substrate W1 that is received by the pressing device 36 without being pre-aligned, the image of which is acquired by the second camera lens 116. That is, the pre-alignment device 221 predicts the offset amount of the substrate W1 that would otherwise be detected in the alignment device 36a.

The pre-alignment device 221 moves the stage to compensate the offset amount of the substrate W1. A transport device 227 then transports the substrate W1 to the lower holder 173 of the transport table 171. Similarly, the second substrate W2 is transported to the upper holder 172 of the transport table 171. The transport table 171 then transports the first and second substrates W1, W2 to the pressing device 36. Since the substrates W1, W2 have been pre-aligned by the pre-alignment device 221, the corresponding small alignment mark Mb of each substrate W1, W2 is located substantially at the middle of the field of view (along the optical axis) of the second camera lens 116 of the pressing device 36. This suppresses distortion of an image and reduces alignment errors. The alignment thus becomes precise. Further, the second camera lens 116 acquires the small alignment mark Mb in its field of view in a relatively short time. This shortens the time required for aligning the first and second substrates W1, W2 and bonding the substrates W1, W2 together.

Alternatively, devices other than the chuck unit 225 may correct the position of each substrate W (W1, W2). For example, as shown in FIG. 29, the transport device 227 may move the substrate W toward the transport table 171 by a movement amount that compensates the offset amount (X) of the substrate W in the transport direction. Further, the transport device 227 may compensate the offset amount (θ) of the substrate W by receiving the substrate W with an arm of the transport device 227 inclined in accordance with the offset amount (θ) with respect to the transport direction. In these cases, the first and second substrates W1, W2 are transported to the pressing device 36 such that the corresponding large alignment mark Ma is located in the field of view of the first camera lens 115 and the corresponding small alignment mark Mb is located in the field of view of the second camera lens 116.

Instead of moving the lower chuck unit 72b of FIG. 19 by means of the movement mechanism 113, the chamber 71 and the lower chuck unit 72b may be moved together, thus aligning the first and second substrates W1, W2. For example, an alignment device 230 of FIG. 35 may be employed. The alignment device 230 includes a vacuum chamber 231 and a movement mechanism 232. The vacuum chamber 231 has an upper section 231a and a lower section 231b. The vacuum chamber 231 is connected to a pump 236 through a pipe 233, a valve 234, and a pipe 235. The vacuum chamber 231 is depressurized through the operation of the pump 236 and that of the valve 234. An opening/closing mechanism (not shown) supports the upper section 231a with respect to the lower section 231b to selectively open and close the vacuum chamber 231. The movement mechanism 232 rotationally supports the lower section 231b and moves the lower section 231b in two directions along a hypothetical plane. The vacuum chamber 231 accommodates an upper chuck unit 237a and a lower chuck unit 237b. A fixed support plate 239 supports the upper chuck unit 237a through a plurality of support posts 238. A bellows 240 is located around each support post 238 between the support plate 239 and the upper section 231a. The bellows 240 maintains the vacuum chamber 231 in an air-tight state. The lower chuck unit 237b is secured to the bottom of the lower section 231b.

An O-ring 241 and a temporary stop pin 242 are located between the upper section 231a and the lower section 231b at positions where the upper and lower sections 231a, 231b contact each other. The O-ring 241 seals the space between the upper and lower sections 231a, 231b. When the movement mechanism 232 moves the lower section 231b, the temporary stop pin 242 moves the upper section 231a to follow the movement of the lower section 231b.

In the alignment device 230, the vacuum chamber 231 in an open state receives the first and second substrates W1, W2. The upper chuck unit 237a holds the second substrate W2, and the lower chuck unit 237b holds the first substrate W1. After receiving the substrates W1, W2, the vacuum chamber 231 closes. The valve 234 and the pump 236 then operate to depressurize the vacuum chamber 231.

The vacuum chamber 231 in the depressurized state is moved to align the first and second substrates W1, W2 in the alignment device 230. This structure requires a significantly less number of parts, as compared to prior art alignment devices 250, 260 respectively shown in FIGS. 36 and 37. Further, the alignment device 230 advantageously suppresses particle generation from the O-ring 241. In addition, the temporary stop pin 242 advantageously connects the upper and lower sections 231a, 231b to each other with high accuracy. However, since the depressurization of the vacuum chamber 231 enables the upper and lower sections 231a, 231b to closely contact each other, the temporary pin 242 may be canceled.

Figure 36:
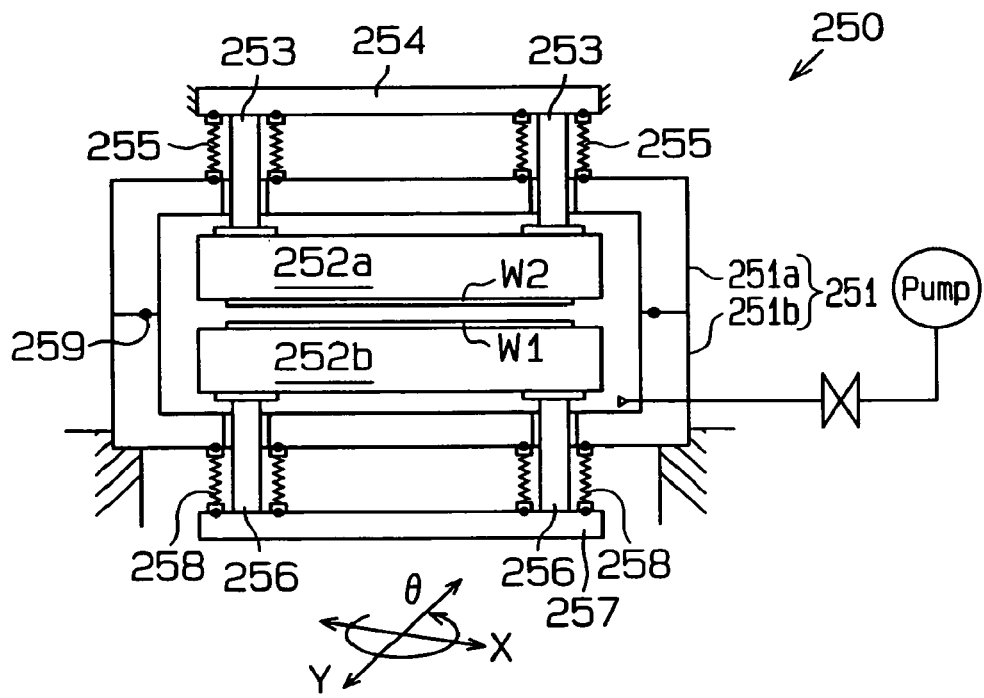
FIG. 36 is a view schematically showing a prior art in correspondence with FIG. 35.
Figure 37:
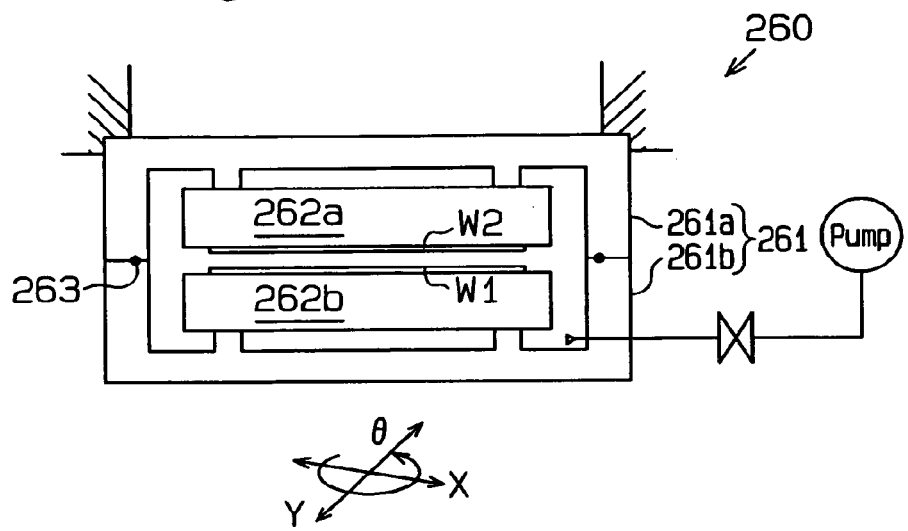
FIG. 37 is a view schematically showing a prior art in correspondence with FIG. 35.

FIG. 36 schematically shows a first prior art, or the alignment device 250, and FIG. 37 schematically shows a second prior art, or the alignment device 260.

The first prior art alignment device 250 includes a vacuum chamber 251 that has an upper section 251a and a lower section 251b. The lower section 251b is fixed, and the upper section 251a is movably supported by a movement mechanism (not shown). The vacuum chamber 251 is opened by moving the upper section 251a.

The vacuum chamber 251 accommodates an upper chuck unit 252a and a lower chuck unit 252b. The upper chuck unit 252a is secured to a fixed support plate 254 through a plurality of support posts 253. A bellows 255 is located around each support post 253 between the support plate 254 and the upper section 251a. The bellows 255 maintains the vacuum chamber 251 in an air-tight state. The lower chuck unit 252b is connected to a support plate 257 through a plurality of support posts 256. A movement mechanism (not shown) rotationally supports the support plate 257 and moves the support plate 257 in two directions along a hypothetical horizontal plane. A bellows 258 is located around each support post 256 between the support plate 257 and the lower section 251b. The bellows 258 maintains the vacuum chamber 251 in an air-tight state. An O-ring 259 is located between the upper section 251a and the lower section 251b at a position where the upper and lower sections 251a, 251b contact each other.

Figure 35:
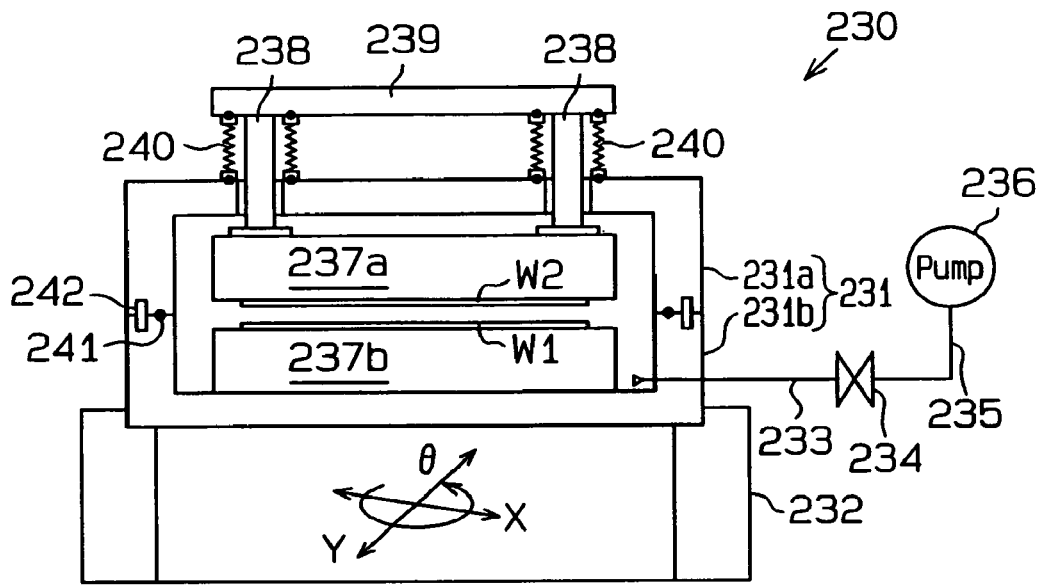
FIG. 35 is a view schematically showing another chamber.

Accordingly, as compared to the first prior art alignment device 250 of FIG. 36, the alignment device 230 of FIG. 35 requires a significantly less number of parts, thus making it easy to maintain the alignment device 230.

The second prior art alignment device 260 of FIG. 37 includes a vacuum chamber 261 that has an upper section 261a and a lower section 261b. The upper section 261a is fixed, and the lower section 261b is rotationally supported by a movement mechanism (not shown). Also, the movement mechanism moves the lower section 261b in two directions along a hypothetical horizontal plane. The upper section 261a accommodates an upper chuck unit 262a, and the lower section 261b accommodates a lower chuck unit 262b. The upper and lower chuck units 262a, 262b are fixed. An O-ring 263 is located between the upper section 261a and the lower section 261b at a position where the upper and lower sections 261a, 261b contact each other.

Accordingly, the alignment device 260 of FIG. 37 requires a significantly less number of parts, as compared to the alignment device 250 of FIG. 36. However, in the alignment device 260, the lower section 261b moves relative to the upper section 261a for aligning the first and second substrates W1, W2. This makes it difficult to maintain the performance of the O-ring 263, which seals the space between the upper and lower sections 261a, 261b. Further, particles are generated from the O-ring 263 or the like when the lower section 261b slides along the upper section 261a. This is undesirable since the particles contaminate the substrates W1, W2 before they are bonded together. In contrast, the alignment device 230 of FIG. 35 suppresses the particle generation and makes it easy to maintain the O-ring 241. The alignment device 230 is thus preferred for a long-term operation.

Figure 38:
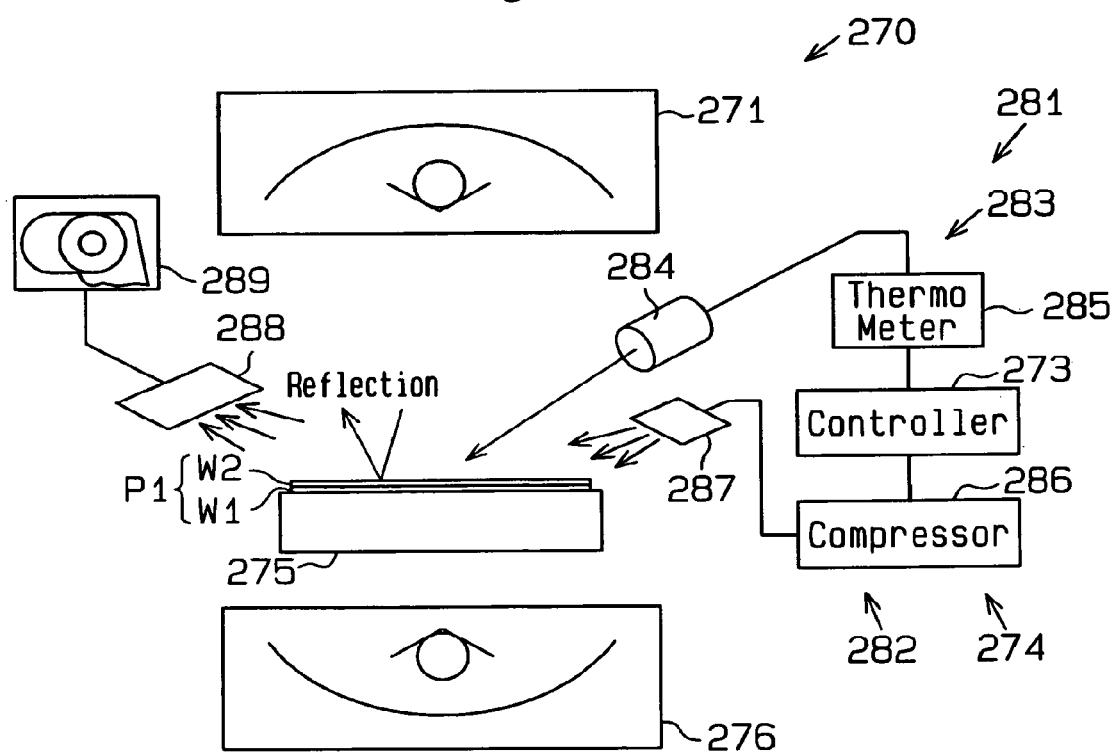
FIG. 38 is a view schematically showing another seal hardening device.

A hardening device 270 of FIG. 38 may replace the hardening device 37 of FIG. 22. The hardening device 270 includes a light source 271, a controller 273, and a cooling mechanism 274. The light source 271 is identical with the light source 148 of FIG. 22. Further, a second light source 276 identical with the light source 155 of FIG. 22 may be located below a chuck unit 275.

The chuck unit 275 supports the substrates W1, W2 that are bonded together, or a panel P1. The chuck unit 275 is configured to suppress reflection. That is, for example, the chuck unit 274 may be provided with a black surface that absorbs light. Since reflection is suppressed on the chuck unit 275, the seal of the panel P1 hardens in a substantially constant time. If reflection is not suppressed on the chuck unit 275, the seal of the panel P1 is exposed to both the light from the light source 271 and the light reflected on the chuck unit 275. The seal thus hardens in a relatively short time as compared to the case in which the seal is exposed to only the light from the light source 271. This makes it difficult to control the time for hardening the seal.

The cooling mechanism 274 maintains the temperature of the surface of the chuck unit 275 that faces the light source 271 at a predetermined level such that the time for hardening the seal of the panel P1 substantially remains in a certain range. More specifically, the seal of the panel P1 is hardened by the light from the light source 271. Thus, the surface of the chuck unit 275 that faces the light source 271 is heated by the light that passes through the panel P1, or the heat transmitted from the panel P1. Further, since the chuck unit 275 suppresses reflection by, for example, absorbing light, the temperature of the surface of the chuck unit 275 that faces the light source 271 easily increases.

If the temperature of the surface of the chuck unit 275 that faces the light source 271 increases, the heat from the chuck unit 275 starts to harden the seal of the panel P1 immediately after the panel P1 is mounted on the chuck unit 275. This makes it difficult to determine the onset of the seal hardening, and the seal hardening time cannot be controlled. Further, if the light irradiation time for the chuck unit 275 with a non-heated surface is applied to the chuck unit 275 with a heated surface, the heat may deteriorate or damage components of the panel P1 such as liquid crystal, a driver IC, and a transistor.

The cooling mechanism 274 includes a temperature detecting mechanism 281 and a surface cooling mechanism 282. The temperature detecting mechanism 281 has a sensor 283 and the controller 273. The sensor 283 detects the temperature of the surface of the chuck unit 275 and includes a sensor head 284 and a thermometer 285. The sensor head 284 detects the surface temperature of the chuck unit 275 in a non-contact manner, thus outputting a detection signal. The thermometer 285 converts the signal to temperature data. The controller 273 then compares the temperature data with pre-stored target temperature data.

The surface cooling mechanism 282 includes the controller 273, a compressor 286, a gas blower head 287, a gas drawer head 288, and a gas drawer pump 289. The controller 273 controls the compressor 286 in relation to a result from the aforementioned comparison. The gas blower head 287 is connected to the compressor 286. Accordingly, the gas blower head 287 blows gas toward the surface of the chuck unit 275, thus cooling the chuck unit 275. The gas drawer head 288 is connected to the gas drawer pump 289. The gas drawer pump 289 thus operates the gas drawer head 288 to draw the gas blown from the gas blower head 287. This improves the cooling efficiency.

The present examples and embodiments are to be considered as illustrative and not restrictive and the invention is not to be limited to the details given herein, but may be modified within the scope and equivalence of the appended claims.

The invention claimed is:

1. A method for operating a bonded substrate manufacturing apparatus for bonding a first substrate and a second substrate together, the apparatus including a pre-alignment device including an image pickup device, a pressing device that aligns and bonds the first and second substrates in an evacuated treatment chamber, and a transport device that transports the first and second substrates in a transport direction to the pressing device, the method comprising:

returning, by the transport device, another first and second substrates, which have been aligned by the pressing device in a previous operation cycle, from the pressing device to the pre-alignment device in a direction opposite to the transport direction;

acquiring, by the image pickup device of the pre-alignment device, an image of each of said another first and second substrates returned to the pre-alignment device and storing the image as a reference image by the pre-alignment device;

acquiring, by the image pickup device of the pre-alignment device, an image of each of the first and second substrates to be bonded together in the current operation cycle;

comparing, by the pre-alignment device, the acquired image of each of the first and second substrates with the respective reference image to measure a misalignment amount for each of the first and second substrates; and correcting position of each of the first and second substrates in accordance with the measured misalignment amount for each of the first and second substrates before transporting the first and second substrates from the pre-alignment device into the treatment chamber of the pressing device.

2. The method according to claim 1, wherein the misalignment amount includes a misalignment amount in a rotation direction about an axis vertical to a horizontal plane including the transport direction.

3. The method according to claim 1, wherein the correcting position of each of the first and second substrates is executed on a stage of the pre-alignment device.

4. The method according to claim 1, wherein the transport device corrects the misalignment amount of each of the first and second substrates while transporting the first and second substrates.

5. The method according to claim 1, wherein: providing, by the pre-alignment device, the transport device with the misalignment amount; and transporting, by the transport device, the first and second substrates in the transport direction by a distance according to the misalignment amount.

* * * * *